(12) United States Patent
Wardlow et al.

(10) Patent No.: US 9,481,110 B2
(45) Date of Patent: Nov. 1, 2016

(54) INJECTION BLOW MOLDING SYSTEM WITH THERMALLY INSULATED MOLD CONFIGURATIONS

(71) Applicant: R&D Tool & Engineering Co., Lees Summit, MO (US)

(72) Inventors: Bruce Wardlow, Lees Summit, MO (US); Jincheng Chen, Leawood, KS (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 135 days.

(21) Appl. No.: 14/489,186

(22) Filed: Sep. 17, 2014

(65) Prior Publication Data

US 2016/0075054 A1     Mar. 17, 2016

(51) Int. Cl.
| | |
|---|---|
| *B29C 33/02* | (2006.01) |
| *B29C 33/28* | (2006.01) |
| *B29C 45/73* | (2006.01) |
| *B29C 49/48* | (2006.01) |
| *B29C 33/38* | (2006.01) |
| *B29C 49/06* | (2006.01) |

(52) U.S. Cl.
CPC .......... *B29C 33/3828* (2013.01); *B29C 49/06* (2013.01); *B29C 2033/023* (2013.01); *B29C 2045/7343* (2013.01); *B29C 2049/483* (2013.01); *B29C 2049/4846* (2013.01); *B29C 2049/4876* (2013.01); *B29K 2905/08* (2013.01); *B29K 2995/0013* (2013.01)

(58) Field of Classification Search
CPC ................. B29C 33/3828; B29C 2045/7343; B29C 2033/023; B29C 2049/4876; B29C 2049/4874; B29C 2049/4887; B29C 49/48; B29C 2049/483; B29C 2049/4846
See application file for complete search history.

(56) References Cited

U.S. PATENT DOCUMENTS

| | | | | |
|---|---|---|---|---|
| 2,353,825 | A * | 7/1944 | Hofmann | B29C 45/03 264/DIG. 33 |
| 4,233,022 | A * | 11/1980 | Brady | B29C 49/4823 215/373 |
| 4,871,507 | A * | 10/1989 | Ajmera | B29C 49/4823 264/521 |
| 6,808,820 | B2 * | 10/2004 | Lee | B29C 45/1684 428/35.7 |
| 7,367,795 | B2 * | 5/2008 | Hutchinson | B29C 33/3828 425/527 |
| 8,475,157 | B2 | 7/2013 | Chen | |
| 8,512,028 | B2 | 8/2013 | Fields et al. | |
| 8,512,625 | B2 | 8/2013 | Fields et al. | |
| 8,523,556 | B2 | 9/2013 | Fields et al. | |
| 8,562,334 | B2 | 10/2013 | Fields et al. | |
| 8,714,965 | B2 | 5/2014 | Chen | |
| 2005/0285287 | A1 * | 12/2005 | Okumura | B29C 33/02 264/2.5 |
| 2012/0126462 | A1 | 5/2012 | Fields et al. | |
| 2012/0128812 | A1 * | 5/2012 | Fields | B29C 49/063 425/525 |
| 2014/0042673 | A1 | 2/2014 | Fields et al. | |

* cited by examiner

*Primary Examiner* — Robert B Davis
(74) *Attorney, Agent, or Firm* — Hovey Williams LLP

(57) ABSTRACT

An injection blow molding (IBM) system and method for forming a plurality of parisons and molded articles. The IBM system includes at least one upper body mold half and one lower body mold half, with the upper and lower body mold halves cooperatively presenting a body cavity and being configured to define an exterior shape of a body of the parison. The tooling additionally comprises at least one upper neck mold half and one lower neck mold half, with the upper and lower neck mold halves cooperatively presenting a neck cavity and being configured to define an exterior shape of a neck of the parison. The tooling further comprises an upper thermal barrier plate positioned between the upper body mold half and the upper neck mold half and a lower thermal barrier plate positioned between the upper body mold half and the upper neck mold half.

25 Claims, 36 Drawing Sheets

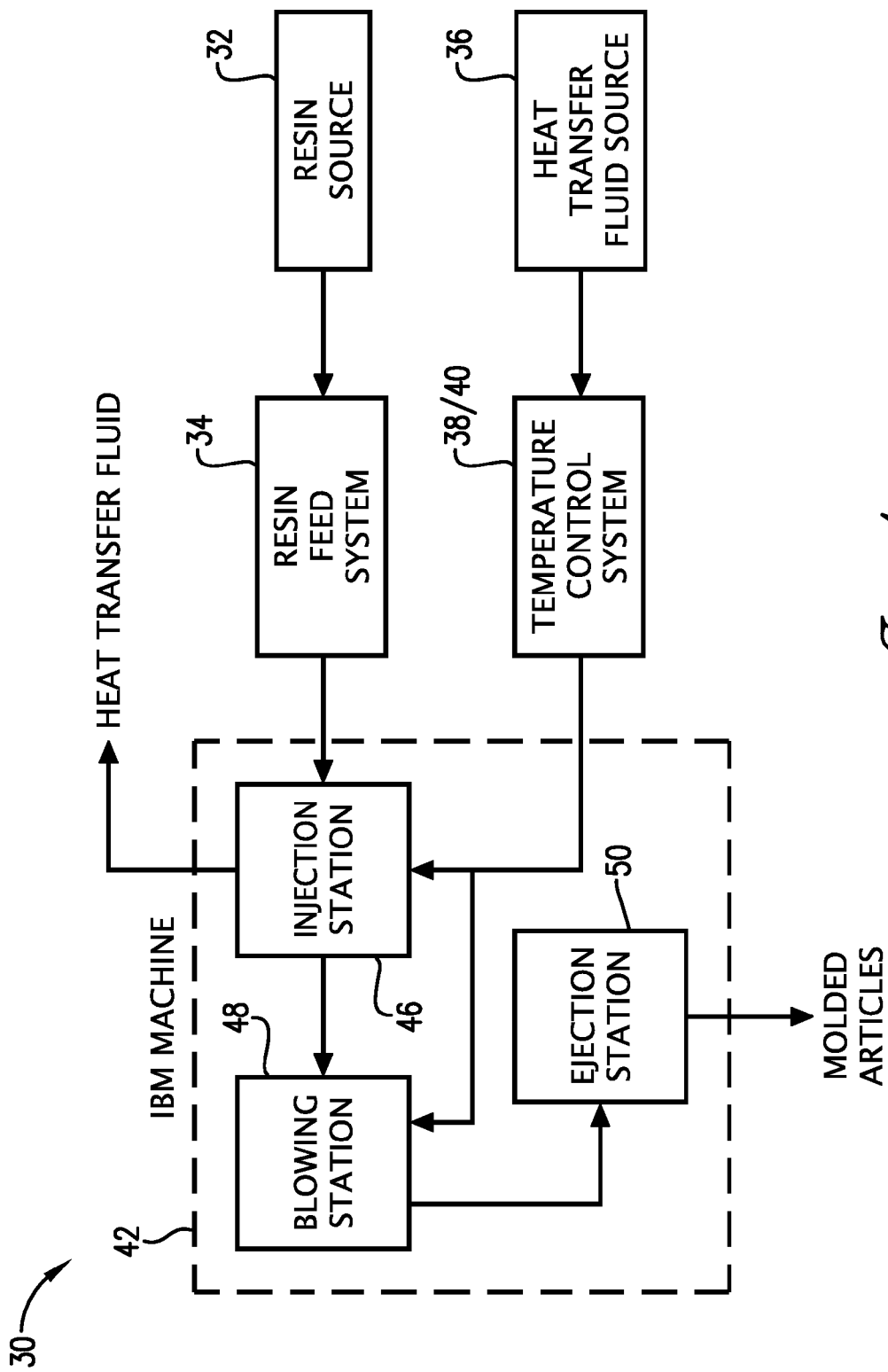

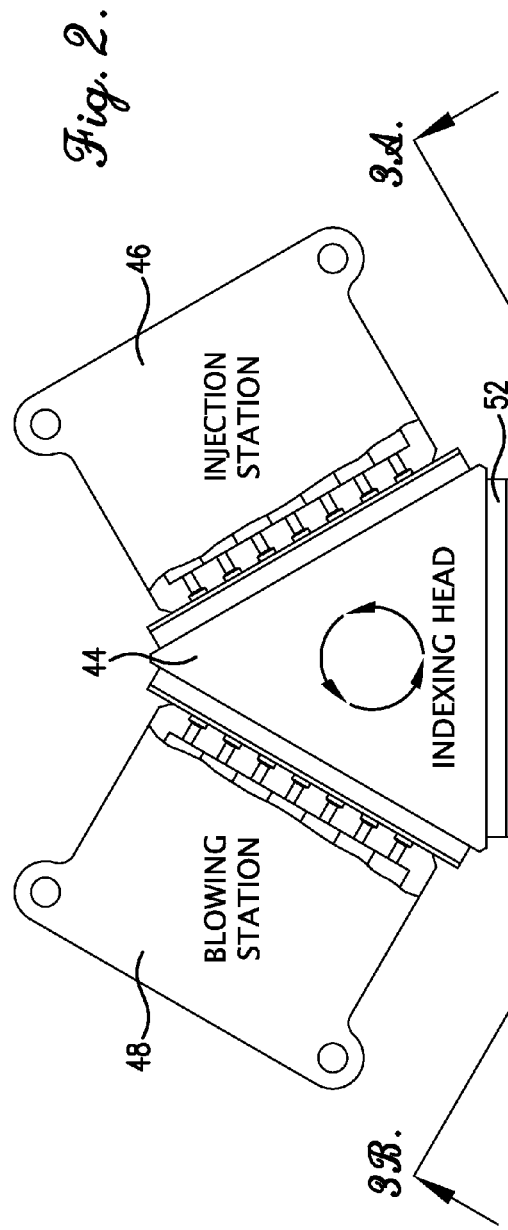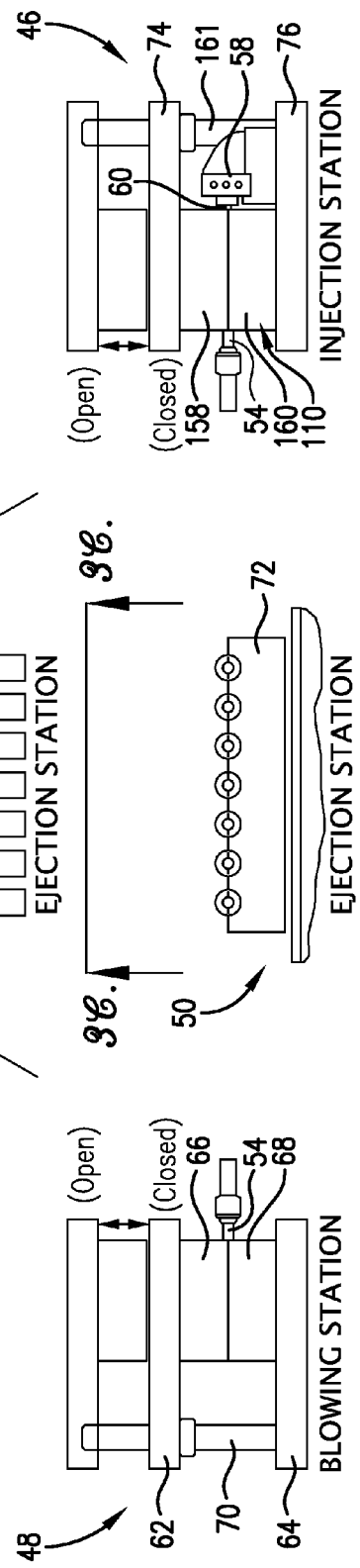

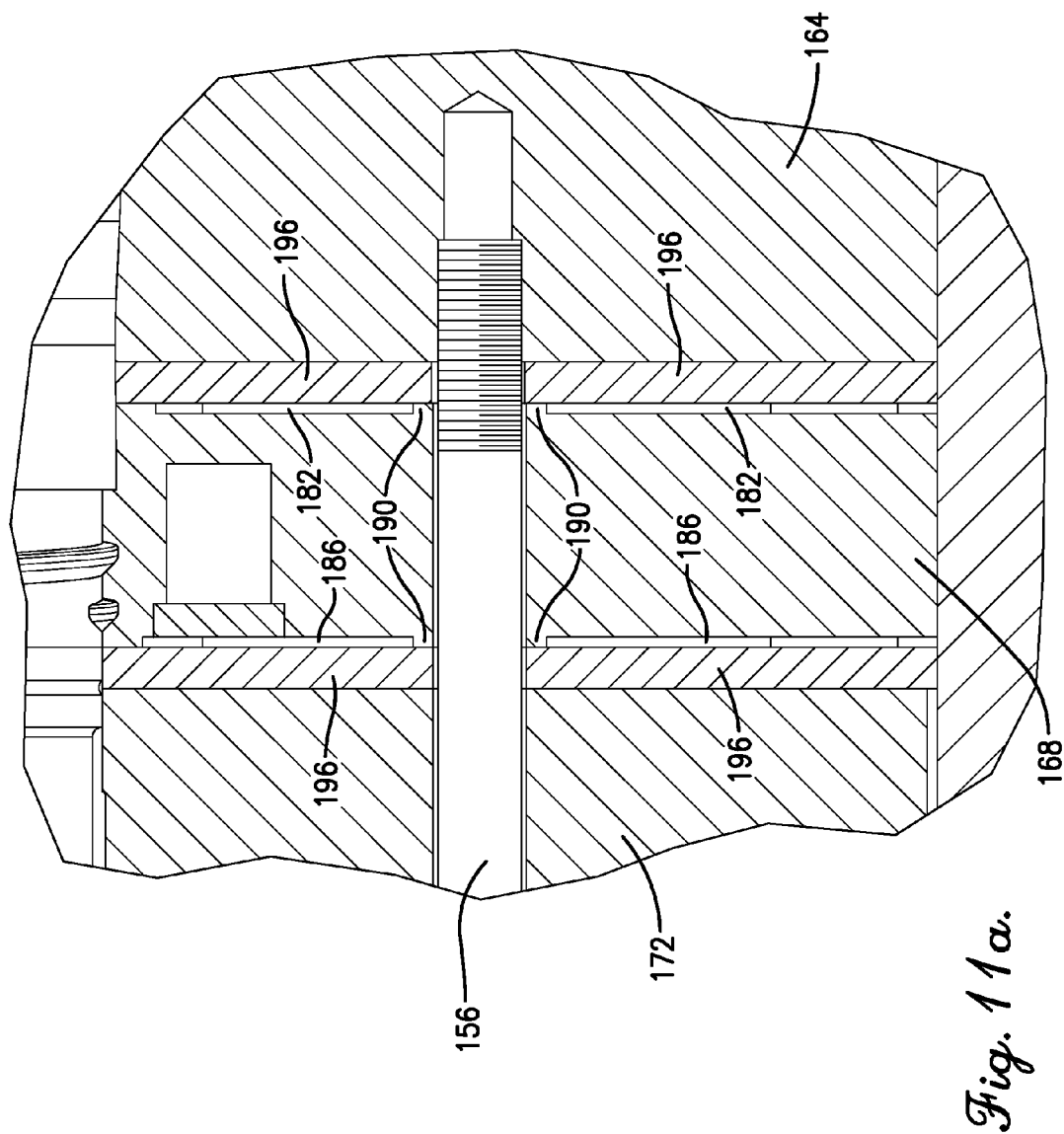

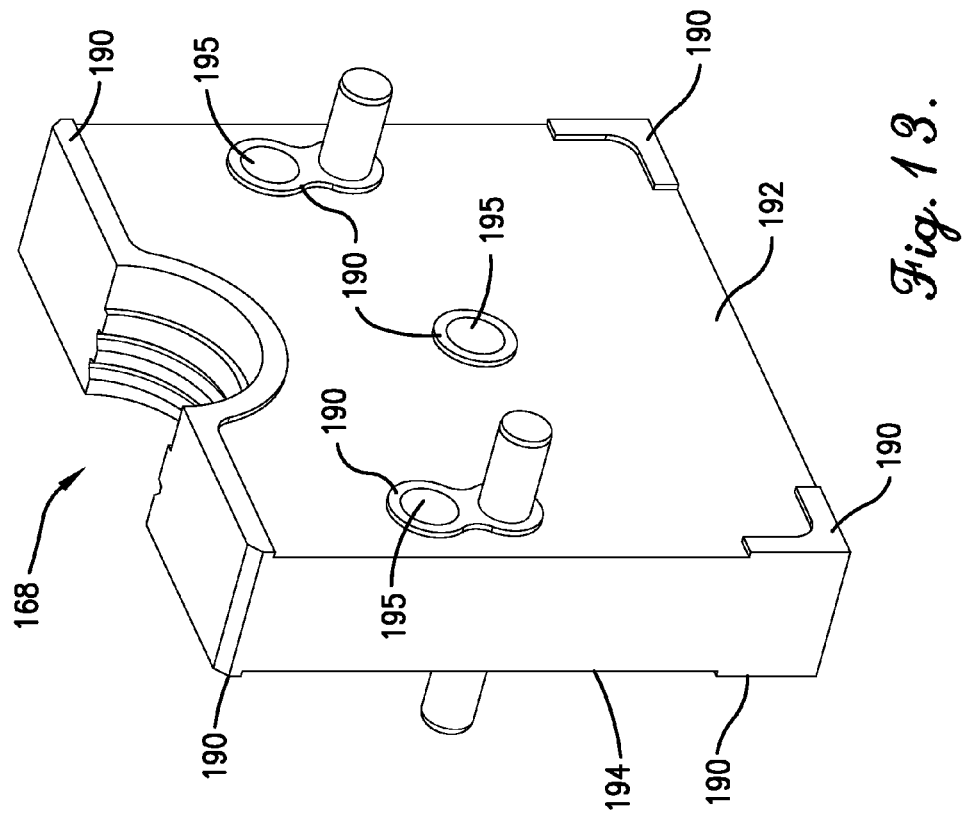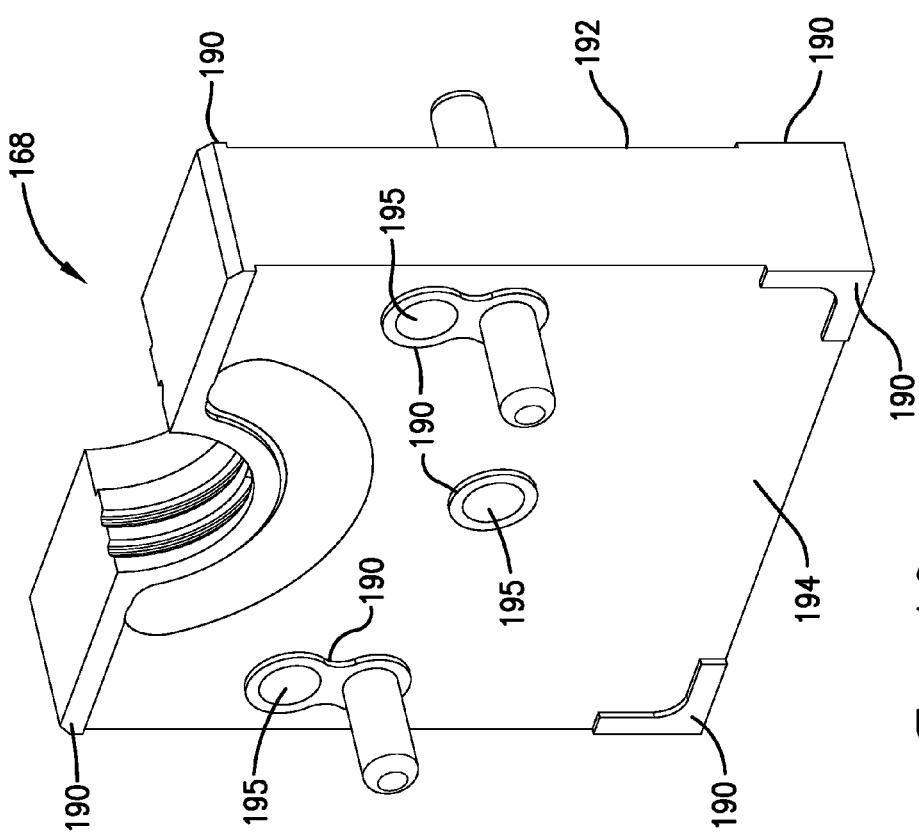

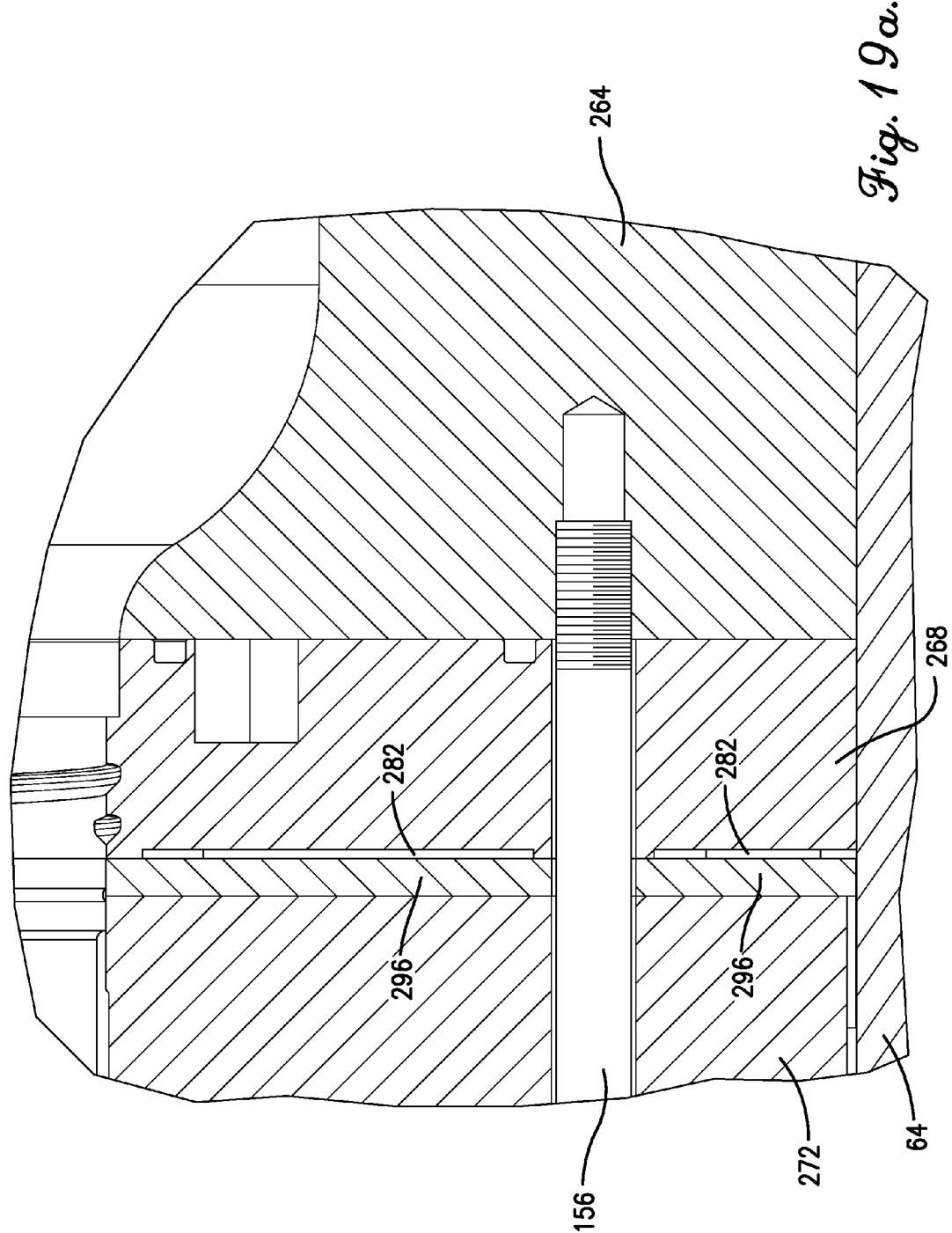

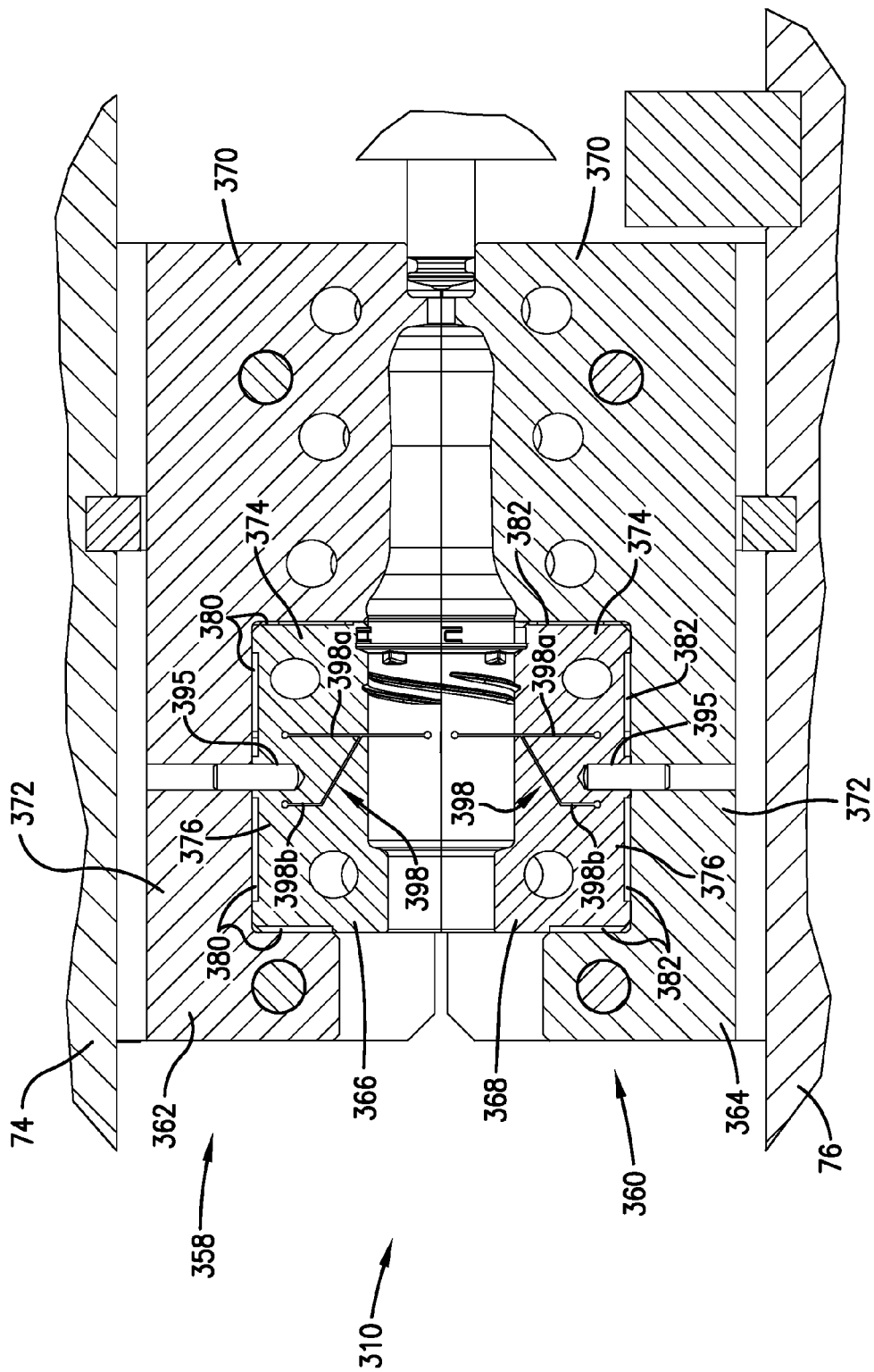

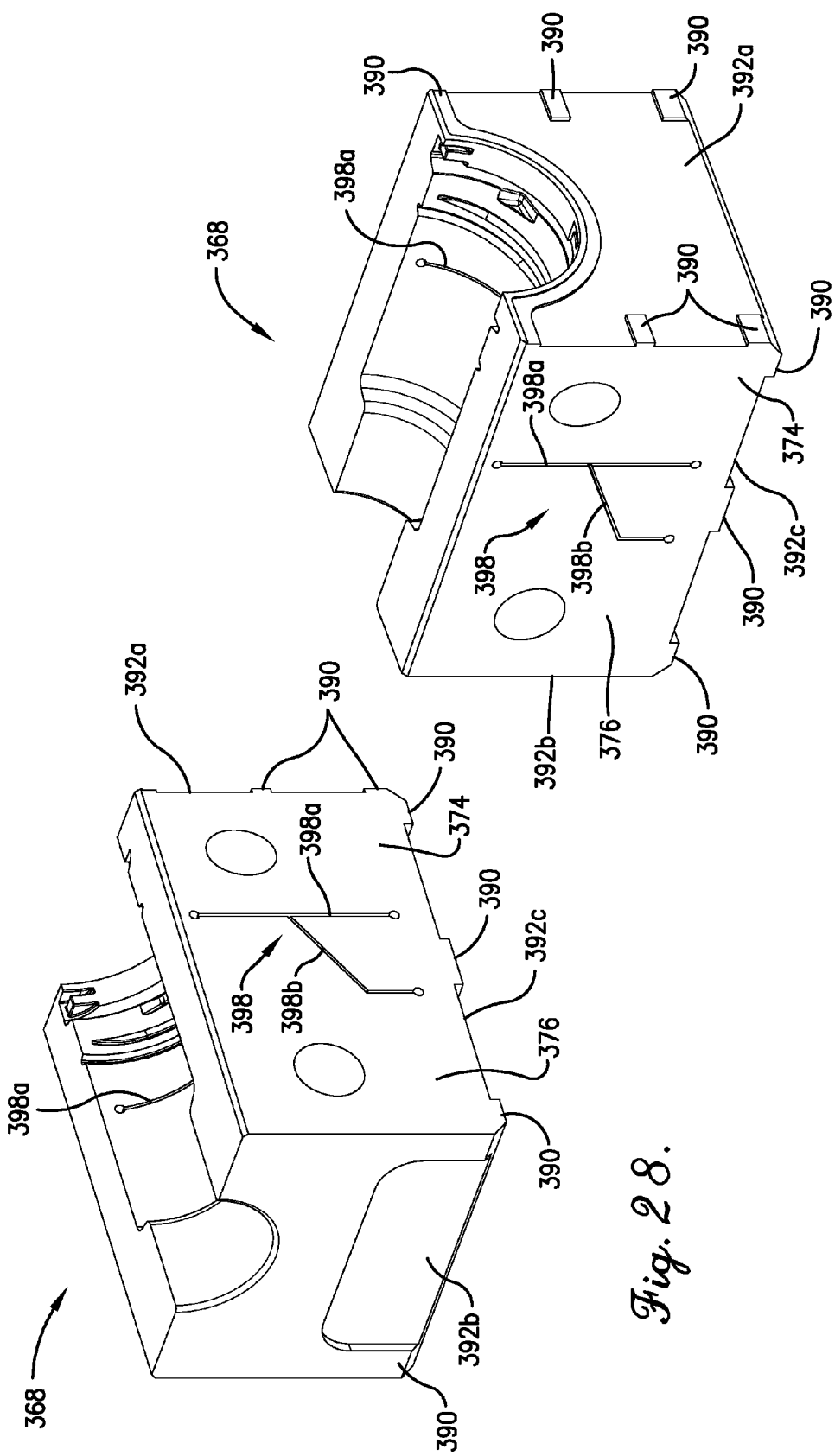

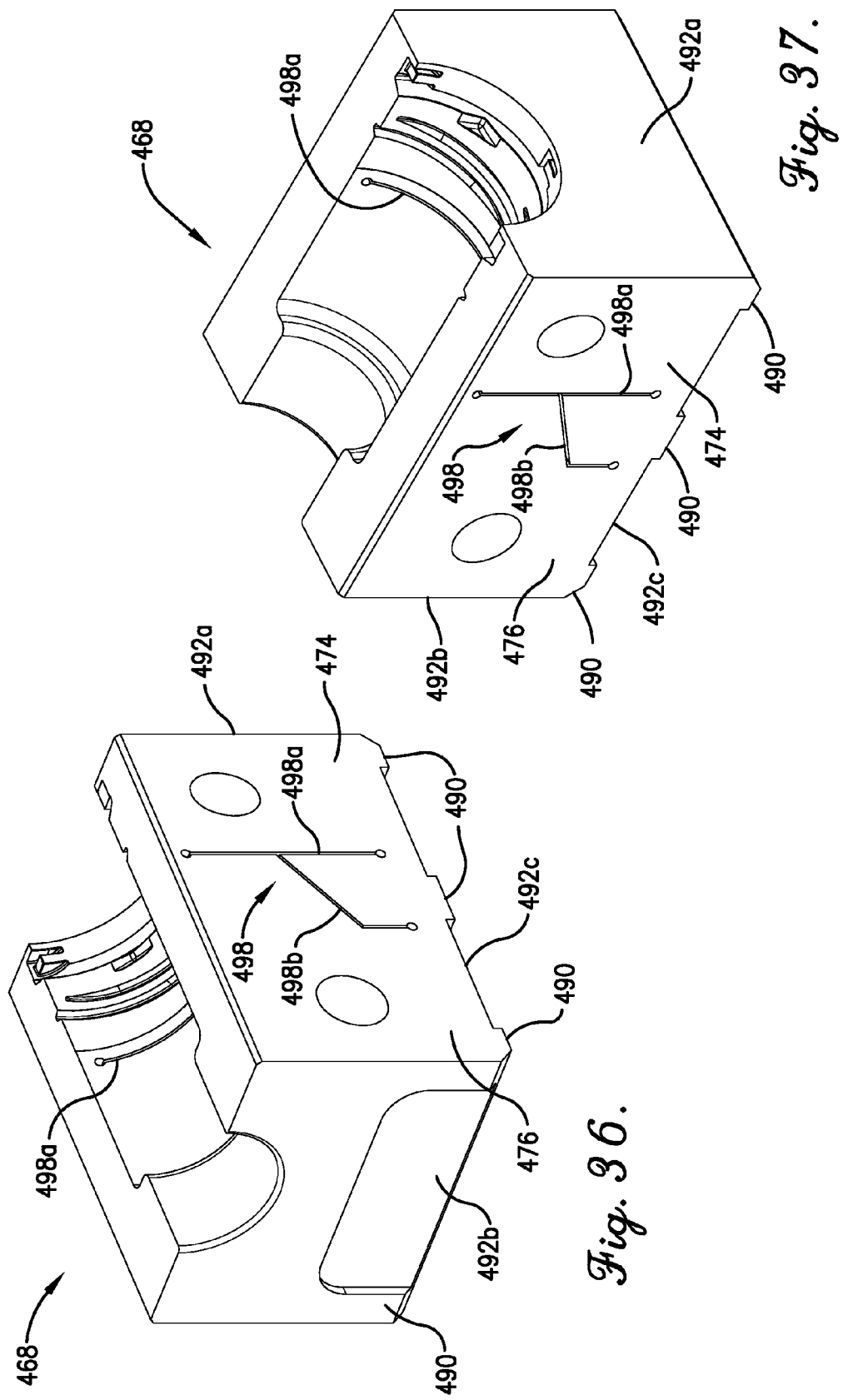

INJECTION BLOW MOLDING SYSTEM WITH THERMALLY INSULATED MOLD CONFIGURATIONS

BACKGROUND OF THE INVENTION

1. Field of the Invention

Embodiments of the present invention relate to an injection blow molding system, apparatus and method for forming molded articles.

2. Description of the Related Art

Injection blow molding (IBM) is a technique used for creating various articles such as plastic bottles or containers. The IBM process is performed with an IBM machine that first injection molds a resin into a plurality of parisons of desired shapes and then blow molds the parisons into the final molded articles.

An injection station of the IBM machine typically includes a split parison mold assembly that defines a plurality of cavities within which the parisons are formed. In the injection molding stage of the IBM process, the parison-forming surfaces of the split parison mold are heated to and/or cooled to different temperatures via a plurality of water lines formed in the split parison mold near the parison-forming surfaces. The water lines may be supplied with water at different temperatures depending on the location of the water line relative to the neck or body of the parison being formed. For example, a body portion of the split parison mold may require heating to a temperature of about 210° F., while the neck portion of the split parison mold may require a relative cooling to a temperature of about 100° F. Typically, a plurality of individual thermolators are required to control the temperature of water supplied to the various water lines in the parison mold. However, even with such temperature control methods, maintaining precise temperatures within the split parison mold is difficult due to external temperature fluctuations and inherent temperature gradients that exist within the molds.

Similarly, a blow station of the IBM machine typically includes a split blow mold assembly that defines a plurality of cavities within which the parisons formed at the injection station are blow molded into final blow molded articles. In the blow molding stage of the IBM process, the article-forming surfaces of the blow mold are cooled to specific temperatures via a plurality of water lines formed in the split blow mold near the article-forming surfaces. For example, a body portion and a neck portion of the split blow mold may require cooling to a temperature of about 50° F. As with the injection station, maintaining precise temperatures within the split blow mold is difficult due to external temperature fluctuations and inherent temperature gradients that exist within the molds.

Thus, it would be desirable to have injection blow molding systems, apparatuses, and/or processes to allow for the split molds within the injection stations and the blow stations to maintain specific temperatures during formation of the parisons and/or the articles.

SUMMARY OF THE INVENTION

In certain embodiments of the present invention there is provided tooling for forming at least one parison with an injection blow molding system. The tooling comprises at least one upper body mold half and one lower body mold half, with the upper and lower body mold halves cooperatively presenting a body cavity and being configured to define an exterior shape of a body of the parison. The tooling additionally comprises at least one upper neck mold half and one lower neck mold half, with the upper and lower neck mold halves cooperatively presenting a neck cavity and being configured to define an exterior shape of a neck of the parison. The tooling further comprises an upper thermal barrier positioned between the upper body mold half and the upper neck mold half and a lower thermal barrier positioned between the upper body mold half and the upper neck mold half.

In certain embodiments of the present invention there is provided an injection blow molding process comprising the initial step of providing upper and lower body mold halves configured for attachment to upper and lower die sets, respectively. A next step includes connecting upper and lower neck mold halves with the upper and lower body mold halves, respectively. A next step includes connecting upper and lower thermal barrier plates with the upper and lower neck mold halves, respectively. Upon the connecting of the upper and lower thermal barrier plates with the upper and lower and lower neck mold halves, upper and lower insulating gaps are presented between the upper and lower neck mold halves and the upper and lower thermal barrier plates, respectively. A last step includes connecting upper and lower interlock halves with the upper and lower thermal barrier plates, respectively.

Additional embodiments of the present invention provide tooling for forming a molded article from a parison with an injection blow molding system. The tooling comprises upper and lower body mold halves, with the upper and lower body mold halves cooperatively presenting a body cavity and being configured to define an exterior shape of a body of the molded article. The tooling additional comprises upper and lower insert halves coupled with the upper and lower body mold halves, respectively. At least a portion of the upper and lower insert halves cooperatively present a neck cavity configured to define an exterior shape of a neck of the molded article. Additionally, the upper insert half includes an upper insulating gap separating first and second portions of the upper insert half, and the lower insert half includes a lower insulating gap separating first and second portions of the lower insert half.

BRIEF DESCRIPTION OF THE DRAWINGS

Embodiments of the present invention are described in detail below with reference to the attached drawing figures, wherein:

FIG. 1 is a block diagram of a system for producing injection blow molded articles, particularly illustrating injection blow molding apparatus and systems for an injection station and a blowing station of the injection blow molding apparatus;

FIG. 2 is a plan view of an injection blow molding apparatus, particularly illustrating the apparatus' injection station, blowing station, ejection station, and indexing head;

FIG. 3A is a side view of the injection station depicted in FIG. 1, particularly illustrating the injection mold die sets, split injection mold assembly, and resin manifold assembly;

FIG. 3B is a side view of the blowing station depicted in FIG. 1, particularly illustrating the blow mold die sets and split blow mold assembly;

FIG. 3C is a schematic side view of the ejection station depicted in FIG. 1, particularly illustrating the stripper plate used to remove blow molded articles from the core rods of the indexing head;

FIG. 11a is an enlarged, partial view of a lower half of the view from FIG. 11;

FIG. 12 is a rear isometric view of a second neck mold half from FIG. 4;

FIG. 13 is a front isometric view of the second neck mold half from FIG. 12;

FIG. 19a is an enlarged, partial view of a lower half of the view from FIG. 19;

FIG. 27 is a partial cross-section view of the injection station of FIGS. 22 and 25-26, taken along the line 27-27 of FIG. 25;

FIG. 28 is a rear isometric view of a second removable insert half of FIG. 22;

FIG. 29 is a front isometric view of the second removable insert half from FIG. 28;

FIG. 36 is a rear isometric view of a second removable insert half of FIG. 30; and FIG. 37 is a front isometric view of the second removable insert half from FIG. 36.

Figure 4:
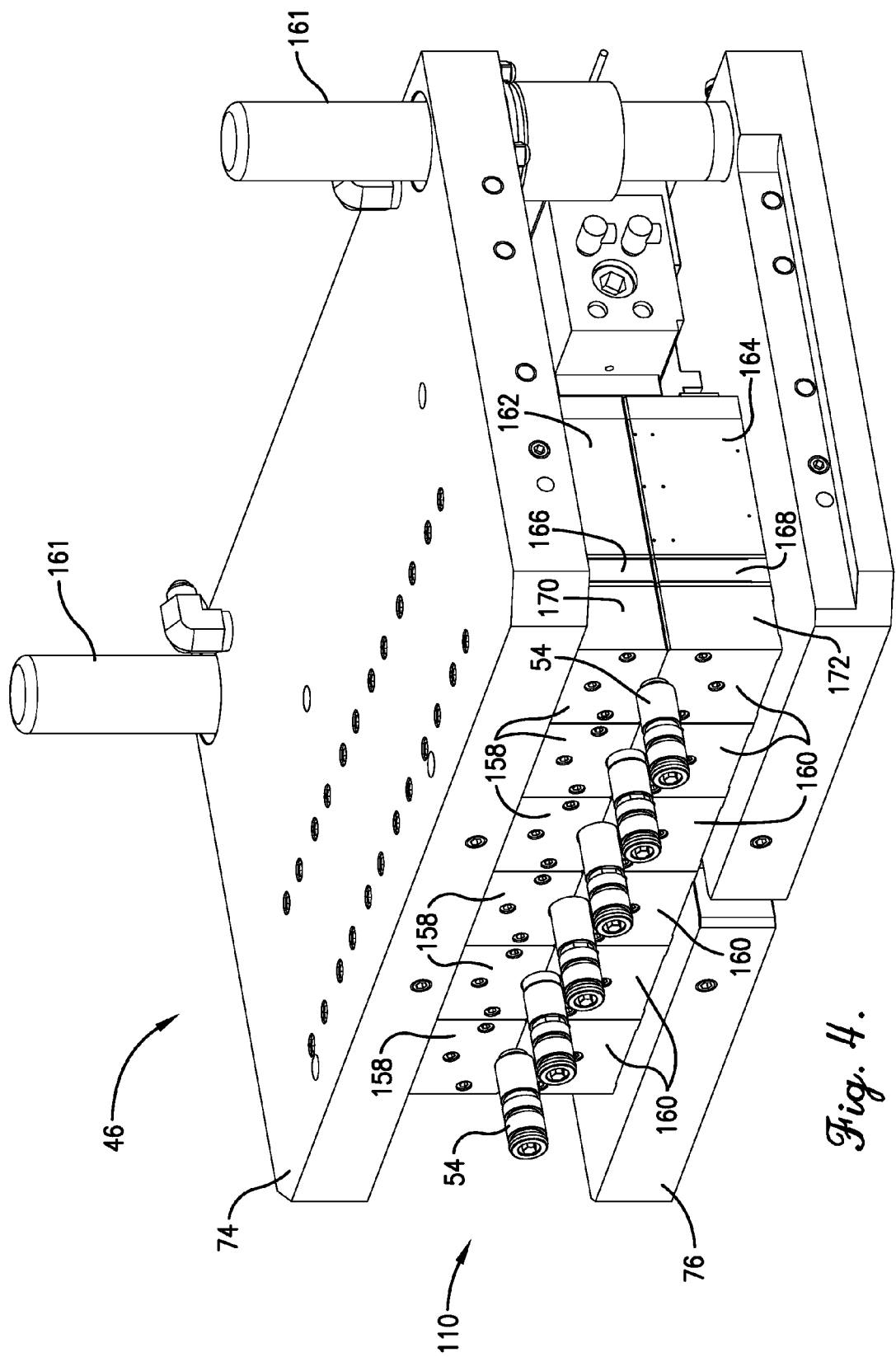
FIG. 4 is an isometric view of an injection station configured in accordance with a first embodiment of the present invention, particularly illustrating the injection station in a closed position with a split parison mold assembly including a plurality of first and second mold halves attached two die sets, with the first and second mold halves comprising first and second body mold halves, first and second neck mold halves, and first and second interlock insert halves, respectively.
Figure 5:
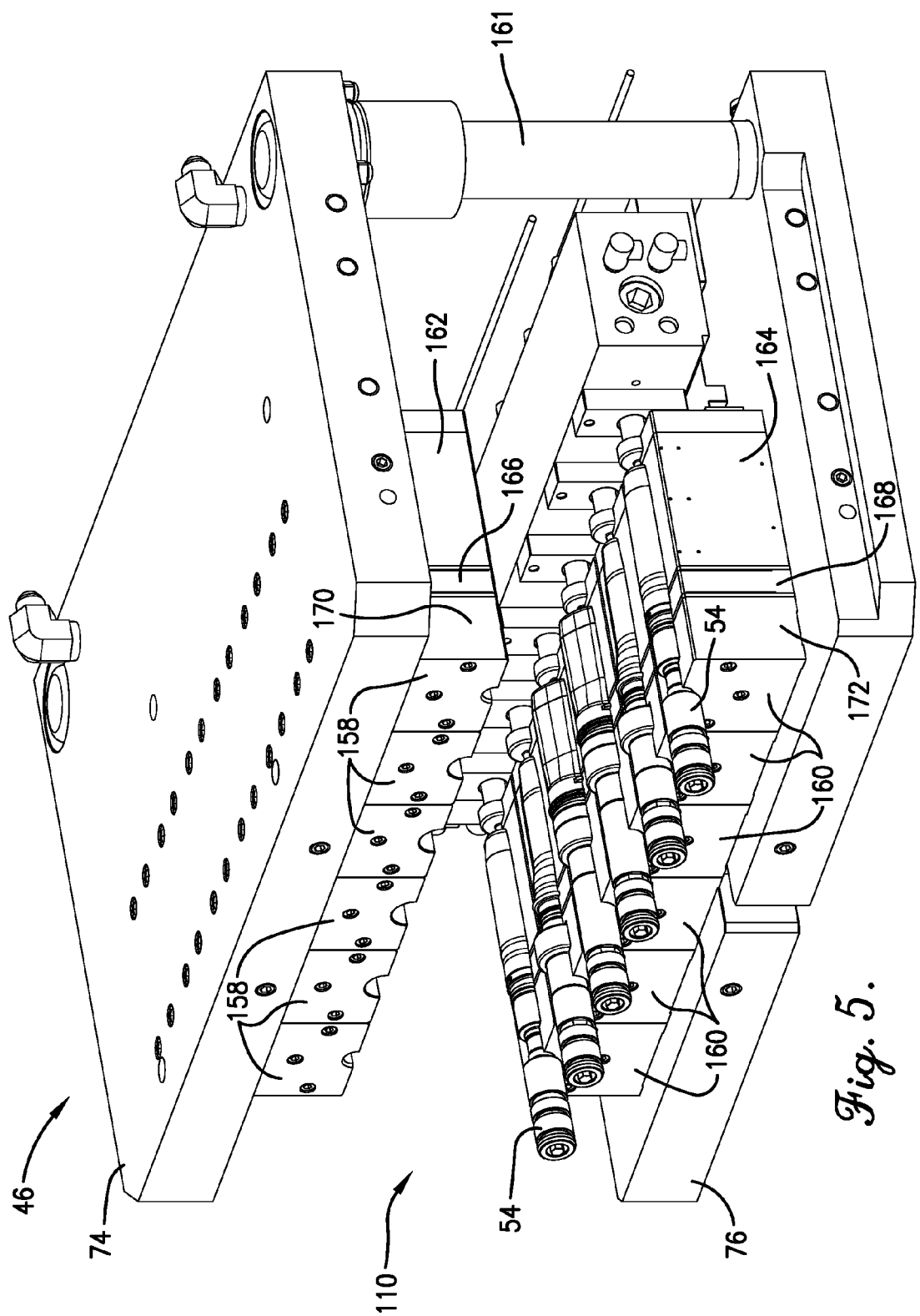
FIG. 5 is an isometric view of the injection station of FIG. 4 in an open position.
Figure 6:
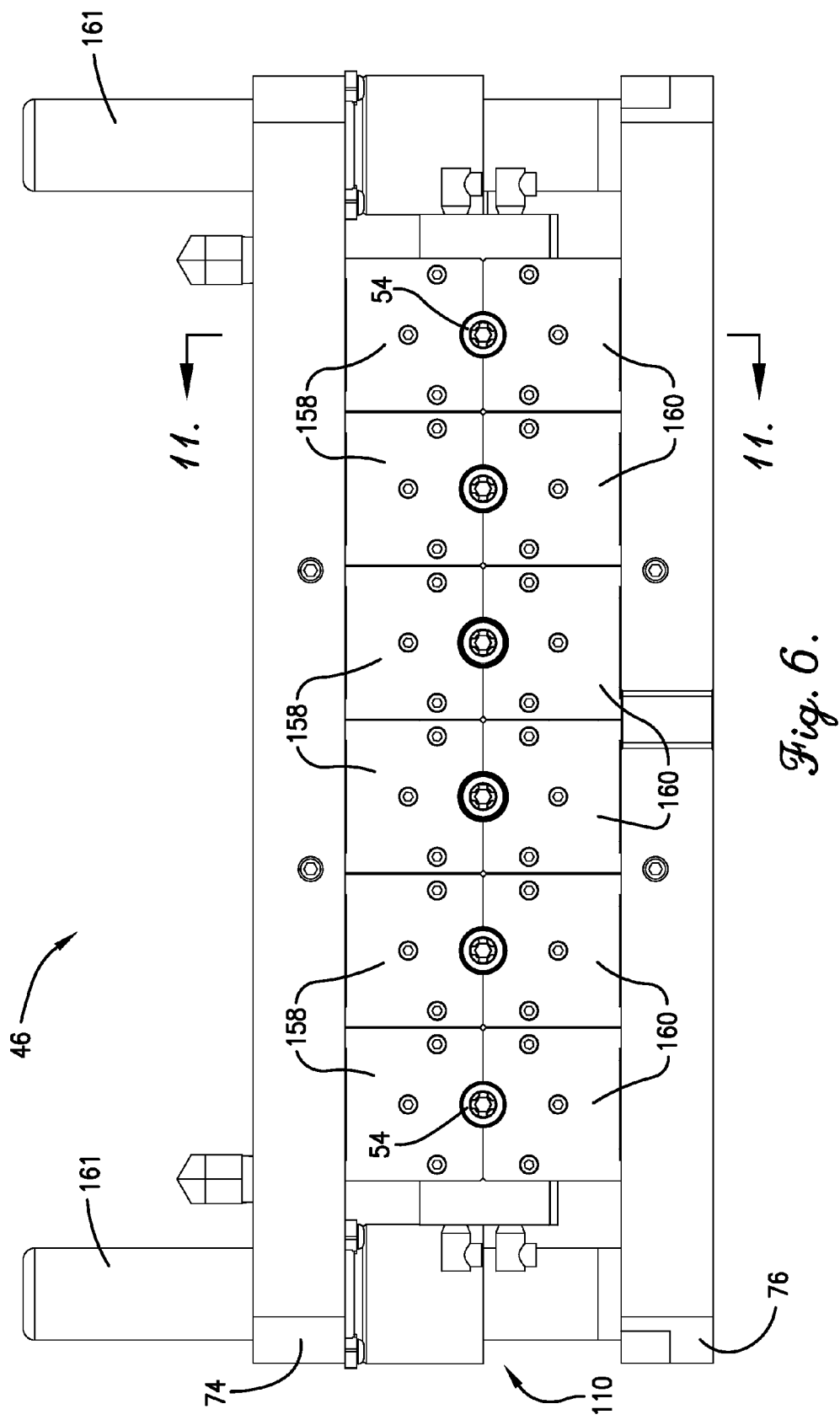
FIG. 6 is a front plan view of the injection station of FIGS. 4-5 in a closed position.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An injection blow molding system 30, as illustrated in FIGS. 1-3, is configured for injection molding a resin into a plurality of parisons and blow molding the parisons into a plurality of molded articles. The injection blow molding system 30 is similar in certain respects to the injection blow molding system described in U.S. Patent App. Publ. No. 2014/0042673, which is incorporated herein by reference in its entirety. As illustrated in FIG. 1, the injection blow molding system 30 may comprise: a resin source 32, a resin feed system 34, a heat transfer fluid source 36, a temperature control system 38 comprising at least one temperature control unit 40, and an injection blow molding (IBM) machine 42.

The resin source 32 may be any apparatus for producing and/or storing resin suitable for being molded and hardened into one or more molded articles. For example, the resin provided at the resin source 32 may be polyolefin resin. The resin feed system 34 may be coupled in fluid-flow communication with the resin source 32 and configured to inject resin into cavities of a mold of the IBM machine 42, as described below.

The heat transfer fluid source 36 may be any system capable of providing an amount of heat transfer fluid sufficient to supply the heat transfer fluid to desired components of the IBM machine 42 in a desired quantity and for a desired length of time during injection molding and blowing processes. For example, the heat transfer fluid source 36 may be a water supply or a supply of any fluid of a sufficient viscosity to freely flow throughout desired components of the IBM machine 42. The heat transfer fluid may also have sufficient thermal characteristics to remain within a desired temperature range as it flows through the desired portions of the IBM machine 42.

The temperature control system 38 may comprise one or more of the temperature control units 40 (e.g., thermolators) coupled in fluid-flow communication with the heat transfer fluid source 36 and operable to control the temperature of the heat transfer fluid within a predetermined temperature range. In some embodiments, a plurality of the temperature control systems 38 and/or a plurality of the temperature control units 40 may be provided. However, in some embodiments, only one temperature control unit 40 is used to control the temperature of heat transfer fluid injected into the IBM machine 42. The temperature control unit 40 may provide heat transfer fluid of a substantially uniform temperature to the desired portions of the IBM machine 42.

As illustrated in FIG. 2, the IBM machine 42 may be configured for injection blow molding a plurality of parisons and/or molded articles. The IBM machine 42 may comprise an indexing head 44, an injection station 46, a blowing station 48, and an ejection station 50. The injection blow molding process performed with the IBM machine 42 may include inserting polyolefin resin at the injection station 46 to form the parisons while simultaneously passing a heat transfer fluid through heat transfer channels defined within the injection station 46 to regulate the temperature of the injection station 46. The injection blow molding process may then include actuating the indexing head 44 to transfer the resulting parisons from the injection station 46 to the blowing station 48 to be blow molded into molded articles while simultaneously passing a heat transfer fluid through heat transfer channels defined within the blowing station 48 to regulate the temperature of the blowing station 48. Next, the molded articles may be transferred via the indexing head 44 to the ejection station 50, where the parisons are then ejected from the IBM machine 42. The injection blow molding process described herein may be performed repetitively by the IBM machine 42. For example, the method steps described herein may be repeated at least 100, 1,000, or 10,000 consecutive times.

The indexing head 44 is configured for transferring the parisons from the injection station 46 to the blowing station 48 and then to the ejection station 50. The indexing head 44 may comprise a face block 52 on one or more outward-facing sides thereof, one or more core rod retainer plates 56 attached to the face blocks 52, and one or more core rods 54 attached to the core rod retainer plates 56. Each of the core rods 54 may be spaced a distance apart from adjacent core rods 54 and may be shaped according to a desired interior shape of the parisons to be formed thereon. In one embodiment of the IBM machine 42, the indexing head 44 may be configured to rotate the core rods 54 from the injection station 46 to the blowing station 48 and then to the ejection station 50 as directed by an operator or automated control devices (not shown). For example, the face blocks 52 may be arranged in a substantially triangular configuration with core rods 54 protruding from one or more sides of the triangular configuration, and the indexing head 44 may rotate approximately 120 degrees to move the core rods 54 on one side of the triangular configuration from the injection station 46 to the blowing station 48. In some embodiments of the injection blow molding system 30, the indexing head 44 may have core rods 54 protruding from each side, such that the injection station 46, blowing station 48, and ejection station 50 may each operate simultaneously on a different set of parisons or molded articles.

The injection station 46 may be configured for injection molding the resin into the parisons. Specifically, the injection blow molding process may comprise injection molding a resin into a plurality of parisons at the injection station 46. As depicted in FIG. 1, the injection station 46 may be fluidly coupled with the resin source 32, the resin feed system 34, the heat transfer fluid source 36, and the temperature control system 38 and/or unit 40. The injection station 46 may comprise at least a portion of the resin feed system 34, as illustrated in FIG. 3A. For example, the resin feed system 34 may comprise or be fluidly coupled with an injection manifold 58 and one or more nozzles 60 positioned and configured for injecting resin into the one or more parison cavities.

Referring again to FIG. 2, the blowing station 48 may be configured for blow molding the parisons into the molded articles. As such, the injection blow molding process may include the steps of transferring the parisons from the injection station 46 to the blowing station 48 and then blow molding the parisons formed at the injection station 46 into molded articles at the blowing station 48. As depicted in FIG. 1, the blowing station 48 may be fluidly coupled with the heat transfer fluid source 36 and the temperature control system 38 and/or unit 40.

As shown in FIG. 3B, the blowing station 48 may comprise an upper die set 62, a lower die set 64, an upper mold half 66 coupled to the upper die set 62, and a lower mold half 68 coupled to the lower die set 64. The upper die set 62 and/or the lower die set 64 may be movable toward and away from each other, moving the blowing station 48 between an open position and a closed position. For example, the upper die set 62 and its corresponding upper mold half 66 may move upward and downward on a blowing station guide pin 70 fixed relative to the lower die set 64 and/or the lower mold half 68.

As shown in FIGS. 2 and 3C, the ejection station 50 may comprise a stripper plate 72 or any other device configured for pushing, pulling, dumping, or otherwise stripping the parisons off of the core rods 54 once they have been blow molded. For example, once the indexing head 44 moves the molded articles from the blowing station 48 to the ejection station 50, the stripper plate may be inserted adjacent to a top edge of the necks of the molded articles, between the necks and a center point of the indexing head 44. Then the stripper plate 72 may be moved laterally away from the center point of the indexing head 44, thus stripping the core rods 54 of the molded articles resting thereon.

In some embodiments of the IBM machine 42 described above, a conventional indexing head 44, blowing station 48, and/or ejection station 50 may be used. However, the injection station 46 and the blowing station 48 disclosed herein may comprise a multitude of improvements over prior art injection and blowing stations. Referring now to FIGS. 3A and 4-7, in various embodiments of the IBM machine 42 described herein, the injection station 46 may comprise upper and lower die sets 74,76 to which is attached a split parison mold assembly 110. The split mold assembly 110 includes a plurality of first individual mold halves 158 and a plurality of second individual mold halves 160, each independently attached to respective die sets 74,76 in a spaced-apart configuration. As used herein, the term "independently coupled" denotes connection of a first component to a second component in a manner such that disconnection and removal of the first component from the second component does not require disconnection of any fasteners other than the fasteners that contact and connect both the first or second components. In other embodiments, the split parison mold assembly 110 may comprise primarily monolithic components. For example, the individual mold halves 158 may be formed together as an integral, monolithic unit. And, similarly, the individual mold halves 160 may be formed together as a integral, monolithic unit. Regardless, the upper die set 74 and/or the lower die set 76 may be movable toward and away from each other, moving the injection station 46 between an open position and a closed position. For example, the upper die set 74 and its corresponding first individual mold halves 158 may move upward and downward on injection station guide pins 161 fixed relative to the lower die set 76 and/or the second individual mold halves 160.

Figure 7:
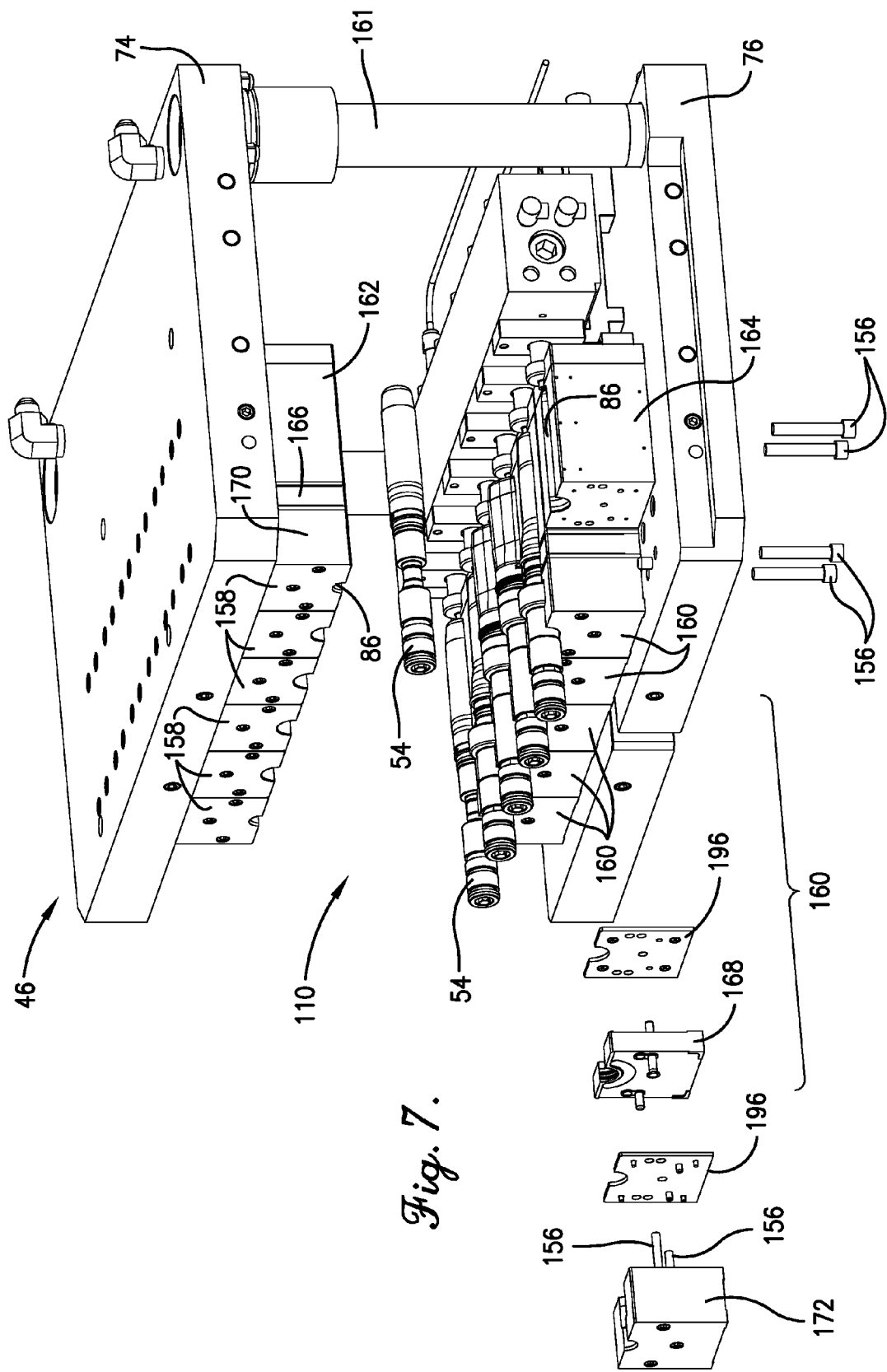
FIG. 7 is an isometric view of the injection station of FIGS. 4-6 in an open position, with one of the second mold halves shown partially exploded from the die sets.

Remaining with the embodiments of FIGS. 4-7 with the plurality of separated individual mold halves 158,160, each of the first individual mold halves 158 has a corresponding one of the second individual mold halves 160 with which it cooperates to define a single parison cavity 86 (See FIG. 7). In certain embodiments, each of the first individual mold halves 158 are horizontally-spaced from one another to thereby form gaps therebetween, and each of the second individual mold halves 160 are horizontally-spaced from one another to thereby form gaps therebetween. As such, each of the first individual mold halves 158 may be coupled to the upper die set 74 by one or more vertically-extending mounting fasteners 156 (not shown), and each of the second individual mold halves 160 may be coupled to the lower die set 76 by one or more vertically-extending mounting fasteners 156 (See FIG. 7). In this embodiment of the injection station 46, the vertically-extending mounting fasteners 156 may be the only means used to couple the first and second individual mold halves 158,160 to the upper and lower die sets 74,76, respectively.

The plurality of first and second individual mold halves 158,160 may respectively comprise a first or second individual body mold half 162,164, a first or second individual neck mold half 166,168, and a first or second individual interlock insert half 170,172. Such components are perhaps best illustrated in FIGS. 8-9, which illustrate a second individual mold half 160. It is understood that the first individual mold half 158 is similar in all respects to the second individual mold half 160, except that the first individual mold half 158 is rotated 180 degrees when attached to the upper die set 74. The components of the first and second individual mold halves 158,160 may be secured to together by one or more horizontally-extending fasteners 156 and/or dowel pins.

In more detail, the first and second individual body mold halves 162,164 are each directly and independently coupled to the first or second die set 74,76, respectively, via vertically-extending fasteners 156, and each are configured to define at least a portion of the exterior shape of the body of one of the injection molded parisons. The first and second individual body mold halves 162,164 may be formed by milling, molding, or otherwise machining various select materials, such as such as tool steel, stainless steel, Royalloy, H-13, or the like.

Additionally, the first and second individual neck mold halves 166,168 are and independently coupled to corresponding first and second individual body mold halves 162,164, respectively, via horizontally-extending fasteners 156 and/or dowel pins, and each are configured to define at least a portion of the exterior shape of the neck of one of the injection molded parisons. The first and second individual neck mold halves 166,168 may be formed by milling, molding, or otherwise machining various select materials, such as tool steel, stainless steel, Royalloy, H-13, or the like.

Furthermore, the first and second interlock insert halves 170,172 may each be independently coupled to corresponding first and second individual neck mold halves 166,168, respectively, via horizontal fasteners 156 and/or dowel pins, and/or to the first or second die set 74,76, respectively, via vertically-extending fasteners 156. The first and second individual interlock insert halves 170,172 may be formed by milling, molding, or otherwise machining various select materials, such tool steel, stainless steel, Royalloy, H-13, or the like.

Each pair of corresponding first and second individual body mold halves 162,164 cooperatively defines the exterior shape of the body of one of the parisons, and each pair of corresponding first and second individual neck mold halves 166,168 cooperatively defines the exterior shape of the neck of one of the parisons. In some embodiments, the split parison assembly 110 of the injection station 46 may comprise at least two, four, or six of the individual body mold halves 162,164, at least two, four, or six of the individual neck mold halves 166,168, and at least two, four, or six of the individual interlock insert halves 170,172.

Figure 10:
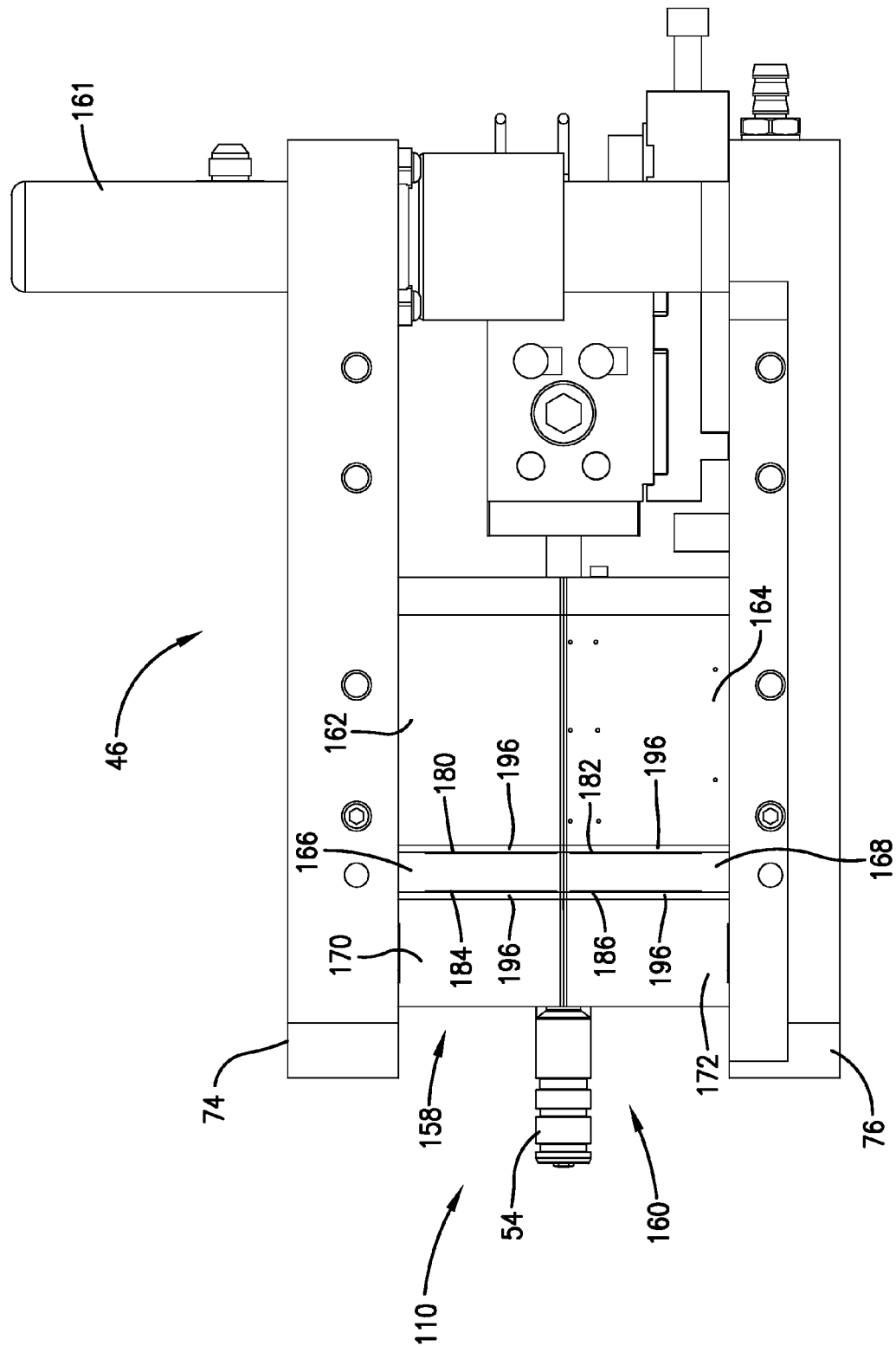
FIG. 10 is a side elevational view of the injection station of FIGS. 4-6 in a closed position.
Figure 11:
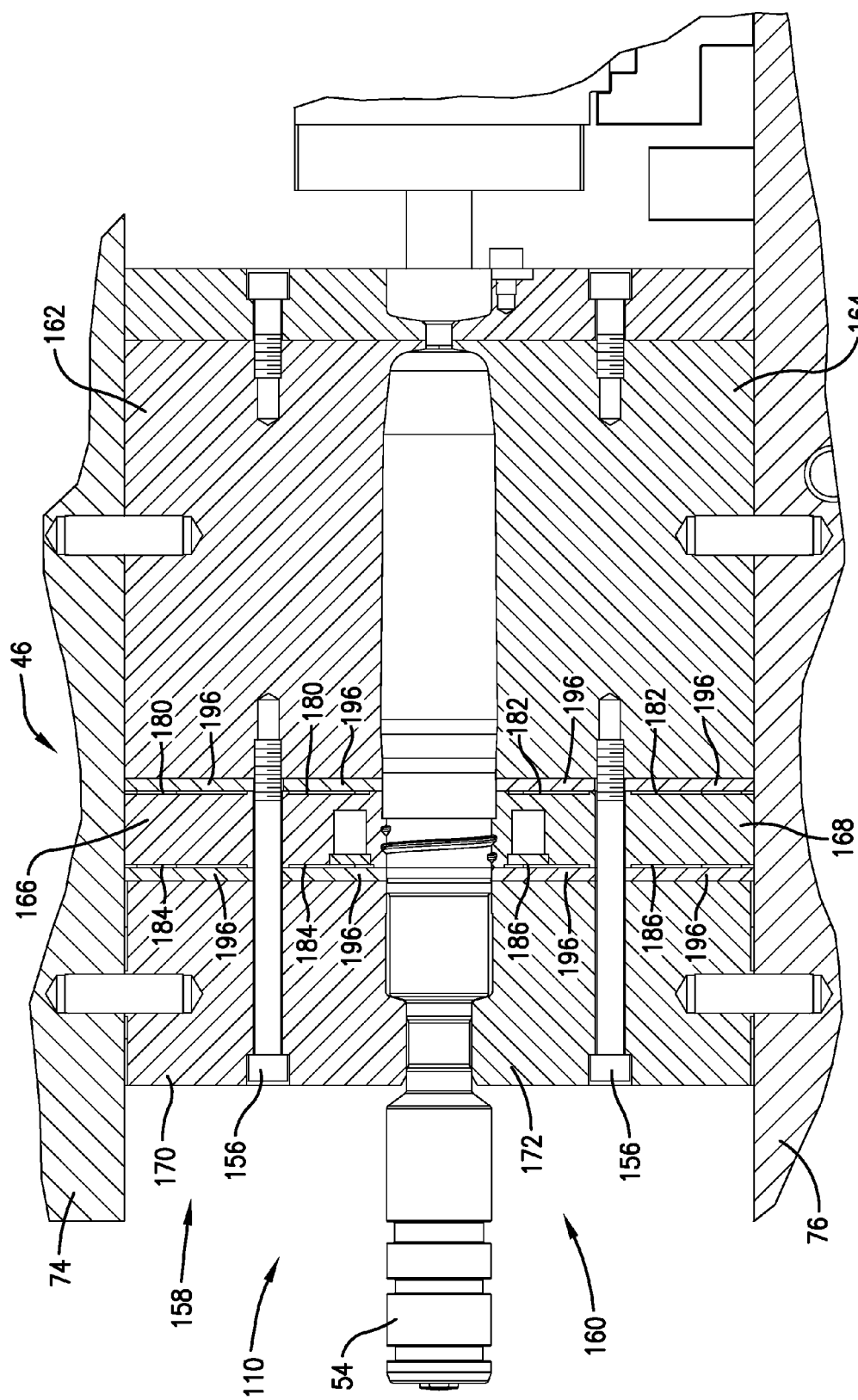
FIG. 11 is a partial cross-section view of the injection station of FIGS. 4-6, taken along the line 11-11 of FIG. 6.

As perhaps best shown in FIGS. 10, 11, and 11a, certain embodiments of the present invention provide for the individual body mold halves 162,164 to be spaced apart from their corresponding individual neck mold halves 166,168 via first upper and lower insulating gaps 180,182. In additional embodiments, the individual neck mold halves 166,168 may each be spaced apart from corresponding individual interlock insert halves 170,172 via second upper and lower insulating gaps 184,186. The insulating gaps 180,182,184,

186 may provide for at least a partial separation of the components of the first and second individual mold halves 158,160 so as to inhibit or reduce heat transfer between the components.

In some embodiments, the insulating gaps 180,182,184, 186 may be presented due to the presence of one or more stand-offs 190 (See FIGS. 8-9 and 12-13), which comprise projections that extend from a front face 192 and from a rear face 194 of each of the individual neck mold halves 166,168. In some embodiments, the stand-offs 190 may extend from the faces 192,194 at corners of the individual neck mold halves 166,168. In other embodiments, the stand-offs 190 may extend from the faces 192,194 generally around an entire circumferential edge of the faces 192, 194. In the specific embodiments illustrated in FIGS. 8-9 and 12-13, the individual neck mold halves 166,168 may include two stand-offs 190 that extend from bottom corners of each of the faces 192, 194 and may also include a third stand-off 190 that extends along a top edge of each of the faces 192, 194, with such top edge being adjacent to and forming part of the parison cavity 86. Nevertheless, embodiments of the present invention may provide for the stand-offs 190 to extend from the faces 192,194 at other positions. For example, as shown in FIGS. 8-9 and 12-13, the neck mold halves 166,168 may include through-holes 195 through which, as will be described in more detail below, horizontal fasteners 156 can pass to secure the neck mold halves 166,168 to the body mold halves 162,164 and/or to the interlock insert halves 170,172. In such embodiments, the neck mold halves 166, 168 may include stand-offs 190 that surround the through-holes 195.

Embodiments of the present invention provide for the stand-offs 190 to extend from the faces 192,194 of the neck mold halves 166,168 between about 0.001 to 0.250 inches, between about 0.010 to 0.100 inches, or between about 0.030 to about 0.050 inches. As such, with the first and second individual neck mold halves 166,168 positioned between the first and second interlock insert halves 170,172 and the first and second individual body mold halves 162, 164, respectively, the insulating gaps 180,182,184,186 may have a thickness of about 0.001 to 0.250 inches, about 0.010 to 0.100 inches, or about 0.030 to about 0.050 inches. In certain other embodiments, the insulating gaps 180,182,184, 186 may have a thickness of about 0.001 to 0.050 inches.

Figure 8:
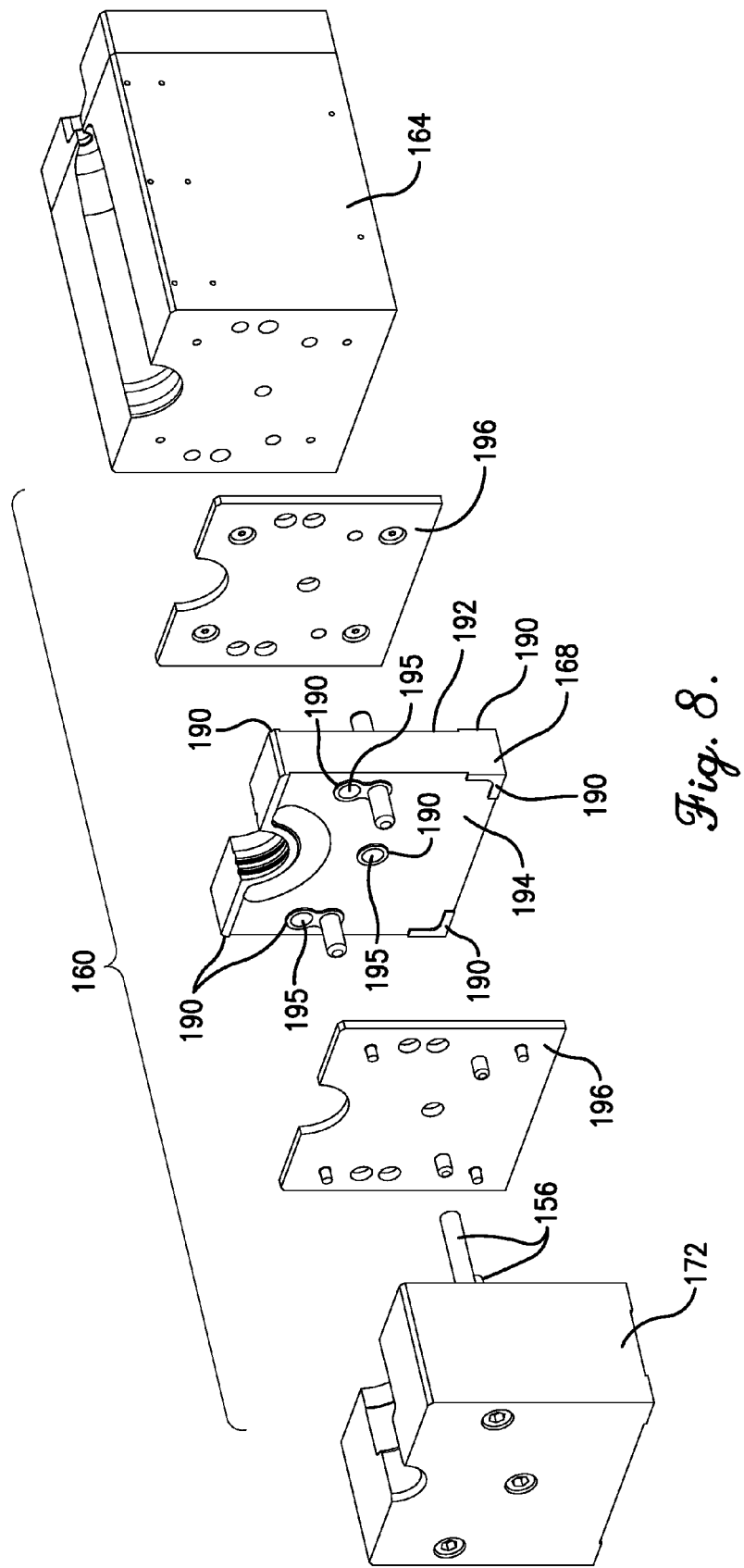
FIG. 8 is a rear isometric exploded view of a second mold half from the split parison mold assembly of FIG. 4.
Figure 9:
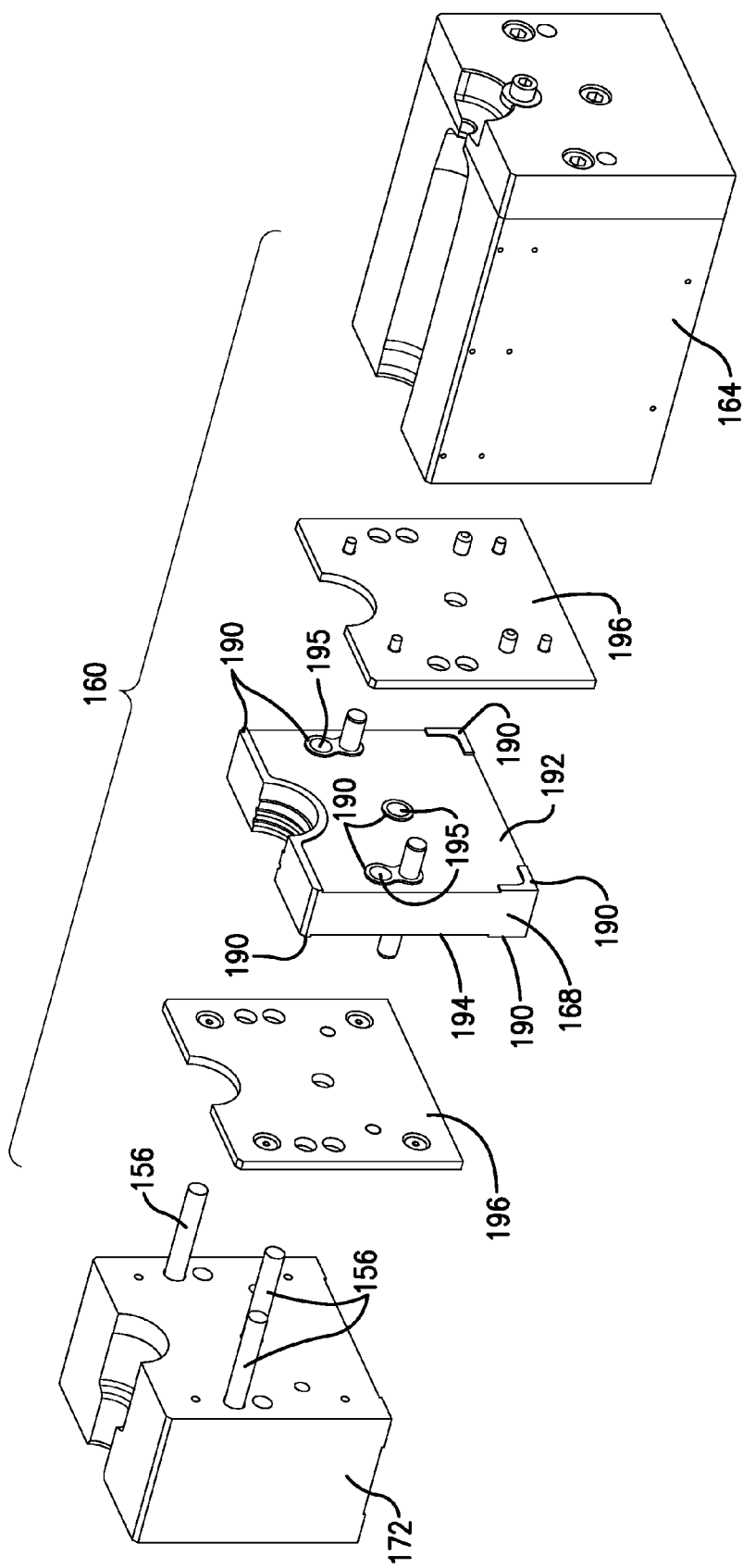
FIG. 9 is a front isometric exploded view of the second mold half from FIG. 8.

As shown in the figures, e.g., FIGS. 8-10, certain embodiments of the present invention may additionally provide for the first and second individual mold halves 158,160 to include one or more thermal barriers 196 operable to be positioned between the first and second individual neck mold halves 166,168 and the first and second individual body mold halves 162,164, respectively. Similarly, the first and second individual mold halves 158,160 may include one or more thermal barriers 196 operable to be positioned between the first and second individual neck mold halves 166,168 and the first and second interlock insert halves 170,172.

As shown in FIGS. 7-9, the thermal barriers 196 may be formed as a rectangular plate from a material having relatively low thermal conduction properties. Such material may, in some embodiments, have a thermal conductance less than that of the material from which the body mold halves 162,164, the neck mold halves 166,168, and/or the interlock insert halves 170,172 are formed. In some embodiments, the thermal barriers 196 will be formed from titanium (or a titanium alloy) or stainless-steel (or a steel alloy). Regardless, certain embodiments provide for the thermal barriers 196 to be formed from materials having a thermal conductivity of less than 25 Btu/(hr-° F.-ft), less than 20 Btu/(hr-° F.-ft), less than 15 Btu/(hr-° F.-ft), or less than 10 Btu/(hr-° F.-ft). Nevertheless, embodiments may provide for the thermal barriers 196 to be formed from other materials having low thermal conductivity properties, such as certain high-temperature ceramics.

The thermal barriers 196 may generally be formed in the shape of a rectangular plate. However, some embodiments, such as illustrated in the drawings, edges of the thermal barriers 196 that are adjacent to the parison cavities 86 will be formed with a shape corresponding to the first and second individual mold halves 158,160. In particular, the edges of the thermal barrier 196 that are adjacent to the parison cavities 86 will form a continuous transition between the first and second body mold halves 162,164 and the first and second neck mold halves 166,168, and/or between the first and second neck mold halves 166,168 and the first and second interlock insert halves 170,172.

With the thermal barriers 196 operably positioned between the components of the first and second individual mold halves 158,160, a first side of the thermal barriers 196 will be adjacent to and/or in contact with the stand-offs 190 extending from the first and second neck mold halves 166,168 and a second side of the thermal barriers 196 will be adjacent to or in contact with the first or second body mold halves 162,164 or the first and second interlock insert halves 170,172. For example, as shown in FIG. 11, for thermal barriers 196 that are positioned between the first and second neck mold halves 166,168 and the first and second body mold halves 162,164, respectively, the thermal barriers 196 will be situated between the first upper insulating gap 180 and the first body mold half 158 or between the first lower insulating gap 182 and the second body mold half 160. Similarly, for thermal barriers 196 that are positioned between the first and second neck mold halves 166,168 and the first and second interlock insert halves 170,172, respectively, the thermal barriers 196 may be positioned between the second upper insulating gap 184 and the first interlock insert half 170 or between the second lower insulating gap 186 and the second interlock insert half 172.

The thermal barriers 196 may have one or more through-holes extending therethrough, such that the horizontally-extending fasteners 156 and/or dowel pins, which secure the components of the first and second individual mold halves 158,160 together, will also extend through the thermal barriers 196 so as to secure the thermal barriers 196 in place. In such configurations, the combination of the thermal barriers 196 and the insulating gaps 180,182,184,186 provide for an enhanced thermal insulation between the components of the first and second individual mold halves 158,160. In particular, embodiments may provide for the combination of a single barrier 196 and one of the insulating gaps 180,182,184,186 to have a thermal conductivity of less than 20 Btu/(hr-° F.-ft), less than 15 Btu/(hr-° F.-ft), less than 10 Btu/(hr-° F.-ft), or less than 5 Btu/(hr-° F.-ft).

As previously described, the individual first and second body mold halves 162,164 and the first and second neck mold halves 166,168 may each include heat transfer channels formed therethrough. As such, temperatures of the body mold halves 162,164 and the neck mold halves 166,168 can be independently controlled. For example, in some embodiments, it may be preferable for the body mold halves 162,164 to maintain a temperature of at least 190, 200, or 210 degrees Fahrenheit, and/or not more than 270, 260, or 250 degrees Fahrenheit. Such temperatures are preferred so as to allow for proper injection molding of the parison in the injection station 46 and, subsequently, for proper blow molding of the parison at the blowing station 48. Alternatively, in some embodiments, it may be preferable for the neck mold halves 166,168 to main a temperature of at least 50, 75, or 100 degrees Fahrenheit, and/or not more than 175, 150, or 125 degrees Fahrenheit. Such relatively lower temperature (with respect to the body mold halves 162,164) may be preferred so as to allow for the neck portion of the parison to be molded with an appropriate finish and/with an appropriate integrity. To alleviate unwanted heat transfer between the high temperature body mold halves 162,164 and the low temperature neck mold halves 166,168, embodiments of the present invention provide for the first upper and lower insulating gaps 180,182 and the thermal barriers 196 to thermally insulate the neck mold halves 166,168 from the body mold halves 162,164, so as to restrict heat flow and to efficiently maintain preferred temperature differences therebetween.

In certain embodiments, the interlock insert halves 170, 172 of the injection station 46 may or may not have their temperatures directly controlled by heat transfer channels. Nonetheless, it may be preferred for the interlock insert halves 170,172 to be operated a temperature that is relatively higher than that of the neck mold halves 166,168. For example, it may be it may be preferred for the interlock insert halves 170,172 to be operated at room temperature. In certain specific embodiments, it may be preferred for the interlock insert halves 170,172 to be operated at a temperature of at least 60, 70, or 80 degrees Fahrenheit, and/or not more than 120, 110, or 100 degrees Fahrenheit. Such increased temperature (with respect to the neck mold halves 166,168) may be preferred so as not to allow heat to be extracted from parisons through the core rod 54. In particular, portions of the core rod 54 may be supported by and may contact portions of the interlock insert halves 170,172. As such, the core rod 54 will be thermally associated with the interlock insert halves 170,172. As previously described, once resin has been injected in the parison cavity 86 and the parisons have been formed, the core rod 54 will support the parison for transfer to and for blow molding at the blowing station 48. It is preferred that the parison retain much of the inherent heat that it had when it was injection molded. As such, if the interlock insert halves 170,172 are permitted to cool below their preferred temperature, such as by being in efficient thermal contact with the neck mold halves 166,168, the interlock insert halves 170,172 may extract heat from the parisons through core rod 54. To alleviate such unwanted heat transfer, embodiments of the present invention provide for the upper and lower insulating gaps 184,186 and the thermal barriers 196 to thermally insulate the interlock insert halves 170,172 from the neck mold halves 166,168 so as to restrict heat flow and to efficiently maintain preferred temperature differences therebetween.

As detailed above, embodiments of the present invention provide for the first upper and lower insulating gaps 180,182 and the thermal barriers 196 to thermally insulate the body mold halves 162,164 and the neck mold halves 166,168 so as to restrict heat flow and to efficiently maintain preferred temperature differences therebetween. Additionally, the second upper and lower insulating gaps 184,186 and the thermal barriers 196 thermally insulate the neck mold halves 166,168 and the interlock insert halves 170,172 so as to restrict heat flow and to efficiently maintain preferred temperature differences therebetween. Furthermore, in addition to maintaining preferred temperatures of independent components of the mold halves 158,160, embodiments of the present invention additionally allow for the injection station 46 to have a quick start-up process, to operate with short injection mold cycles (so as to increase the parison production rate), and to process the parisons more efficiently.

Although the embodiments described above describe a single insulation gap on each side of both the neck mold halves 166,168, embodiments of the present invention may provide for two insulation gaps to be present between the neck mold halves 166,168 and the body mold halves 162, 164 and between the neck mold halves 166,168 and the interlock insert halves 170,172. Specifically, embodiments may provide for an insulation gap to be present on both sides of the thermal barriers 196. To accomplish such, each of the faces of the first and second body mold halves 162,164 and the interlock insert halves 170,172 that are in contact with the thermal barriers 196 may also include stand-offs extending therefrom. As such, an insulation gap may be present between the first and second body mold halves 162,164 and the thermal barrier 196 and between the interlock insert halves 170,172 and the thermal barriers 196.

Given the configuration provided above, the injection molding process performed with the injection station 46 embodiments illustrated in FIGS. 3A and 4-13 includes moving the split parison mold assembly 78 from the open to the closed position, with the core rods 54 disposed within the parison cavities 86, then injecting resin into the plurality of parison cavities 86 to form the parisons. Heat transfer fluid may be passed through the heat transfer channels of the injection station 46. Advantageously, the insulating gaps 180,182,184,186 and the thermal barriers 196 inhibit heat flow, such that the body mold halves 162,164, the neck mold halves 166,168, and the interlock insert halves 170,172 can maintain their preferred temperatures.

In addition to providing for thermal insulation of components of the injection station 46, as described above, embodiments of the present invention provide for thermal insulation of components of the blowing station 48. In more detail, FIGS. 14-17 illustrate a blowing station 48 configured in accordance with embodiments of the present invention. The blow station 48 comprises a split blow mold assembly 210 including a plurality of first individual mold halves 258 and a plurality of second individual mold halves 260, each independently attached to respective die sets 62,64 in a spaced-apart configuration. As used herein, the term "independently coupled" denotes connection of a first component to a second component in a manner such that disconnection and removal of the first component from the second component does not require disconnection of any fasteners other than the fasteners that contact and connect both the first or second components. In other embodiments, the split blow mold assembly 210 may comprise primarily monolithic components. For example, the individual mold halves 258 may be formed together as an integral, monolithic unit. And, similarly, the individual mold halves 260 may be formed together as a integral, monolithic unit.

Figure 14:
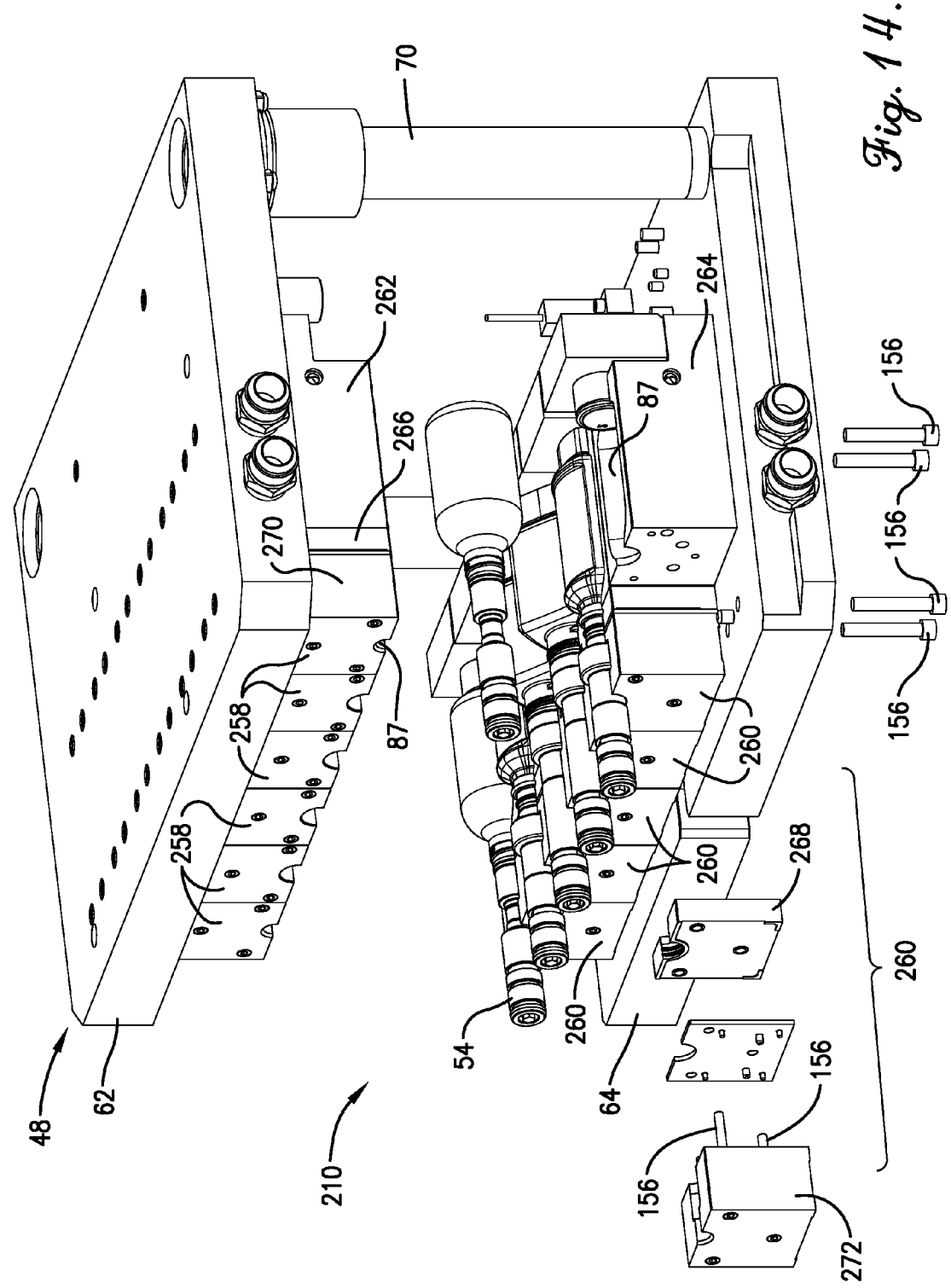
FIG. 14 is an isometric view of a blowing station configured in accordance with a second embodiment of the present invention, particularly illustrating the blowing station in an open position with a split blow mold assembly including a plurality of first and second mold halves attached two die sets, with the first and second mold halves comprising first and second body mold halves, first and second neck mold halves, and first and second interlock insert halves, respectively, with one of the second mold halves shown partially exploded from the die sets.

Returning to the embodiments of FIGS. 14-17, with the plurality of separated individual mold halves 258,260, each of the first individual mold halves 258 has a corresponding one of the second individual mold halves 260 with which it cooperates to define a single blow cavity 87 (See FIG. 14). In certain embodiments, each of the first individual mold halves 258 are horizontally-spaced from one another to thereby form gaps therebetween, and each of the second individual mold halves 260 are horizontally-spaced from one another to thereby form gaps therebetween. As such, each of the first individual mold halves 258 may be coupled to the first die set 62 by one or more vertically-extending mounting fasteners 156 (not shown), and each of the second individual mold halves 260 may be coupled to the second die set 64 by one or more vertically-extending mounting fasteners 156. In this embodiment of the blowing station 48, vertically-extending mounting fasteners 156 may be the only means used to couple the first and second individual mold halves 258,260 to the first and second die sets 62,64, respectively.

The plurality of first and second individual mold halves 258,260 may each comprise a first and second individual body mold half 262,264, a first and second individual neck mold half 266,268, and a first and second individual interlock insert half 270,272 respectively. Such components are perhaps best illustrated in FIGS. 15-16, which illustrate a second individual mold half 260. It is understood that the first individual mold half 258 is similar in all respects to the second individual mold half 260, except that the first individual mold half 258 is rotated 180 degrees when attached to the upper die set 62. The components of the first and second individual mold halves 258,260 may be secured to together by one or more horizontally-extending fasteners 156 and/or dowel pins.

In more detail, the first and second individual body mold halves 262,264 are each directly and independently coupled to the first or second die sets 62,64, respectively, via vertically-extending fasteners 156, and each are configured to define at least a portion of the exterior shape of the body of one of the blow-molded articles. The first and second individual body mold halves 262,264 may be formed by milling, molding, or otherwise machining various select materials, such as stainless steel, aluminum, copper, Ampco 940, or the like. In some specific embodiments, it may be preferable for the first and second individual body mold halves 262,264 to be formed from a material having a relatively high thermal conductivity, such as aluminum or Ampco 940.

The first and second individual neck mold halves 266,268 are each directly and independently coupled to corresponding first and second individual body mold halves 262,264, respectively, via horizontally-extending fasteners 156, and each are configured to define and/or support at least a portion of the exterior of the neck of one of the blow-molded articles. The first and second individual neck mold halves 266,268 may be formed by milling, molding, or otherwise machining various select materials, such as tool steel, stainless steel, Royalloy, H-13, or the like.

Furthermore, the first and second interlock insert halves 270,272 may each be directly and independently coupled to corresponding first and second individual neck mold halves 266,268, respectively via horizontally-extending fasteners 156, and/or coupled to the first or second die sets 62,64, respectively, via vertically-extending fasteners 156. The first and second individual interlock insert halves 270,272 may be formed by milling, molding, or otherwise machining various select materials, such as tool steel, stainless steel, Royalloy, H-13, or the like.

Each pair of corresponding first and second individual body mold halves 262,264 may cooperatively define the exterior shape of the body of one of the molded articles, and each pair of corresponding first and second individual neck mold halves 266,268 may cooperatively define the exterior shape of the neck of one of the molded articles. In some embodiments, the split blow mold assembly 210 of the blowing station 48 may comprise at least two, four, or six of the individual body mold halves 262,264, at least two, four, or six of the individual neck mold halves 266,268, and at least two, four, or six of the individual interlock insert halves 270,272.

Figure 18:
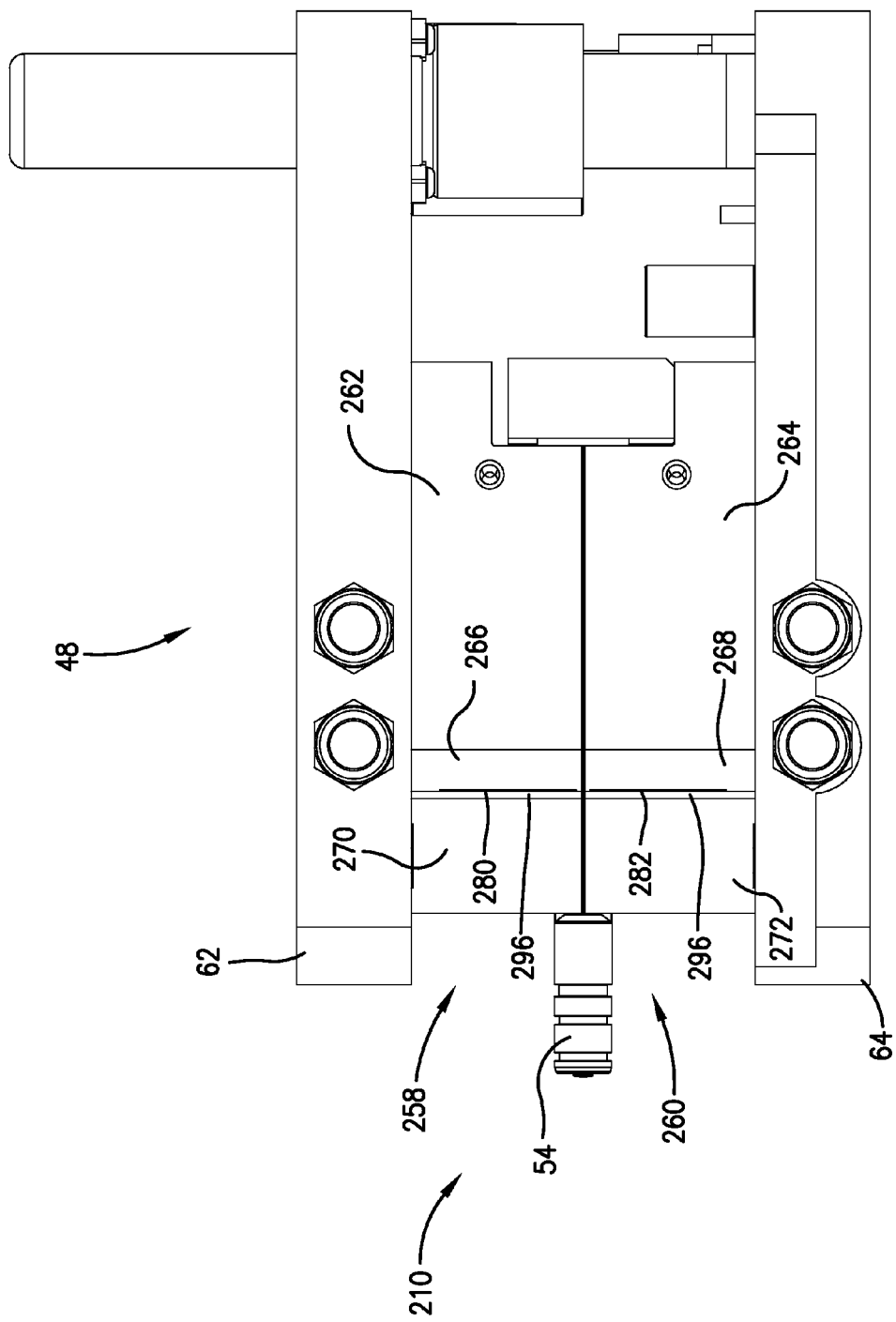
FIG. 18 is a side elevational view of the injection station of FIGS. 14 and 17 in a closed position.
Figure 19:
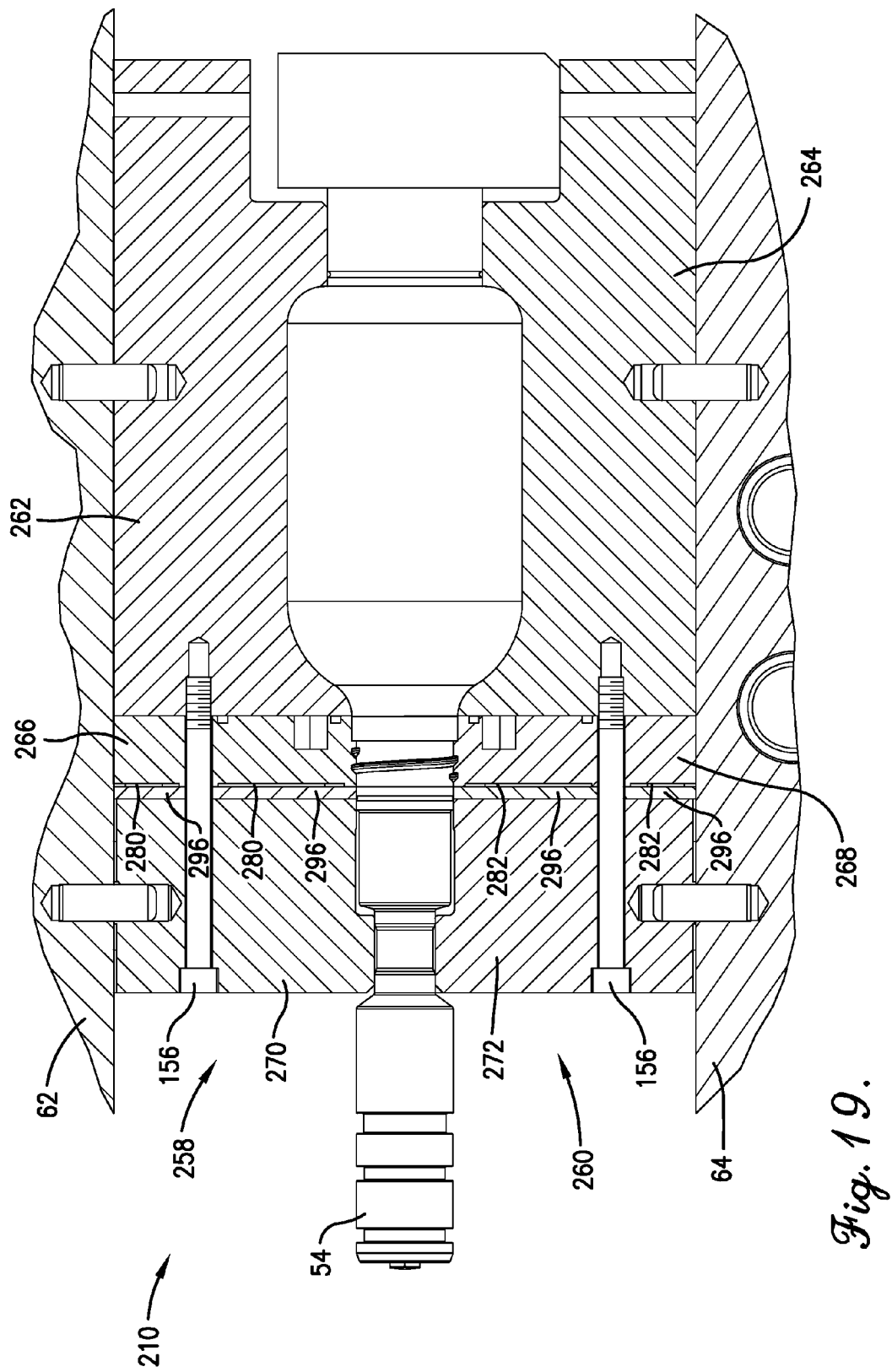
FIG. 19 is a partial cross-section view of the injection station of FIGS. 14 and 17-18, taken along the line 19-19 of FIG. 17.

As illustrated in FIGS. 18-19a, certain embodiments of the present invention provide for the individual neck mold halves 266,268 to be spaced apart from their corresponding the individual interlock insert halves 270,272 via upper and lower insulating gaps 280,282, respectively. The insulating gaps 280,282 may provide for at least a partial separation of the components of the first and second individual mold halves 258,260 so as to inhibit or reduce heat transfer between the components.

In some embodiments, the upper and lower insulating gaps 280,282 may be created by one or more stand-offs 290 extending from a rear face 294 of each of the individual neck mold halves 266,268. It is noted that a front face 292 of each of the individual neck mold halves 266,268 may not include stand-offs 290 extending therefrom. In some embodiments, the stand-offs 290 (See FIGS. 15-16 and 20-21) may extend from the rear faces 294 generally near the corners of the individual neck mold halves 266,268. In other embodiments, the stand-offs 290 may extend from the rear faces 294 generally about a circumferential edge of the faces 294. In still other embodiments, such as illustrated in FIGS. 15-16 and 20-21, the individual neck mold halves 266,268 may each include two stand-offs 290 that extend from bottom corners of each of the rear faces 294 and may also include a third stand-off 290 that extends along a top edge of each of the rear faces 294 that are adjacent to and that form part of the blow cavities 87. Nevertheless, embodiments may also provide for stand-offs 290 to extend from the rear faces 294 at other positions of the individual neck mold halves 266,268. For example, as shown in FIGS. 15-16 and 20-21, the neck mold halves 266,268 may include through-holes 295 through which, as will be described in more detail below, horizontally-extending fasteners 156 and/or dowel pins can pass to secure the neck mold halves 266,268 in place with the body mold halves 262,264 and/or the interlock insert halves 270,272. In such embodiments, the neck mold halves 266,268 may include stand-offs 290 that surround the through-holes 295.

Embodiments provide for the stand-offs 290 to extend from the rear faces 294 of the neck mold halves 266,268 between about 0.001 to 0.250 inches, between about 0.010 to 0.100 inches, or between about 0.030 to about 0.050 inches. As such, with the first and second individual neck mold halves 266,268 positioned between the first and second interlock insert halves 270,272 and the first and second individual body mold half 262,264, respectively, the upper and lower insulating gaps 280,282 may have a thickness of at least about 0.001 to 0.250 inches, about 0.010 to 0.100 inches, or about 0.030 to about 0.050 inches. In certain other embodiments, the insulating gaps 280,282 may have a thickness of about 0.001 to 0.050 inches.

Figure 15:
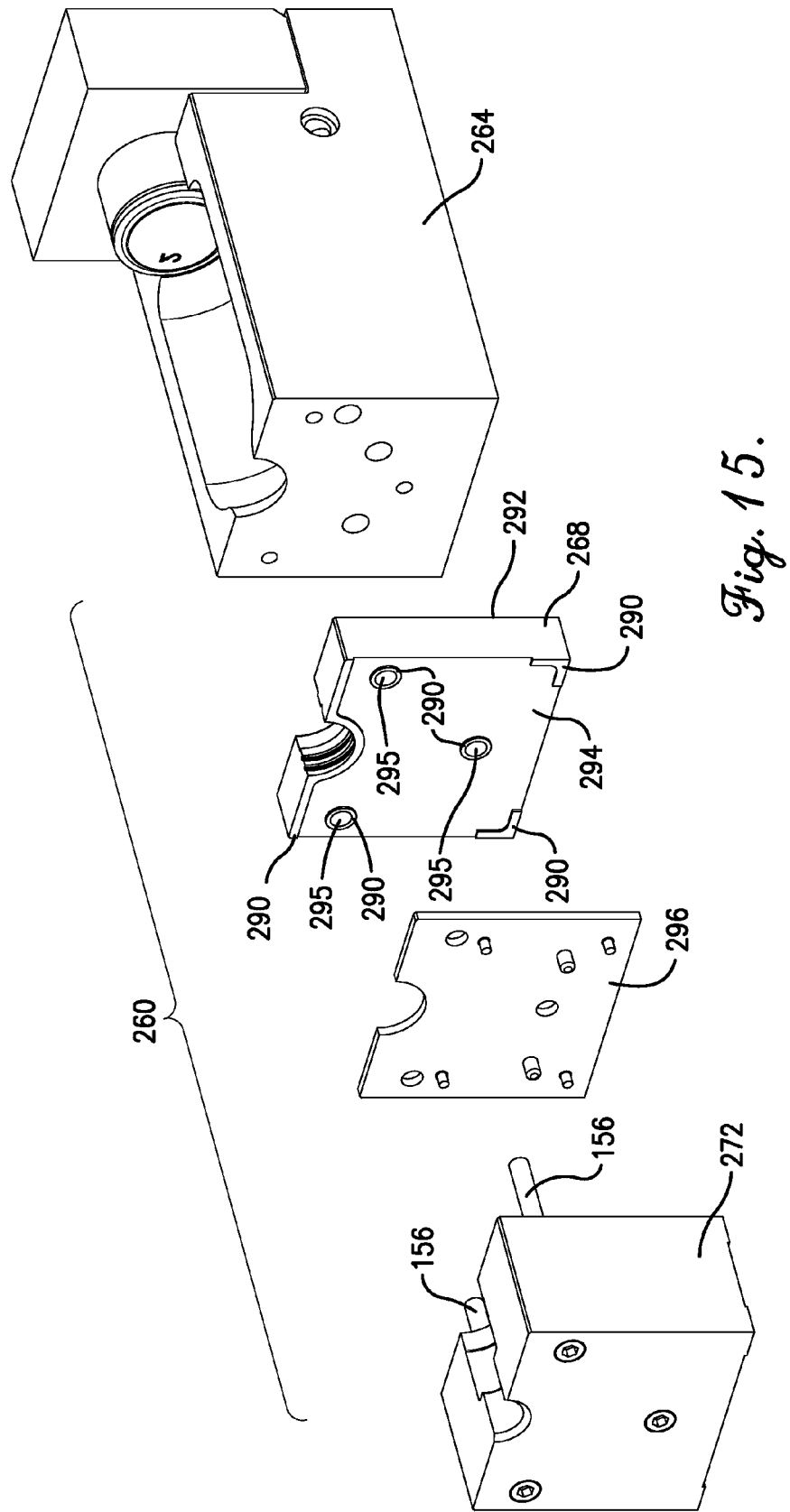
FIG. 15 is a rear isometric exploded view of a second mold half from the split blow mold assembly of FIG. 14.
Figure 16:
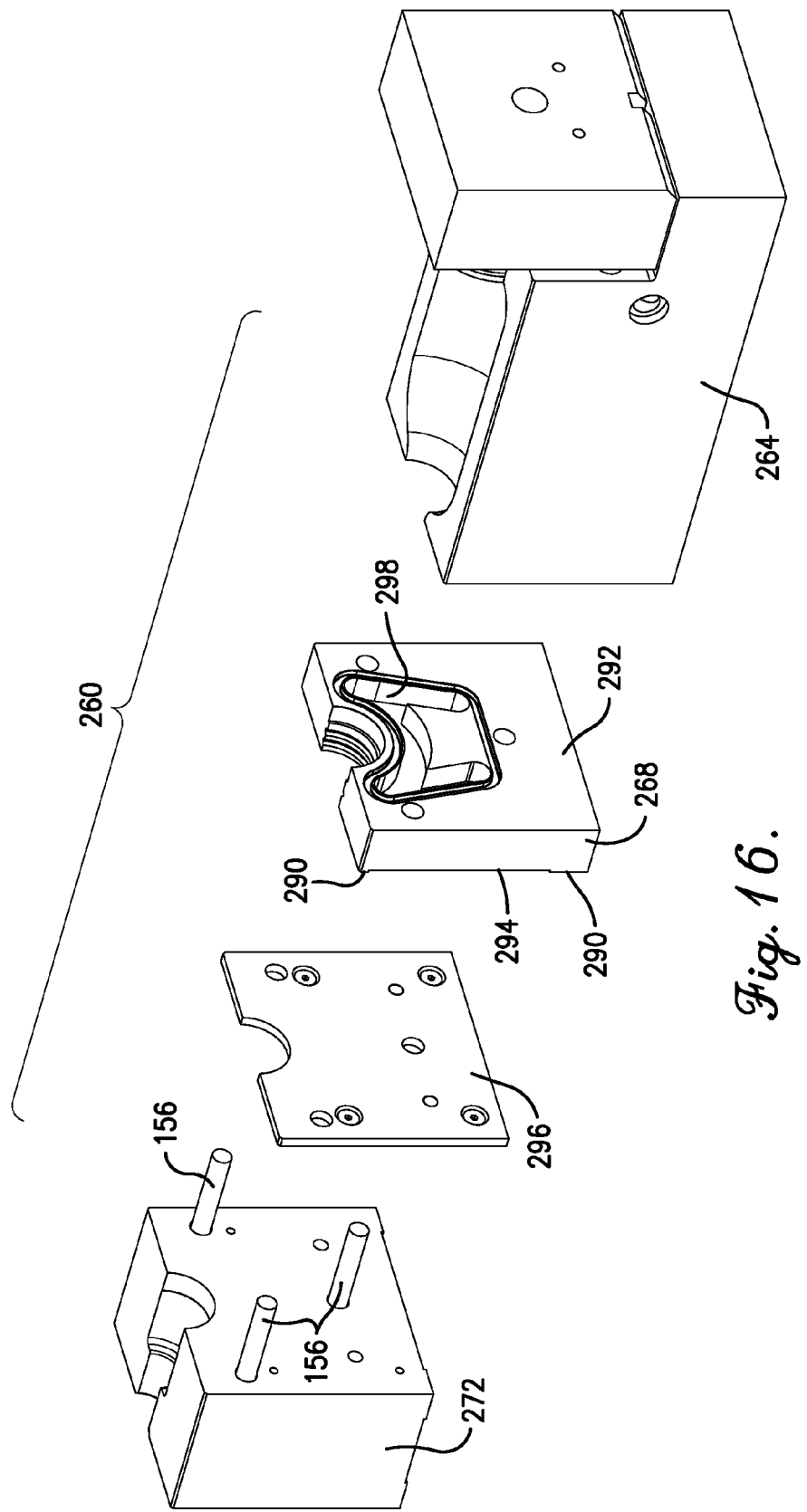
FIG. 16 is a front isometric exploded view of the second mold half from FIG. 15.
Figure 17:
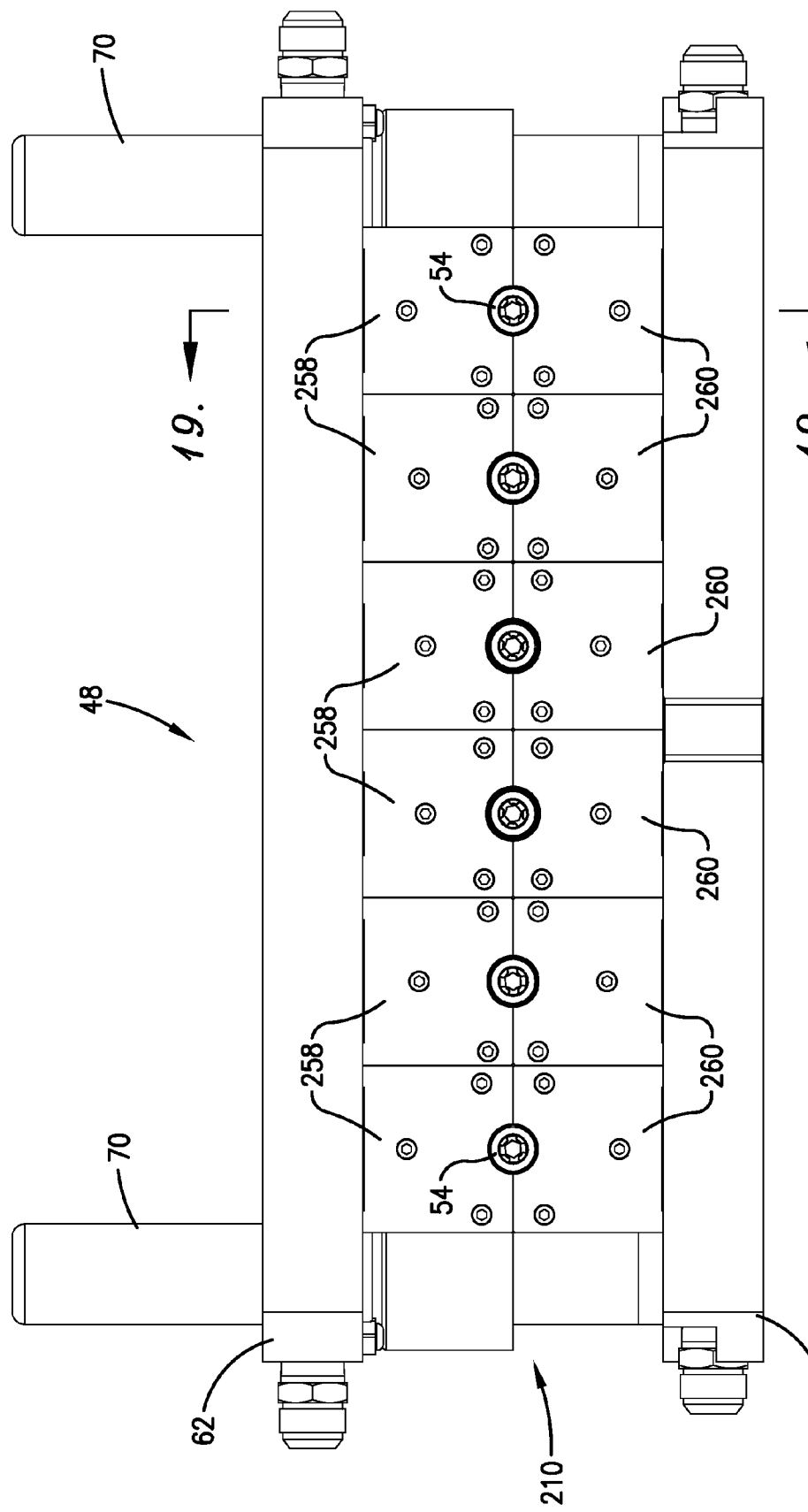
FIG. 17 is a front plan view of the blowing station of FIG. 14 in a closed position.

As shown in the drawings, e.g., FIGS. 14-16, certain embodiments of the present invention may additionally provide for the first and second individual mold halves 258,260 to include one or more thermal barriers 296 positioned between the first and second individual neck mold halves 266,268 and the first and second interlock insert halves 270,272. The thermal barriers 296 may be formed as a plate of low-thermal conducting material. Such material may, in some embodiments, have a thermal conductance that is less than that of the material from which the neck mold halves 266,268 and/or the interlock inset halves 270,272 are formed. As such, in some embodiments, the thermal barriers 296 may be formed from materials that include titanium (or a titanium alloy) or stainless-steel (or a steel alloy). Nevertheless, embodiments may provide for the thermal barriers 296 to be formed from other materials having sufficient heat and thermal conductivity properties, such as certain high-temperature ceramics. For example, some embodiments provide for the thermal barriers 296 to be formed from materials having a thermal conductivity of less than 25 Btu/(hr-° F.-ft), less than 20 Btu/(hr-° F.-ft), less than 15 Btu/(hr-° F.-ft), or less than 10 Btu/(hr-° F.-ft).

With reference to FIGS. 14-16, the thermal barriers 296 may generally be formed in the shape of a rectangular plate. However, some embodiments, such as illustrated in the drawings, provide for a top edge of each of the thermal barriers 296 that are adjacent to the blow cavities 87 to have shapes corresponding with the first and second individual mold halves 258,260. In particular, the top edges of the thermal barrier 296 that are adjacent to the blow cavities 87 will form a continuous transition between the first and second neck mold halves 266,268 and the first and second interlock insert halves 270, 272.

With the thermal barriers 296 situated between the components of the first and second individual mold halves 258,260, the thermal barriers 296 will be adjacent to and/or in contact with the stand-offs 290 that extend from the first and second neck mold halves 266,268. As such, the thermal barriers 296 may be positioned between the upper and lower insulating gaps 280,282 and the first and second body interlock insert halves 270,272, respectively. The thermal barriers 296 may be formed with one or more through-holes extending therethrough, such that the horizontally-extending fasteners 156 and/or dowel pins that secure the components of the first and second individual mold halves 258,260 together will similarly extend through the thermal barriers 296 to thereby secure the thermal barriers 296 in place. In such a configuration, the combination of the thermal barriers 296 and the insulating gaps 280,282 provide for an enhanced thermal insulation between the components of the first and second individual mold halves 258,260. In particular, embodiments may provide for the combination of one of the thermal barriers 292 and one of the insulating gaps 280,282 to have thermal conductivity of less than 20 Btu/(hr-° F.-ft), less than 15 Btu/(hr-° F.-ft), less than 10 Btu/(hr-° F.-ft), or less than 5 Btu/(hr-° F.-ft).

Figure 21:
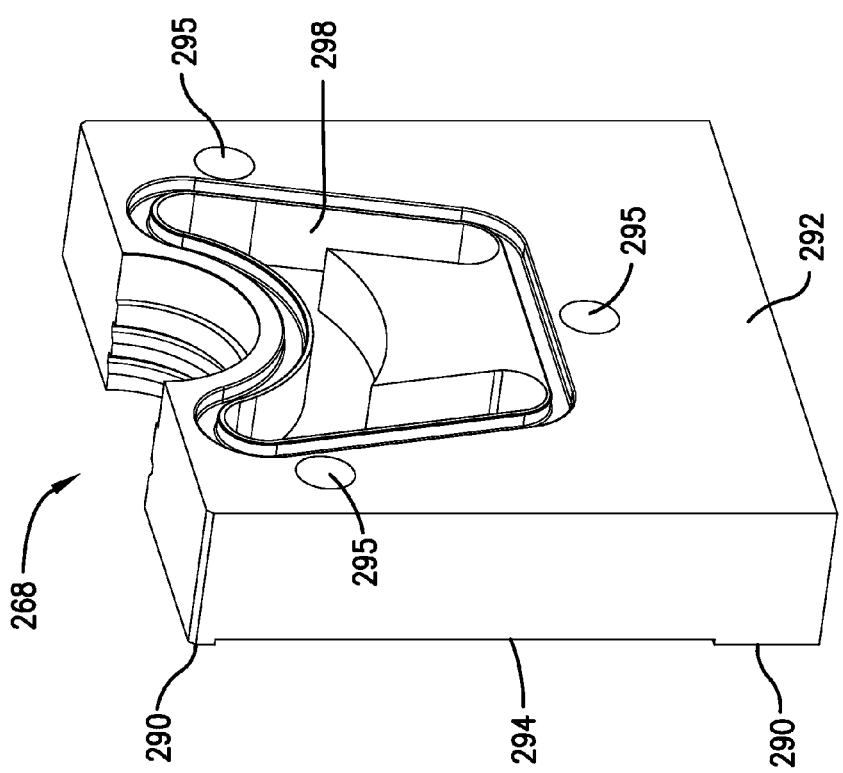
FIG. 21 is a front isometric view of the second neck mold half from FIG. 20.
Figure 20:
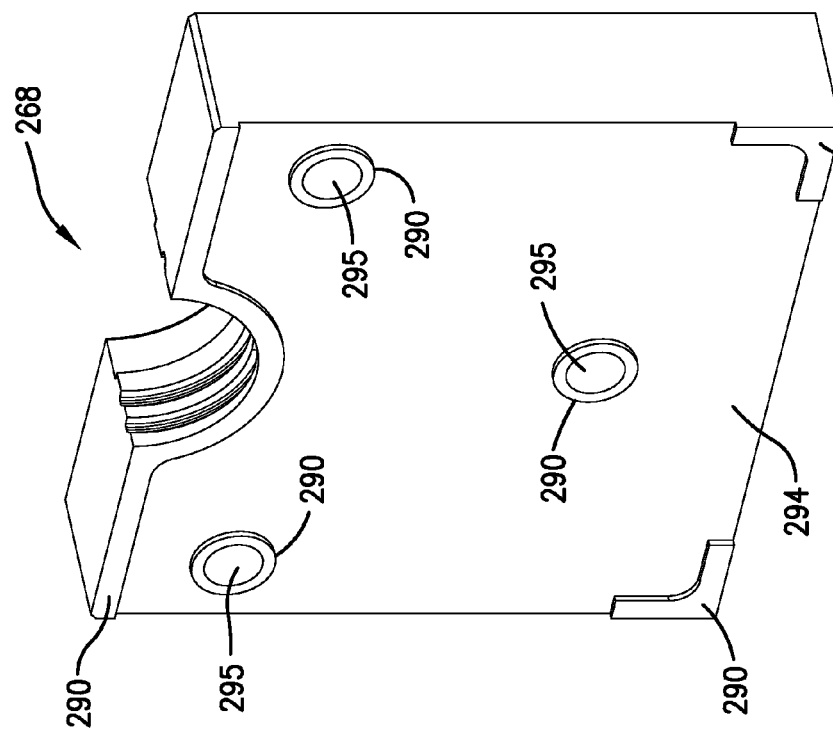
FIG. 20 is a rear isometric view of a second neck mold half from FIG. 14.

In certain embodiments, the individual first and second body mold halves 262,264 may have heat transfer channels formed therein, so as to control the temperatures of the body mold halves 262,264. For example, in some embodiments, it may be preferable for the body mold halves 262,264 to be at least 35, 45, or 55 degrees Fahrenheit, and/or not more than 85, 75, or 65 degrees Fahrenheit. Such temperatures are preferred so as to quickly cool the molded article after it has been blow-molded from the parison. In certain embodiments, the neck mold halves 266,268 may not include their own heat transfer channels. Nevertheless, it may be preferable for the neck mold halves 266,268 to be have a temperature that similar to that of the body mold halves 262,264. For example, in some embodiments, it may be preferable for the neck mold halves 266,268 to be at least 35, 45, or 55 degrees Fahrenheit, and/or not more than 85, 75, or 65 degrees Fahrenheit. Such a temperature may be preferred so as maintain the finish or the integrity of the neck portion of the molded article during blow molding. The temperature of the neck mold halves 266,268 may be directly or indirectly controlled via the heat transfer channels of the body mold halves 262,264. For example, as shown in FIGS. 16 and 21, the front side 292 of each of the neck mold halves 266,268 may include a trough 298 formed therein. The trough 298 may be fluidly connected with the heat transfer channels of the first or second body mold halves 262,264, such that the heat transfer fluid flowing through the heat transfer channels will also flow through the trough 298 to cool the associated neck mold half 266,268. In other embodiments, the neck mold halves 266,268 and the body mold halves 262,264 will be in direct contact, which allows heat to transferred efficiently therebetween via conduction. Regardless, the temperature of the neck mold halves 266,268 will be associated with that of the body mold halves 262,264.

The interlock insert halves 270,272 of the blowing station 48 may or may not have their temperatures directly controlled by their own heat transfer channels. Nonetheless, it may be preferred for the interlock insert halves 270,272 to be operated a temperature that is relatively higher than that of the neck mold halves 266,268 and/or the body mold halves 262,264. For example, it may be it may be preferred for the interlock insert halves 270,272 to be operated at room temperature. In certain specific embodiments, it may be preferred for the interlock insert halves 270,272 to be operated at a temperature of at least 60, 70, or 80 degrees Fahrenheit, and/or not more than 120, 110, or 100 degrees Fahrenheit. Such increased temperature (with respect to the neck mold halves 266,268 and/or the body mold halves 262,264) may be preferred so as not to allow heat to be extracted from the core rod 54 through the interlock insert halves 270,272. In particular, portions of the core rod 54 may be supported by and may contact portions of the interlock insert halves 270,272. As such, the core rod 54 will be thermally associated with the interlock insert halves 270,272. As previously described, the core rod 54 will be supporting the parison after injection molding, during transfer to the blowing station 48, and during blow molding at the blowing station 48. During the process, it is preferred that the parison retain much of the inherent heat that it was formed with at the injection station 46. As such, if the interlock insert halves 270,272 are cooled below their preferred temperature, such as by being in efficient thermal contact with the neck mold halves 266,268 and/or the body mold halves 262,264, the interlock insert halves 270,272 may extract heat from the parison through core rod 54. To alleviate such unwanted heat transfer, embodiments of the present invention provide for the upper and lower insulating gaps 280,282 and the thermal barriers 296 to thermally insulate the interlock insert halves 270,272 from the neck mold halves 266,268 so as to restrict heat flow and to efficiently maintain preferred temperature differences therebetween.

As such, embodiments of the present invention provide for the first upper and lower insulating gaps 280,282 and the thermal barriers 296 to thermally insulate the neck mold halves 266,268 and the interlock insert halves 270,272 so as to restrict heat flow and to efficiently maintain preferred temperature differences therebetween. In addition to maintaining preferred temperatures, embodiments of the present invention additionally allow for the blow station 48 to have a quick start-up process, to operate with short blow cycles (so as to increase the molded article production rate), and to process the parisons and molded articles more efficiently.

Although the embodiments described above describe a single insulating gap between the first and second neck mold halves 266,268 and the first and second interlock insert halves 270,272, respectively, embodiments of the present invention may provide for two insulating gaps to be present between the first and second neck mold halves 266,268 and the first and second interlock insert halves 270,272. Specifically, embodiments may provide for an insulating gap to be present on both sides of the thermal barriers 296. To accomplish such, the faces of the first and second interlock insert halves 270,272, which are in contact with the thermal barriers 296, may include stand-offs extending therefrom. As such, an insulating gap may be present between the first and second interlock insert halves 270,272 and the thermal barriers 296.

Given the configuration described above, the blow molding process performed with the blowing station 48 embodiment illustrated in FIGS. 14-21 includes moving the split blow mold assembly 210 from the open to the closed position, with the core rods 54 and the parisons disposed within the blow cavities 87. Air is then injected into an interior of the parisons such that the parisons are blow molded into a molded article having a final shape defined by the blow cavities 87. Advantageously, the insulting gaps 280,282 and the thermal barriers 296 inhibit heat flow, such that the body mold halves 262,264, the neck mold halves 266,268, and the interlock insert halves 270,272 can maintain their preferred temperatures.

Figure 22:
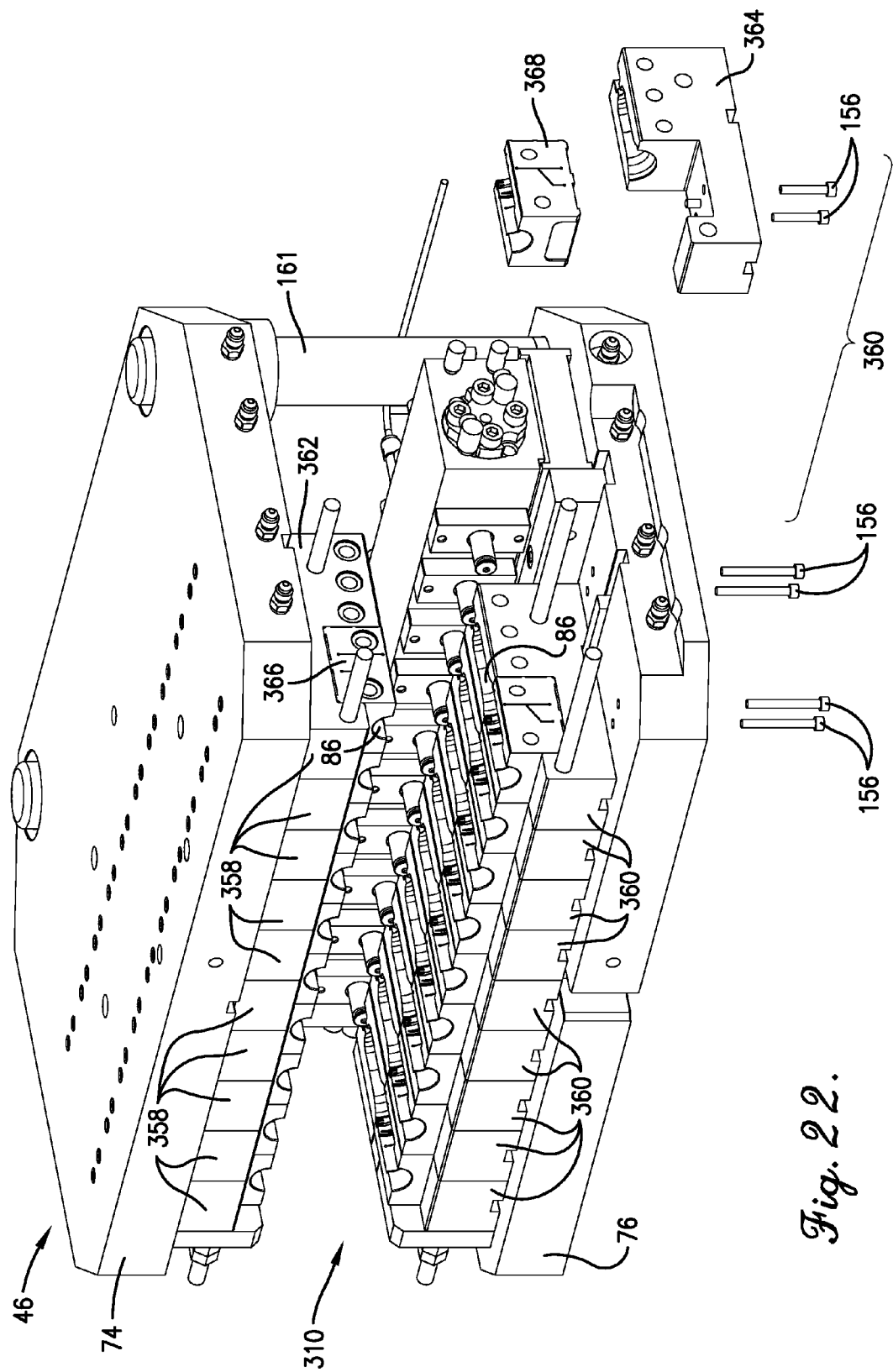
FIG. 22 is an isometric view of an injection station configured in accordance with a third embodiment of the present invention, particularly illustrating the injection station in an open position with a split parison mold assembly including a plurality of first and second mold halves attached two die sets, with the first and second mold halves comprising first and second body mold halves and first and second removable insert halves, respectively, with one of the second mold halves shown partially exploded from the die sets.
Figure 23:
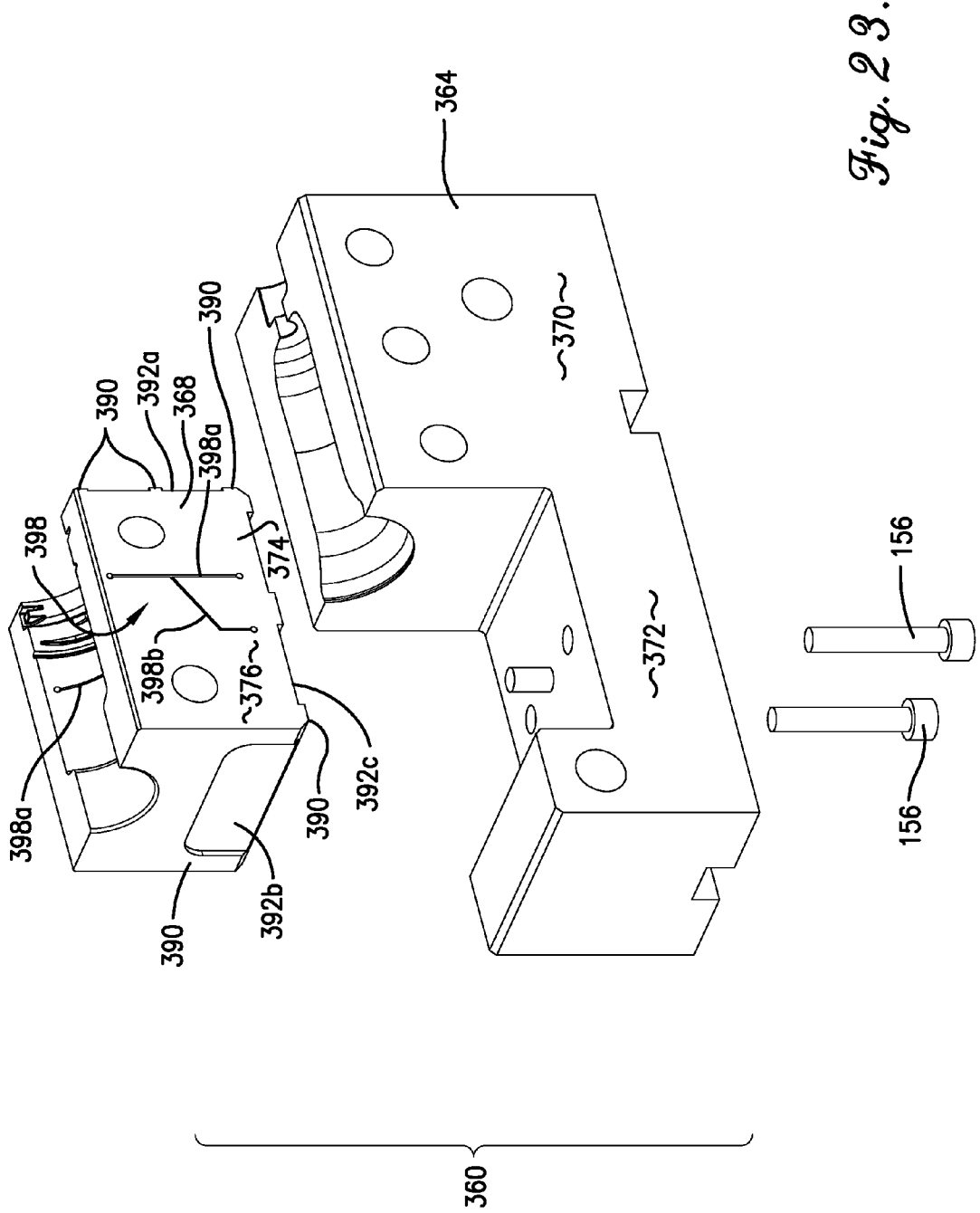
FIG. 23 is a rear isometric exploded view of a second mold half from the split parison mold assembly of FIG. 22.
Figure 24:
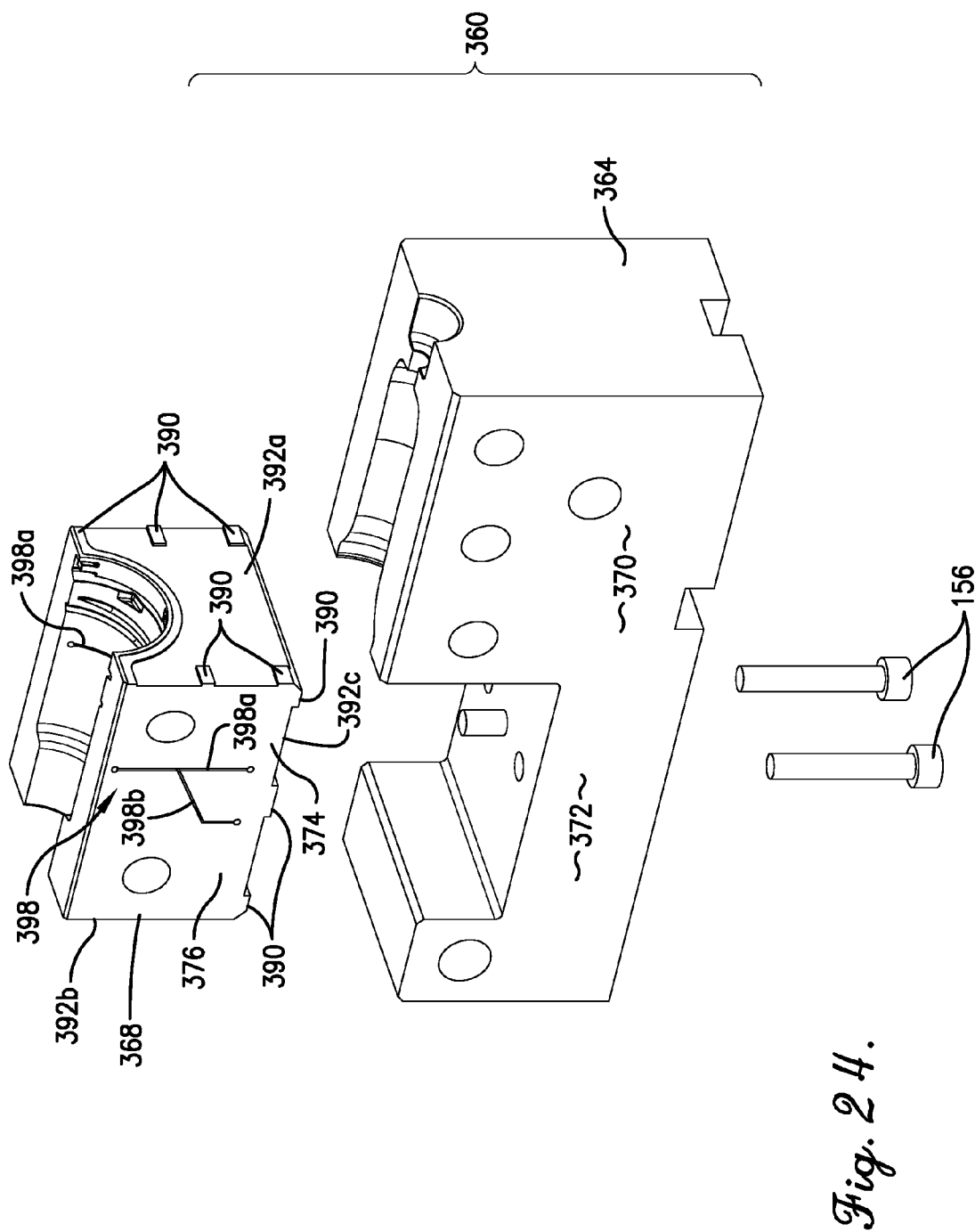
FIG. 24 is a front isometric exploded view of the second mold half from FIG. 23.
Figure 25:
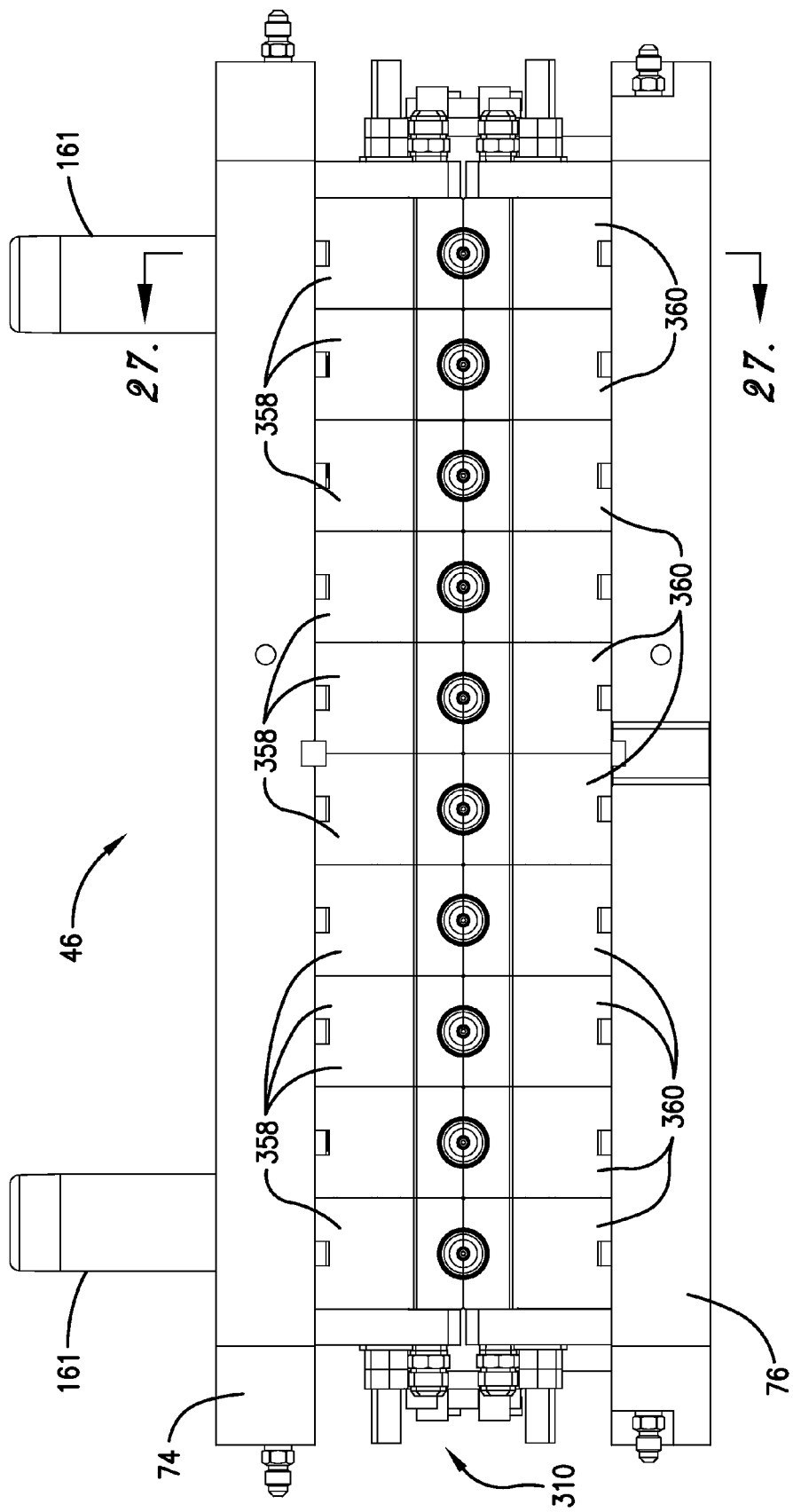
FIG. 25 is a front plan view of the injection station of FIG. 22 in a closed position.

In addition to providing for thermal insulation of components of the embodiments of the injection station 46 and blow station 48, as described and illustrated above in FIGS. 4-21, embodiments of the present invention provide for thermal insulation of components for other injection station 46 and blowing station 48 embodiments. For example, FIGS. 22 and 25 show injection station 46 configured in accordance with another embodiment of the invention that is similar in many respects to the injection station of embodiment of FIGS. 4-13 but also differs in certain details. In FIGS. 22 and 25, the split parison mold assembly 310 includes a plurality of first individual mold halves 358 and a plurality of second individual mold halves 360, each independently attached to their respective die sets 74,76 in a spaced-apart configuration. In other embodiments, the split parison mold assembly 310 may comprise primarily monolithic components. For example, the first individual mold halves 358 may be formed together as an integral, monolithic unit. Similarly, the second individual mold halves 360 may be formed together as a integral, monolithic unit.

Remaining with the embodiments illustrated in FIGS. 22-25, with the plurality of separated individual mold halves 358,360, each of the first individual mold halves 358 has a corresponding one of the second individual mold halves 360 with which it cooperates to define a single parison cavity 86 (See FIG. 22). However, in other embodiments, the first and second mold halves 358,360 may comprise multi-cavity blocks, such that each cooperatively define multiple parison cavities 86. Depending upon the number of parison cavities 86 desired for a particular set of tooling, the specific arrangement can vary widely. For example, all of the first and second mold halves 358,360 could be multi-cavity, all could be single-cavity, or there could be a combination of multi and single-cavities, e.g., within each line, multi-cavity blocks could be interspersed with single-cavity blocks, or the number of cavities in adjacent multi-cavity blocks could differ.

In certain embodiments, each of the first individual mold halves 358 are horizontally-spaced from one another to thereby form gaps therebetween, and each of the second individual mold halves 360 are horizontally-spaced from one another to thereby form gaps therebetween. As such, each of the first individual mold halves 358 may be coupled to the upper die set 74 by one or more vertically-extending mounting fasteners 156 (not shown), and each of the second individual mold halves 360 may be coupled to the lower die set 76 by one or more vertically-extending mounting fasteners 156 (See FIG. 22). In this embodiment of the injection station 46, vertically-extending mounting fasteners 156 may be the only means used to couple the first and second individual mold halves 358,360 to the upper and lower die sets 74,76, respectively.

The plurality of first and second individual mold halves 358,360 may respectively comprise a first or second individual body mold half 362,364 and a first or second removable insert half 366,368. Such components are perhaps best illustrated in FIGS. 23-24, which illustrate a second individual mold half 360. It is understood that the first individual mold half 358 is similar in all respects to the second individual mold half 360, except that the first individual mold half 358 is rotated 180 degrees when attached to the upper die set 74. The components of the first and second individual mold halves 358,360 may be secured to together by one or more vertically-extending fasteners 156 and/or dowel pins.

In more detail, the first and second individual body mold halves 362,364 are each directly and independently coupled to the upper and lower die set 74,76, respectively, via vertically-extending fasteners 156. Each of the first and second individual body mold halves 362,364 may includes (1) a body portion 370 configured to define at least a portion of the parison cavity 86 that forms the exterior shape of the body of one of the injection molded parisons, and (2) a receiver portion 372 configured to receive a least a portion of one of the first or second removable insert halves 366,368 The first and second individual body mold halves 362,364 may be formed by milling, molding, or otherwise machining various select materials, such as such as tool steel, stainless steel, Royalloy, H-13, or the like.

The first and second removable insert halves 366,368 are each directly and independently coupled to their corresponding first and second individual body mold halves 362,364, respectively, via horizontally-extending fasteners 156 and/or dowel pins. Each of the first and second removable insert halves 366,368 includes (1) a neck portion 374 configured to define at least a portion of the parison cavity 86 that defines the exterior shape of the neck of one of the injection molded parisons, and (2) an interlock portion 376 configured to support at least a portion of the core rod 54 when the core rod 54 positions a parison within the parison cavity 86. The first and second individual neck mold halves 366,368 may be formed by milling, molding, or otherwise machining various select materials, such as tool steel, stainless steel, Royalloy, H-13, or the like.

Each pair of corresponding first and second individual body mold halves 362,364 cooperatively defines the exterior shape of the body of one of the parisons, and each pair of corresponding first and second removable insert halves 366,368 may cooperatively define the exterior shape of the neck of one of the parisons. In some embodiments, the split parison assembly 310 of the injection station 46 may comprise at least two, four, or six of the individual body mold halves 362,364 and/or at least two, four, or six of the individual removable insert halves 366,368.

Figure 26:
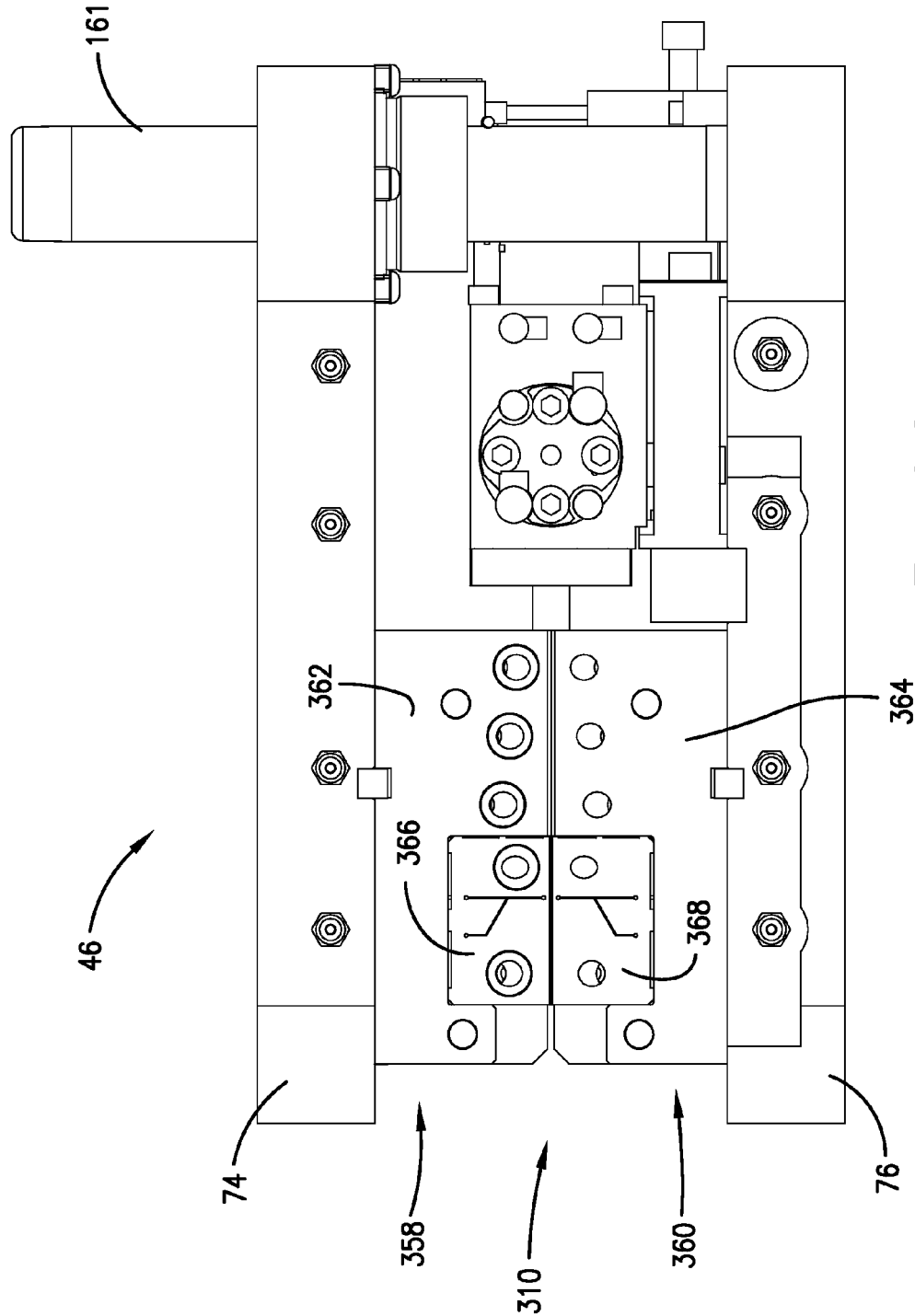
FIG. 26 is a side elevational view of the injection station of FIGS. 22 and 25 in a closed position.
Figure 27A:
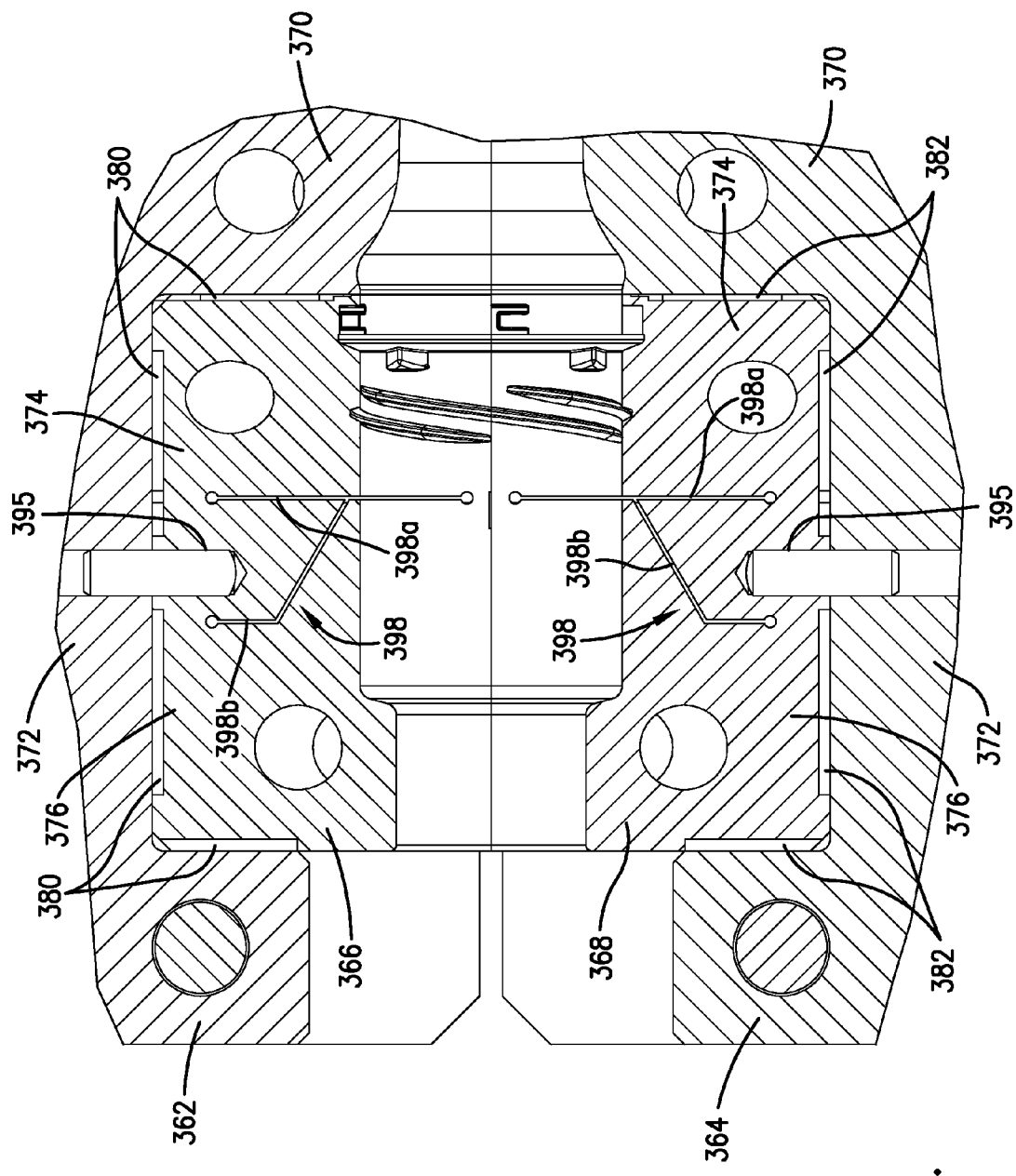
FIG. 27a is an enlarged, partial view of a central portion of the view from FIG. 27.

As shown in FIGS. 26, 27, and 27a, certain embodiments of the present invention provide for the first and second removable insert halves 366,368 to be spaced apart from their corresponding first and second individual body mold halves 362,364 via a plurality of upper and lower insulating gaps 380,382. The insulating gaps 380,382, may provide for at least a partial separation of the components of the first and second individual mold halves 358,360 so as to inhibit or reduce heat transfer between the components.

As perhaps best shown by FIGS. 23-24 and 28-29, the insulating gaps 380,382, may be created by one or more stand-offs 390, which are projections that extend from faces of each of removable insert halves 366,368. Specifically, embodiments may provide for the stand-offs 390 to extend from faces 392a, 392b, and 392c, which are adjacent with and/or in contact with surfaces of the body mold halves 362,364 when the removable insert halves 366,368 are received within the body mold halves 362,364. As illustrated in the FIGS. 23-24 and 28-29, the removable insert halves 366,368 include three faces, i.e., 392a, 392b, and 392c, which are each configured to be positioned adjacent to or in contact with the body mold halves 362,364. For example, face 392a is a vertically-orientated front face that is configured to be positioned closest to the body portion 370 of the body mold halves 362,364. Rear face 392b is a vertically-orientated face that is set apart from front face 392a and is configured to be positioned farthest from the body portion 370 of the body mold halves 362,364. Finally, bottom face 392c is the horizontally-orientated face that extends between faces 392a and 392b.

In some embodiments, the stand-offs 390 may extend from the faces 392a,392b,392c at various positions, such as at the edges of the faces 392a,392b,392c. For example, the stand-offs 390 may extend from the faces 392a,392b,392c generally around an entire circumferential edge of the faces 392a,392b,392c. In other embodiments, the stand-offs 390 may extend generally length or width-wise across the faces 392a,392b,392c of the insert halves 366,368. In the specific embodiments illustrated in FIGS. 23-24 and 28-29, the front faces 392a may include two stand-offs 390 that extend from bottom corners of each of the front faces 392a, two stand-offs 390 that extend from side edges of each of the front faces 392a about midway between a height of the front faces 392a, and may also include a third stand-off 390 that extends along a top edge of each of the front faces 392a, with such top edge being adjacent to and forming part of the parison cavity 86. Nevertheless, embodiments of the present invention may provide for the stand-offs 390 to extend from each of the faces 392a,392b,392c at various other positions. For example, as shown in FIGS. 27 and 27a, the removable insert halves 366,368 may include notches 395 passing through the connecting face 392c, through which vertically-extending fasteners 156 or dowel pins can pass to secure the insert halves 366,368 to the body mold halves 362,364. In such embodiments, the insert halves 366,368 may include stand-offs 390 that surround the notches 395.

Embodiments of the present invention provide for the stand-offs 390 to extend from the faces 392a,392b,392c of the removable insert halves 366,368 between about 0.001 to 0.250 inches, between about 0.010 to 0.100 inches, or between about 0.030 to about 0.050 inches. As such, with the first and second removable insert halves 366,368 received within the first and second individual body mold half 362,364, respectively, the insulating gaps 380,382 may have a thickness of about 0.001 to 0.250 inches, about 0.010 to 0.100 inches, or about 0.030 to about 0.050 inches. In certain other embodiments, the insulating gaps 380,382 may have a thickness of about 0.001 to 0.050.

As was described with reference to the injection station 46 embodiments illustrated in FIGS. 4-13, certain embodiments of the present invention may provide for the first and second individual mold halves 358,360 to also include one or more thermal barriers operable to be positioned between the first and second removable insert halves 366,368 and the first and second individual body mold halves 362,364, respectively. Such thermal barriers may be similar to the thermal barriers 196 previously described. Specifically, embodiments may provide for thermal barriers to be positioned between the front faces 392a of the first and second removable insert halves 366,368 and the first and second individual body mold halves 362,364. The thermal barriers may be operably positioned such that a first side of the thermal barriers will be adjacent to and/or in contact with the stand-offs 390 extending from the front faces 392a of the first and second removable insert halves 366,368, and a second side of the thermal barriers will be adjacent to or in contact with the first or second body mold halves 362,364. The thermal barriers may have one or more through-holes extending therethrough, such that the thermal barriers may be held in place by horizontally-extending fasteners 156 and/or dowel pins.

Regardless of whether the first and second individual mold halves 358,360 include thermal barriers 396, at least the insulating gaps 380,382, will provide for an enhanced thermal insulation between the first and second removable inserts 366,368 and the first and second individual body mold halves 362,364. In particular, the insulating gaps 380,382, may provide for the thermal conductivity between the first and second removable inserts 366,368 and the first and second individual body mold halves 362,364 to be less than 20 Btu/(hr-° F.-ft), less than 15 Btu/(hr-° F.-ft), less than 10 Btu/(hr-° F.-ft), or less than 5 Btu/(hr-° F.-ft).

In addition to the insulating gaps 380,382 located between the first and second removable insert halves 366,368 and the first and second individual body mold halves 362,364, embodiments of the present invention provide for one or more insulating grooves 398 to be formed through at least a potion of each of the first and second removable insert halves 366,368. As perhaps best shown in FIGS. 24-25 and 26-29, the insulating grooves 398 may extend entirely across a width of each of the removable insert halves 366,368, and may extend along a substantial portion of a height of each of the removable insert halves 366,368. For example, embodiments may include a first insulating groove 398a that extends generally vertically through each of the removable insert halves 366,368 so as to separate the neck portion 374 from the interlock portion 376 of each of the removable insert halves 366,368. In such embodiments, the first insulating grooves 398a may extend at least 40 percent, at least 50 percent, or at least 60 percent, and/or no more than 90 percent, no more than 80 percent, or no more than 70 percent the height of each of the removable insert halves 366,368. As such, the first insulating grooves 398a are configured to thermally separate a significant portion of the removable insert halves 366,368, while allowing for the removable insert halves 366,368 to remain a single, unitary piece of material. Additional embodiments of the present invention may provide for each of the removable insert halves 366,368 to include a second insulating groove 398b that extends from the first insulating groove 398a partway into the interlock portion 376 of each removable insert halves 366,368. In such embodiments, the first and second insulating grooves 398a,398b may be configured to at least partially surround the notches 395 that receives the vertically-positioned fasteners 156 and/or dowel pins, such that the first and second insulating grooves 398a,398b thermally isolate a significant portion of the removable inserts 366,368 from the vertically-positioned fasteners 156 and/or dowel pins. Such isolation may be particularly useful when the vertically-positioned fasteners 156 and/or dowel pins are simultaneously in thermal contact with the first and second body mold halves 362,364 and the removable insert halves 366,368.

The insulating grooves 398 may be formed by various methods of machining; however, in certain embodiments, the insulating grooves 398 may be formed by wire electrical discharge machining (EDM). Wire EDM operates to form cuts and/or grooves in a material by sending an electric current through a wire (e.g., a brass wire). With a current traveling through the wire, portions of the material near the wire can be removed via electrical discharge. As such, to create the insulating grooves 398, an initial pilot hole can be formed through a thickness of each of the removable insert halves 366,368. Such pilot holes can be formed by a drill (mechanical, laser, water pick, or the like). Once the pilot hole of a given removable insert 366,368 is formed, the EDM wire can be inserted through the hole and the given removable insert 366,368 can be placed in a dielectric liquid (e.g., de-ionized water). Thereafter, an electric current can be applied to the EDM wire and the wire can be translated to form the required shape of the insulating grooves 398a, 398b. A thickness of the insulating grooves 398a,398b may be dependent on a thickness of the wire used. For example, a 0.010 inch thick wire may be operable to create an insulating groove 398 that is about 0.012 inch thick. Embodiments may provide for the insulating grooves 398 to have a thickness of between about 0.001 to 0.100 inches, about 0.010 to 0.050 inches, or about 0.020 to about 0.040 inches. In certain preferred embodiments, the insulating grooves 398 may have a thickness of about 0.010 to 0.020 inches. In certain other embodiments, the insulating grooves 398 may have a thickness of about 0.001 to 0.050 inches. As such, the insulating grooves 398 may provide a thermal insulation between the neck portion 374 and the interlock portion 376 of each of the first and second removable inserts 366,368, such that the thermal conductive is no more than 20 Btu/(hr-° F.-ft), less than 15 Btu/(hr-° F.-ft), less than 10 Btu/(hr-° F.-ft), or less than 5 Btu/(hr-° F.-ft).

The individual first and second body mold halves 362,364 and the first and second removable insert halves 366,368 may each include heat transfer channels formed therethrough. As such, temperatures of the body mold halves 362,364 and the removable insert halves 366,368 can be independently controlled. For example, in some embodiments, it may be preferable for the body mold halves 362,364 to maintain a temperature of at least 190, 200, or 210 degrees Fahrenheit, and/or not more than 270, 260, or 250 degrees Fahrenheit. Such temperatures may be preferred so as to allow for proper injection molding of the parison in the injection station 46 and, subsequently, for proper blow molding of the parison at the blowing station 48. Alternatively, in some embodiments, it may be preferable for the removable insert halves 366,368, and specifically the neck portion 374 of the removable insert halves 366,368, to main a temperature of at least 50, 75, or 100 degrees Fahrenheit, and/or not more than 175, 150, or 125 degrees Fahrenheit. Such relatively lower temperature (with respect to the body molds halves 362,364) may be preferred so as to allow for the neck portion of the parison to be molded with an appropriate finish and/or integrity. To alleviate unwanted heat transfer between the high temperature of the body mold halves 362,364 and the low temperature neck portion 374 of the removable insert halves 366,368, embodiments of the present invention provide for the upper and lower insulating gaps 380,382 (and/or the thermal barriers 396) to at least partially thermally isolate the body mold halves 362,364 and the removable insert halves 366,368, so as to restrict heat flow and to efficiently maintain preferred temperature differences therebetween.

In certain embodiments, the interlock portion 376 of the removable insert halves 366,368 of the injection station 46 may or may not have their temperatures directly controlled by their own heat transfer channels. Nonetheless, it may be preferred for the interlock portion 376 of the insert halves 366,368 to be operated at a temperature that is relatively higher than that of the neck portion of the removable insert halves 366,368. For example, it may be it may be preferred for the interlock portion 376 of the insert halves 366,368 to be operated at room temperature. In certain specific embodiments, it may be preferred for the interlock portion 376 of the insert halves 366,368 to be operated at a temperature of at least 60, 70, or 80 degrees Fahrenheit, and/or not more than 120, 110, or 100 degrees Fahrenheit. Such increased temperature (with respect to the neck portion of the removable insert halves 366,368) may be preferred so as not to allow heat to be extracted from the parison through the core rod 54. In particular, portions of the core rod 54 may be supported by and may contact parts of the interlock portions 376 of the removable insert halves 366,368. As such, the core rod 54 will be thermally associated with the interlock insert halves 366,368. As previously described, once resin has been injected in the parison cavity 86 and the parison has been formed, the core rod 54 will support the parison for transfer to and for blow molding at the blowing station 48. It is preferred that the parison retain much of the inherent heat that it had when it was injection molded. As such, if the interlock portions 376 of the removable insert halves 366, 368 are permitted to cool below their preferred temperatures, such as by being in efficient thermal contact with the neck portions 374 of the removable insert halves 366,368, the interlock portion 374 may extract heat from the parison through core rod 54. To alleviate such unwanted heat transfer, embodiments of the present invention provide for the insulating grooves 398 to thermally insulate the interlock portions 376 of the removable insert halves 366,368 from the neck portions 374, so as to restrict heat flow and to efficiently maintain preferred temperature differences therebetween.

As detailed above, embodiments of the present invention provide for the upper and lower insulating gaps 380,382 (and/or the thermal barriers 396) to thermally insulate the body mold halves 362,364 from the removable insert halves 366,368 so as to restrict heat flow and to efficiently maintain preferred temperature differences therebetween. Additionally, the insulating grooves 398 thermally insulate the neck portion 374 of the removable insert halves 366,368 from the interlock portion 376 of the removable insert halves 366,368 so as to restrict heat flow and to efficiently maintain preferred temperature differences therebetween. Furthermore, in addition to maintaining preferred temperatures of independent components of the mold halves 358,360, embodiments of the present invention additionally allow for the injection station 46 to have a quick start-up process, to operate with short injection mold cycles (so as to increase the parison production rate), and to process the parisons more efficiently.

Given the configuration provided above, the injection molding process performed with the injection station 46 embodiment illustrated in FIGS. 22-29 includes moving the split parison mold assembly 78 from the open to the closed position, with the core rods 54 disposed within the parison cavities 86, then injecting resin into the plurality of parison cavities 86 to form the parisons. Heat transfer fluid may be passed through the heat transfer channels of the injection station 46. Advantageously, the insulating gaps 380,382 (and/or the thermal barriers 392) and the insulating grooves 398 inhibit heat flow, such that the body mold halves 362,364, the neck portion 374 of the removable insert halves 366,368, and the interlock portion 376 of the removable insert halves 366,368 can maintain there preferred temperatures.

Figure 30:
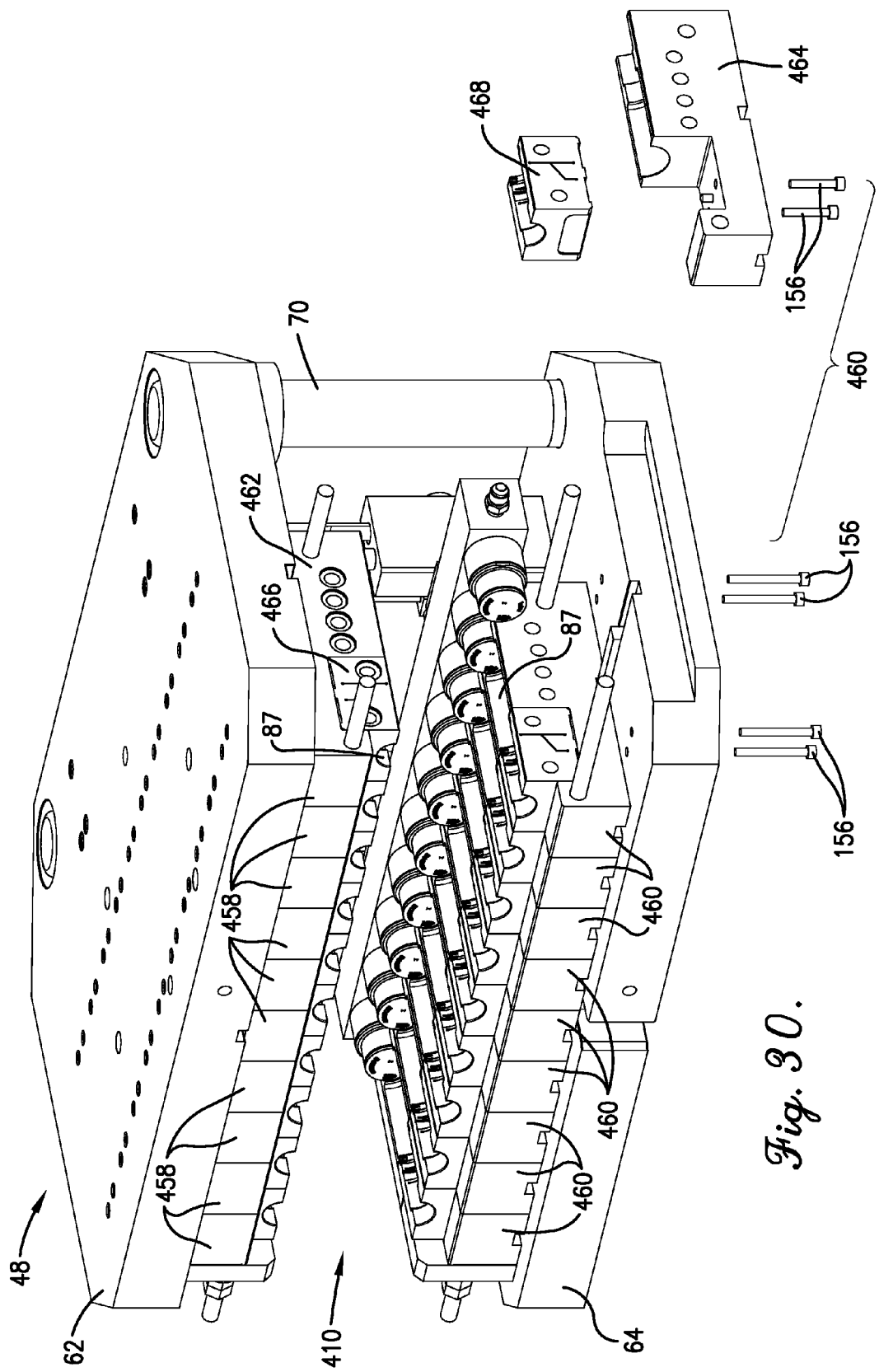
FIG. 30 is an isometric view of a blowing station configured in accordance with a fourth embodiment of the present invention, particularly illustrating the blowing station in an open position with a split blow mold assembly including a plurality of first and second mold halves attached two die sets, with the first and second mold halves comprising first and second body mold halves and first and second removable insert halves, respectively, with one of the second mold halves shown partially exploded from the die sets.
Figure 31:
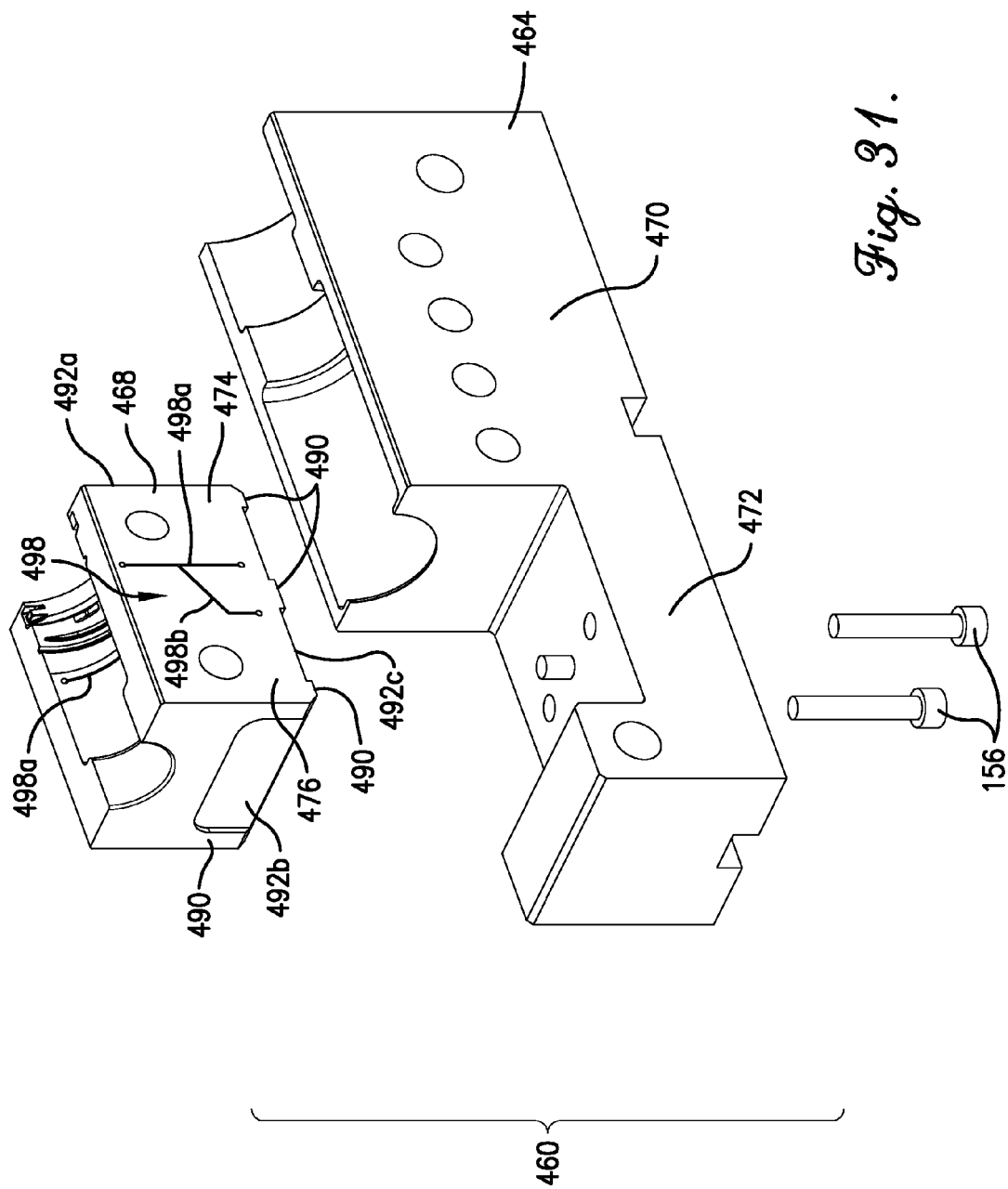
FIG. 31 is a rear isometric exploded view of a second mold half from the split parison mold assembly of FIG. 30.
Figure 32:
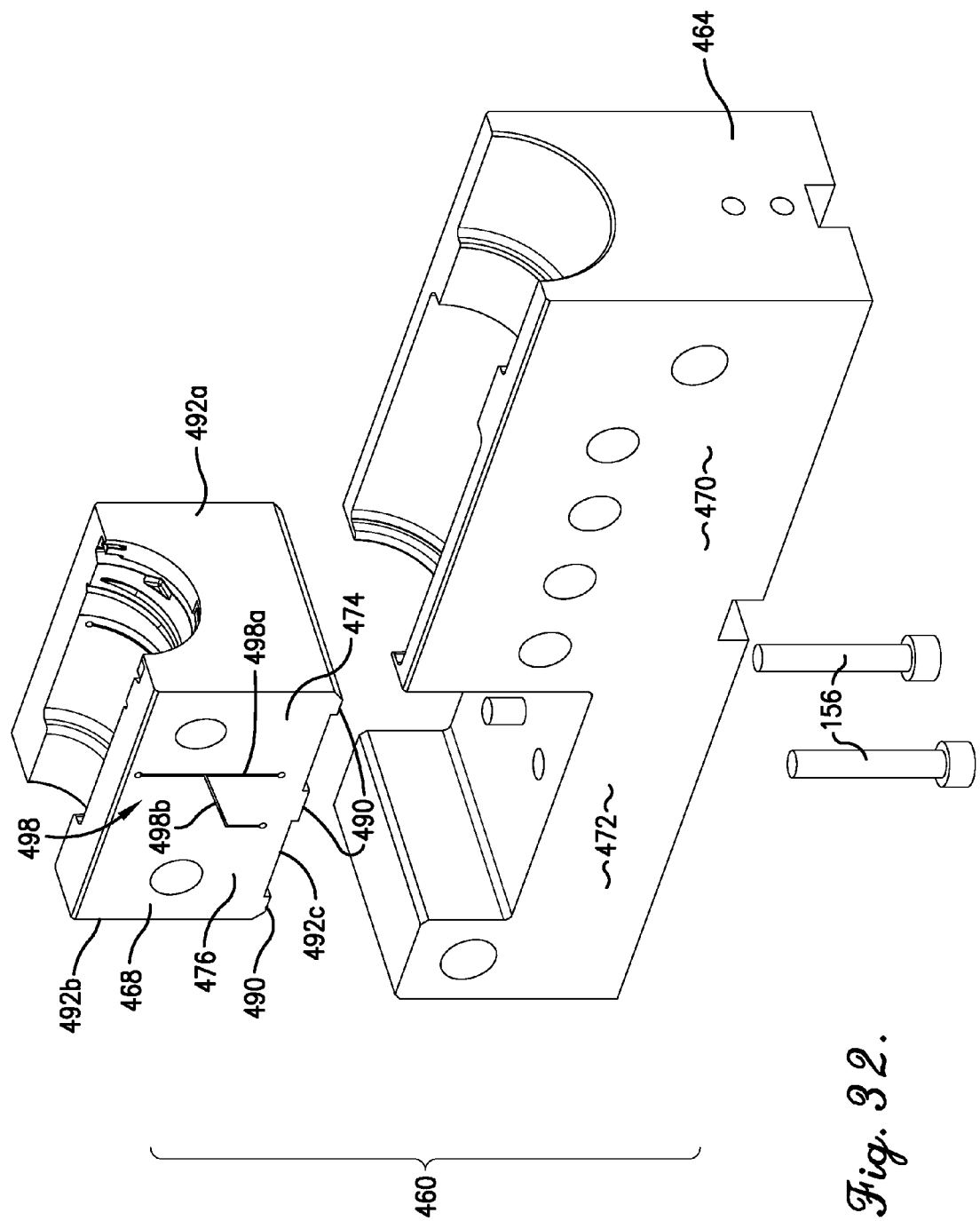
FIG. 32 is a front isometric exploded view of the second mold half from FIG. 31.
Figure 33:
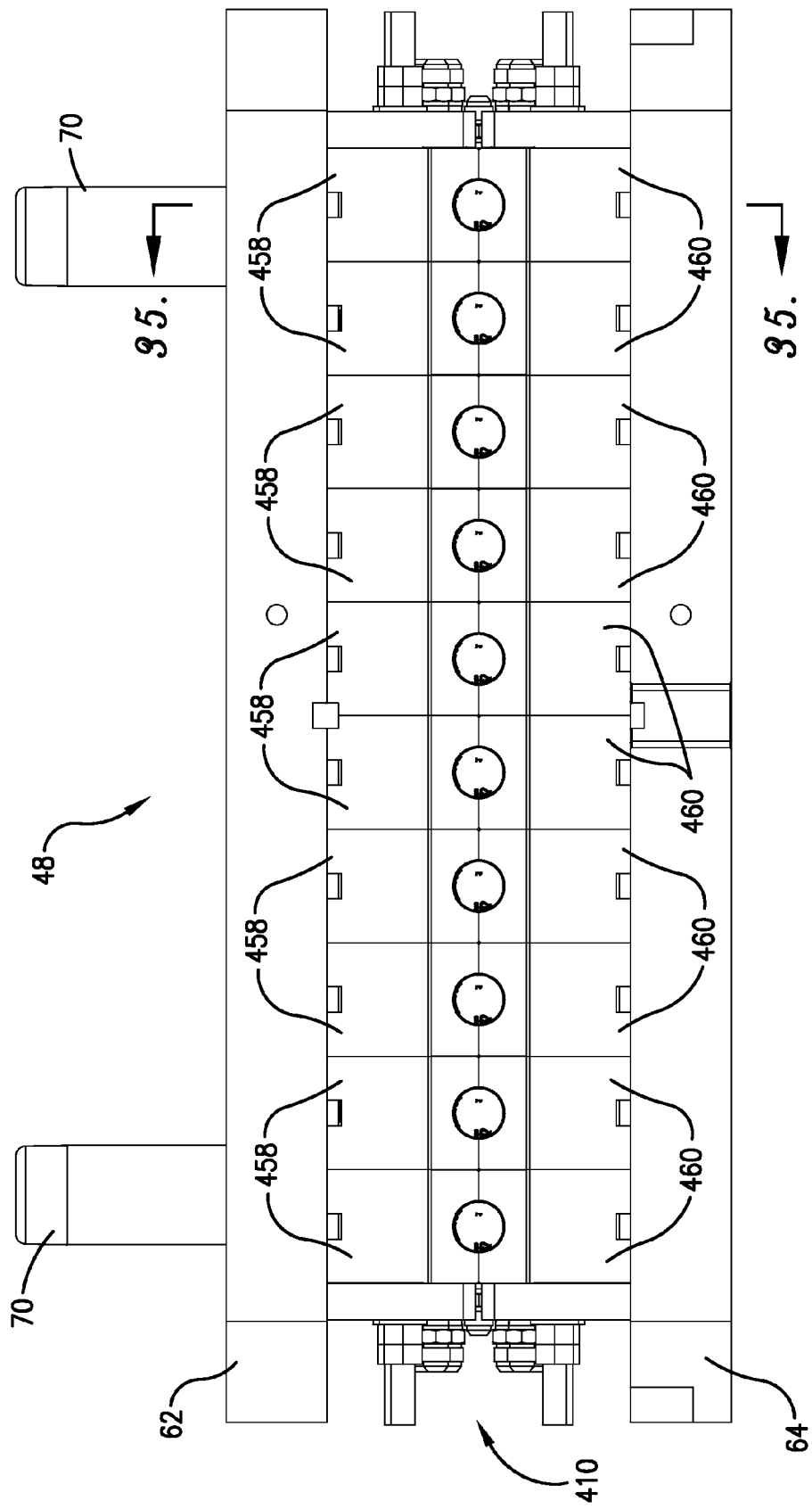
FIG. 33 is a front plan view of the blowing station of FIG. 30 in a closed position.

Turning now to an additional embodiment of a blowing station 48, FIGS. 30 and 33 show a blowing station 48 configured in accordance with another embodiment of the invention that is similar in many respects to the embodiment of FIGS. 14-21 but also differs in certain details. In FIGS. 30 and 33, the split blow mold assembly 410 includes a plurality of first individual mold halves 458 and a plurality of second individual mold halves 460, each independently attached to their respective die sets 62,64 in a spaced-apart configuration. In other embodiments, the split parison mold assembly 410 may comprise primarily monolithic components. For example, the first individual mold halves 458 may be formed together as an integral, monolithic unit. Similarly, the second individual mold halves 460 may be formed together as a integral, monolithic unit.

Returning to the embodiments of FIGS. 30-33, with the plurality of separated individual mold halves 458,460, each of the first individual mold halves 458 has a corresponding one of the second individual mold halves 460 with which it cooperates to define a single blow cavity 87 (See FIG. 30). However, in other embodiments, the first and second mold halves 458,460 may comprise multi-cavity blocks, such that each cooperatively define multiple blow cavities 87. Depending upon the number of cavities desired for a particular set of tooling, the specific arrangement can vary widely. For example, all of the first and second mold halves 458,460 could be multi-cavity, all could be single-cavity, or there could be a combination of multi and single-cavities, e.g., within each line, multi-cavity blocks could be interspersed with single-cavity blocks, or the number of cavities in adjacent multi-cavity blocks could differ.

In certain embodiments, each of the first individual mold halves 458 are horizontally-spaced from one another to thereby form gaps therebetween, and each of the second individual mold halves 460 are horizontally-spaced from one another to thereby form gaps therebetween. As such, each of the first individual mold halves 458 may be coupled to the first die set 62 by one or more vertically-extending mounting fasteners 156 (not shown), and each of the second individual mold halves 460 may be coupled to the second die set 64 by one or more vertically-extending mounting fasteners 156 (See FIG. 30). In such embodiment of the blowing station 48, vertically-extending mounting fasteners 156 may be the only means used to couple the first and second individual mold halves 458,460 to the first and second die sets 62,64, respectively.

The plurality of first and second individual mold halves 458,460 may respectively comprise a first or second individual body mold half 462,464 and a first or second removable insert half 466,468. Such components are perhaps best illustrated in FIGS. 31-32, which illustrate a second individual mold half 460. It is understood that the first individual mold half 458 is similar in all respects to the second individual mold half 460, except that the first individual mold half 458 is rotated 180 degrees when attached to the upper die set 62. Such components of the first and second individual mold halves 458,460 may be secured together by one or more vertically-extending fasteners 156 and/or dowel pins.

In more detail, the first and second individual body mold halves 462,464 are each directly and independently coupled to the first or second die set 62,64, respectively, via vertically-extending fasteners 156. Each of the first and second individual body mold halves 462,464 may include (1) a body portion 470 configured to define at least a portion of the blow cavity 87 that forms the exterior shape of the body of one of the final blow-molded articles, and (2) a receiver portion 472 configured to receive a least a portion of one of the first or second removable insert halves 466,468. The first and second individual body mold halves 462,464 may be formed by milling, molding, or otherwise machining various select materials, such as stainless steel, aluminum, copper, Ampco 940, or the like. In some embodiments it may be preferable for the first and second individual body mold halves 462,464 to be formed from a material having a relatively high thermal conductivity, such as aluminum or Ampco 940.

The first and second removable insert halves 466,468 are each directly and independently received within corresponding first and second individual body mold halves 462,464, respectively, via horizontally-extending fasteners 156 and/or dowel pins. Each of the first and second removable insert halves 466,468 include (1) a neck portion 474 configured to define at least a portion of the blow cavity 87 that defines the exterior shape of the neck of one of the blow-molded articles, and (2) an interlock portion 476 configured to support at least a portion of the core rod 54 when the core rod 54 positions a parison within the blow cavity 87. The first and second individual neck mold halves 466,468 may be formed by milling, molding, or otherwise machining various select materials, such as tool steel, stainless steel, Royalloy, H-13, or the like.

Each pair of corresponding first and second individual body mold halves 462,464 may cooperatively defines the exterior shape of the body of one of the final blow-molded articles, and each pair of corresponding first and second removable insert halves 466,468 may cooperatively define the exterior shape of the neck of one of the final blow-molded articles. In some embodiments, the split blow mold assembly 410 of the blowing station 48 may comprise at least two, four, or six of the individual body mold halves 462,464 and/or at least two, four, or six of the individual removable insert halves 466,468.

Figure 34:
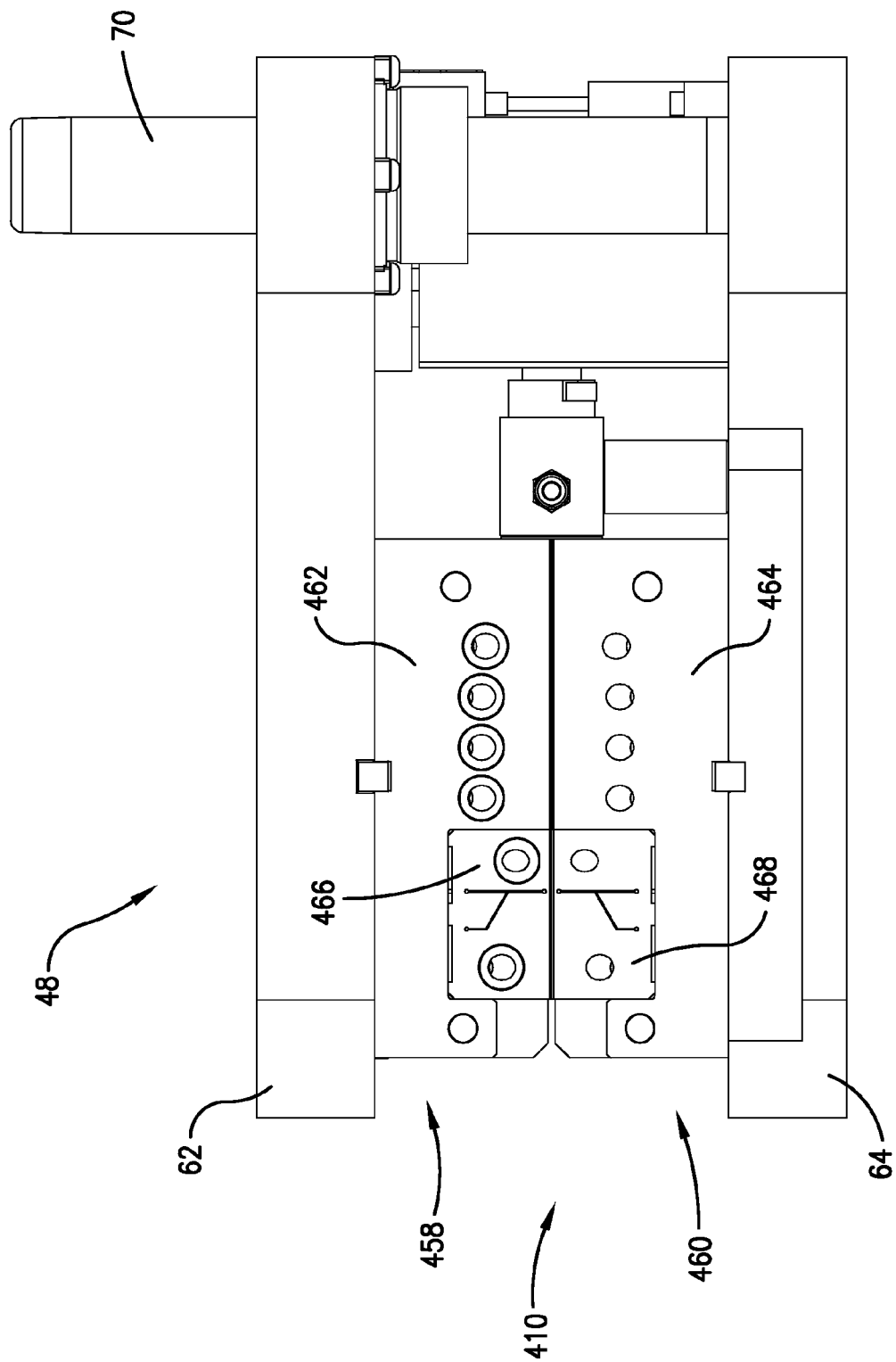
FIG. 34 is a side elevational view of the blowing station of FIGS. 30 and 33 in a closed position.
Figure 35:
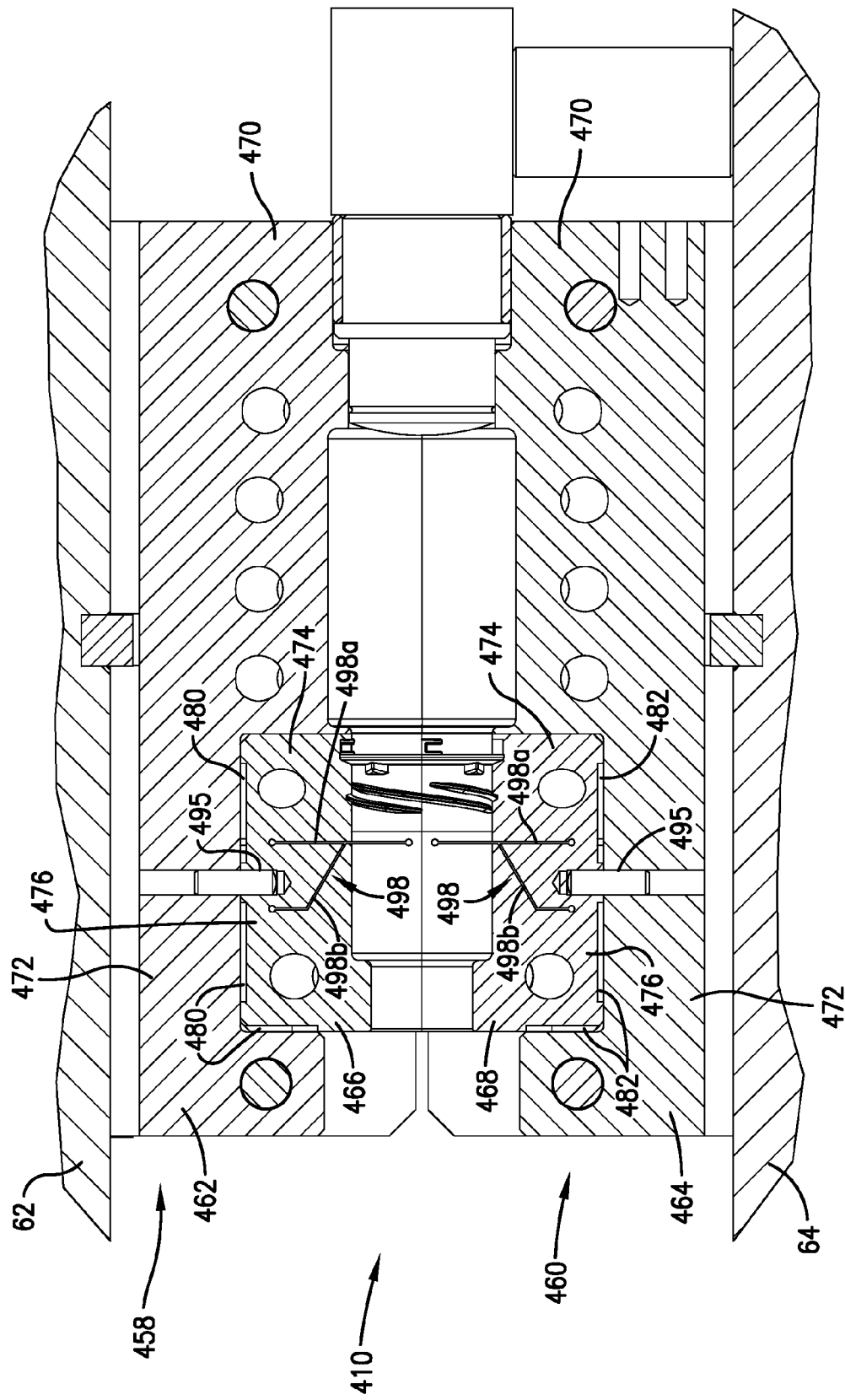
FIG. 35 is a partial cross-section view of the blowing station of FIGS. 30 and 33-34, taken along the line 35-35 of FIG. 33.
Figure 35A:
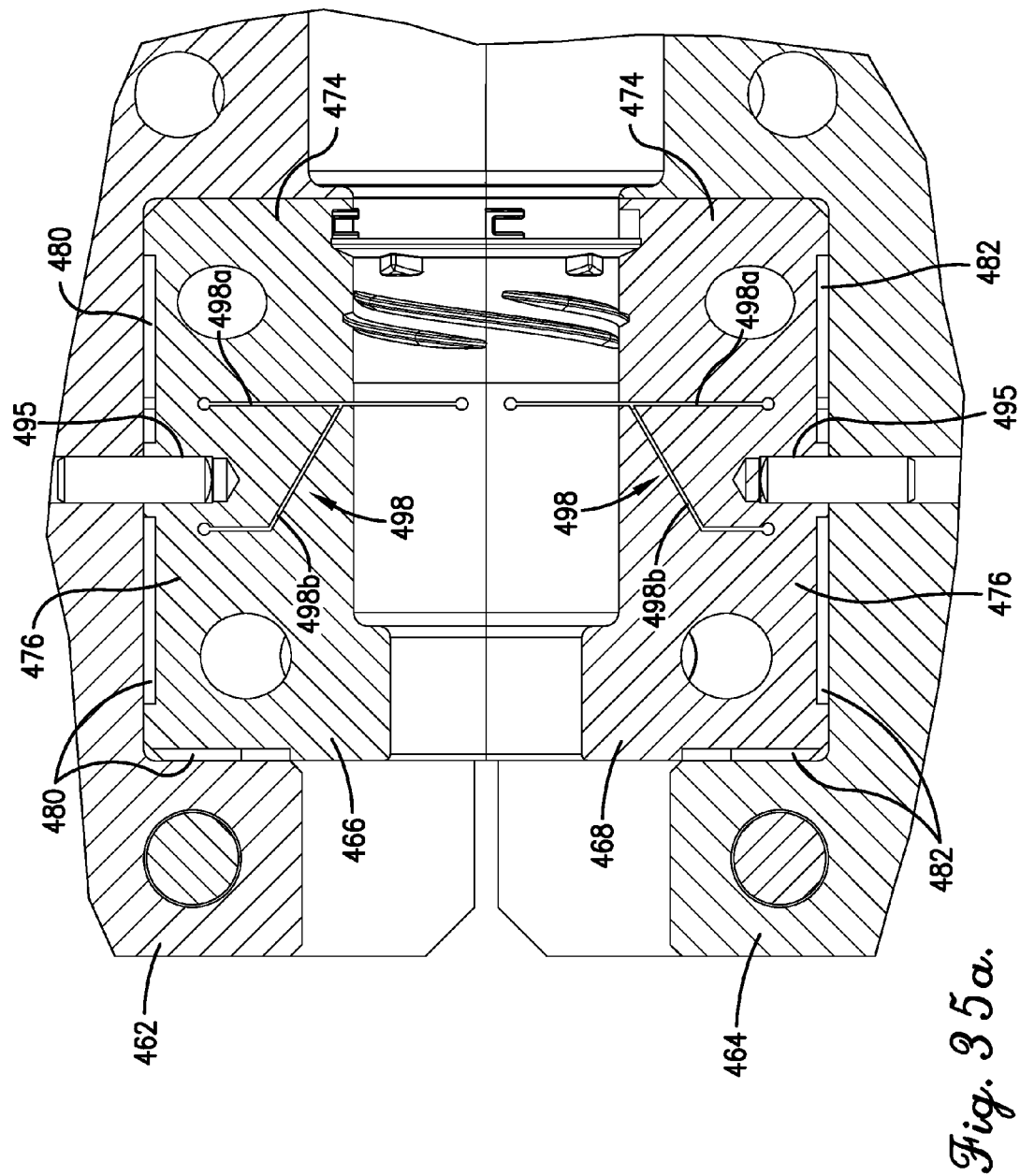
FIG. 35a is an enlarged, partial view of a central portion of the view from FIG. 35.

As shown in FIGS. 34, 35, and 35*a*, certain embodiments of the present invention provide for the first and second removable insert halves 466,468 to be spaced apart from their corresponding first and second individual body mold halves 462,464 via a plurality of upper and lower insulating gaps 480,482. The insulating gaps 480,482, may provide for at least a partial separation of the components of the first and second individual mold halves 458,460 so as to inhibit or reduce heat transfer between the components.

As perhaps best shown by FIGS. 31-32 and 36-37, the insulating gaps 480,482, may be created by one or more stand-offs 490, which are projections that extend from faces of each of removable insert halves 466,468. As illustrated in the drawings, the removable insert halves 466,468 include three faces, i.e., 492*a*, 492*b*, and 492*c*, which are each positioned adjacent to or in contact with the body mold halves 462,464. For example, front face 492*a* is a vertically-orientated face that is configured to be positioned closest to the body portion 470 of one of the body mold halves 462,464. Rear face 492*b* is a vertically-ordinated face that is set apart from front face 492*a* and is configured to be positioned farthest from the body portion 470 of one of the body mold halves 462,464. Finally, connecting face 492*c* is the horizontally-orientated face that extends between faces 492*a* and 492*b*.

In the embodiments, the stand-offs 490 may extend only from the faces 492*b* and 492*c*. As such, as shown in FIGS. 34, 35, and 35*a*, the face 492*a* of each of the removable insert halves 466,468 may contact the body mold halves 462,464 flushly, such that insulating gaps 480,482 are not present between faces 492*a* and the body mold halves 462,464. In certain embodiments, the stand-offs 490 may extend from one or more of the faces 492b and 492c similar to how the stand-offs 390 extended from the faces 392b and 392c of the removable insert halves 366,368, as was previously described. For instance, the stand-offs 490 may extend generally around an entire circumferential edge of the faces 492b and 492c. In other embodiments, the stand-offs 490 may extend generally length or width-wise across the faces 492b and 492c of the insert halves 466,468, or they stand-offs 490 may surround notches 495 on faces 492c that receive the vertically-positioned fasteners 156 and/or dowel pins.

Embodiments of the present invention provide for the stand-offs 490 to extend from the faces 492b and 492c of the removable insert halves 466,468 between about 0.001 to 0.250 inches, between about 0.010 to 0.100 inches, or between about 0.030 to about 0.050 inches. As such, with the first and second removable insert halves 466,468 positioned between the first and second individual body mold halves 462,464, respectively, the insulating gaps 480,482 may have a thickness of about 0.001 to 0.250 inches, about 0.010 to 0.100 inches, or about 0.030 to about 0.050 inches. In certain other embodiments, the insulating gaps 480,482 may have a thickness of about 0.001 to 0.050 inches. The insulating gaps 480,482, may provide for the thermal conductivity between the first and second removable inserts 466,468 and the first and second individual body mold halves 462,464 to be less than 20 Btu/(hr-° F.-ft), less than 15 Btu/(hr-° F.-ft), less than 10 Btu/(hr-° F.-ft), or less than 5 Btu/(hr-° F.-ft).

In addition to the insulating gaps 480,482 positioned between the first and second removable insert halves 466, 468 and the first and second individual body mold halves 462,464, embodiments of the present invention provide for one or more insulating grooves 498 to be formed through at least a potion of each of the first and second removable insert halves 466,468. As perhaps best shown in FIGS. 31-32 and 36-37, the insulating grooves 498 may extend entirely across a width of the removable insert halves 466,468, and may extend along a substantial portion of a height of the removable inserts 466,468. For example, embodiments may include a first insulating grooves 498a that extend generally vertically through the removable insert halves 466,468 so as to separate the neck portions 474 from the interlock portions 476 of the removable insert halves 466,468. In such embodiments, the first insulating groove 498a may extend at least 40 percent, at least 50 percent, or at least 60 percent, or no more than 90 percent, no more than 80 percent, or no more than 70 percent the height of the removable insert halves 466,468. As such, the first insulating grooves 498a are configured to thermally separate portions of individual removable insert halves 466,468, while allowing for the individual removable insert halves 466,468 to remain single, unitary pieces of material. Additional embodiments of the present invention may provide for each of the removable insert halves 466,468 to include a second insulating groove 498b that extends from the first insulating groove 498a into a portion of the interlock portion 476 of each of the removable insert halves 466,468. In such embodiments, the first and second insulating grooves 498a,498b may be configured to at least partially surround the notches 495 that receives the vertically-positioned fastener 156 and/or dowel pins, such that the first and second insulating grooves 498a,498b thermally isolate significant portions of the removable inserts 466,468 from the vertically-positioned fastener 156 and/or dowel pins. Such isolation may be particularly useful when the vertically-positioned fasteners 156 and/or dowel pins are simultaneously in thermal contact with the first and second body mold halves 462,464 and the removable insert halves 466,468.

The insulating grooves 498 may be formed by various methods of machining; however, in certain embodiments, the insulating grooves 498 may be formed by wire electrical discharge machining (EDM), as was previously described. A thickness of the insulating grooves 498a,498b may be dependent on a thickness of the wire used. For example, a 0.010 inch thick wire may be operable to create an insulating groove 498 that is about 0.012 inch thick. Embodiments may provide for the insulating grooves 498 to have a thickness of between about 0.001 to 0.100 inches, about 0.010 to 0.050 inches, or about 0.020 to about 0.040 inches. In certain preferred embodiments, the insulating grooves 498 may have a thickness of about 0.010 to 0.020 inches. In certain other embodiments, the insulating grooves 498 may have a thickness of about 0.001 to 0.050. As such, the insulating grooves 490 may provide for the thermal conductivity between portions of the neck portion 474 and the interlock portion 476 of the first and second removable insert halves 466,468 to be no more than 20 Btu/(hr-° F.-ft), less than 15 Btu/(hr-° F.-ft), less than 10 Btu/(hr-° F.-ft), or less than 5 Btu/(hr-° F.-ft).

In certain embodiments, the individual first and second body mold halves 462,464 and the first and second removable insert halves 466,468 may each have heat transfer channels formed therein, so as to control the temperatures of the body mold halves 462,464 and the insert halves 466,468, respectively. For example, in some embodiments, it may be preferable for the body mold halves 462,464 to be at least 35, 45, or 55 degrees Fahrenheit, and/or not more than 85, 75, or 65 degrees Fahrenheit. Such temperatures are preferred so as to quickly cool the molded article after it has been blown from the parison. Alternatively, in some embodiments, it may be preferable for the removable insert halves 466,468, and specifically the neck portion 474 of the removable insert halves 466,468, to main a temperature of at least 50, 75, or 100 degrees Fahrenheit, and/or not more than 175, 150, or 125 degrees Fahrenheit. Such a temperature may be preferred so as maintain the integrity of the neck portion of the molded article during blow molding. Because the above-described preferred temperatures of the neck portion 474 of the removable insert halves 466,468 are generally similar to the preferred temperatures of the body mold halves 462,464, it may not be required to thermally isolate the components. As such, the faces 492a of the removable insert halves 466,468 directly contact the body mold halves 462,464. Thus, the temperature of the neck portion 474 of the removable insert halves 466,468 will be thermally associated with that of the body mold halves 462,464.

Contrastingly, however, it may be preferred for the interlock portion 476 of the removable insert halves 466,468 to be operated a temperature that is relatively higher than that of the neck portion 474 of the removable insert halves 466,468 and/or the body mold halves 462,464. For example, it may be it may be preferred for the interlock portion 476 of the insert halves 466,468 to be operated at room temperature. In certain specific embodiments, it may be preferred for the interlock portion 476 of the insert halves 466,468 to be operated at a temperature of at least 60, 70, or 80 degrees Fahrenheit, and/or not more than 120, 110, or 100 degrees Fahrenheit. Such increased temperature (with respect to the neck portion 474 of the removable insert halves 466,468 and/or the body mold halves 462,464) may be preferred so as not to allow heat to be extracted from the core rod 54 through the interlock portion 476 of the removable insert halves 466,468. In particular, portions of the core rod 54 may be supported by and may contact portions of the interlock portion 476 of the removable insert halves 466, 468. As such, the core rod 54 will be thermally associated with the interlock portion 476 of the removable insert halves 466,468. As previously described, the core rod 54 will be supporting the parison during injection molding at the injection station 46, during transfer to the blowing station 48, and during blow molding at the blowing station 48. During the process, it is preferred that the parison retain much of the inherent heat that it was formed with at the injection station 46. As such, if the interlock portions 476 of the removable insert halves 466,468 are cooled below their preferred temperatures, such as by being in efficient thermal contact with the neck portions 474 of the removable insert halves 466,468 and/or the body mold halves 462,464, the interlock portions 476 of the removable insert halves 466, 468 may extract heat from the parison through core rod 54. To alleviate such unwanted heat transfer, embodiments of the present invention provide for the insulating grooves 498 to thermally insulate the interlock portions 476 of each of the removable insert halves 466,468 from the neck portions 474 of the removable insert halves 466,468 so as to restrict heat flow and to efficiently maintain preferred temperature differences therebetween.

As such, embodiments of the present invention provide for the insulating grooves 498 to thermally isolate at least parts of the neck portions 474 of the removable insert halves 466,468 from the interlock portions 476 of the insert halves 466,468 so as to restrict heat flow and to efficiently maintain preferred temperature differences therebetween. In addition to maintaining preferred temperatures, embodiments of the present invention additionally allow for the blow station 48 to have a quick start-up process, to operate with short blow cycles (so as to increase the molded article production rate), and to process the parisons and molded articles more efficiently.

Given the configuration described above, the blow molding process performed with the blowing station 48 embodiment illustrated in FIGS. 30-37 includes moving the split blow mold assembly 410 from the open to the closed position, with the core rods 54 and the parisons disposed within the blow cavities 87. Air is then injected into an interior of the parisons such that the parisons are blow molded into a molded article having a final shape defined by the blow cavities 87. Advantageously, the insulating gaps 480,482 and the insulating grooves 498 inhibit heat flow, such that the body mold halves 462,464, the neck portion 474 of the removable insert halves 466,468, and the interlock portion 476 of the removable insert halves 466,468 can maintain there preferred temperatures.

Although the invention has been described with reference to the preferred embodiment illustrated in the attached drawing figures, it is noted that equivalents may be employed and substitutions made herein without departing from the scope of the invention as recited in the claims.

The invention claimed is:

1. Tooling for forming at least one parison with an injection blow molding system, said tooling comprising:
   at least one upper body mold portion and one lower body mold portion,
   wherein said upper and lower body mold portions cooperatively present a body cavity configured to define an exterior shape of a body of the parison;
   at least one upper neck mold portion and one lower neck mold portion,
   wherein said upper and lower neck mold portions cooperatively present a neck cavity configured to define an exterior shape of a neck of the parison;
   an upper insulating gap positioned adjacent to said neck mold portion, wherein said upper insulating gap opens into said neck cavity; and
   a lower insulating gap positioned adjacent to said lower neck mold portion, wherein said lower insulating gap opens into said neck cavity.

2. The tooling of claim 1, further comprising:
   wherein said upper insulating gap is a first upper insulating gap and said lower insulating gap is a first lower insulating gap,
   wherein said upper body mold portion and said upper neck mold portion are at least partially spaced apart by a second upper insulating gap,
   wherein said lower body mold portion and said lower neck mold portion are at least partially spaced apart by a second lower insulating gap.

3. The tooling of claim 2, further comprising an upper thermal barrier positioned between said upper body mold portion and said second upper insulating gap, and a lower thermal barrier positioned between said lower body mold portion and said second lower insulating gap.

4. The tooling of claim 3, further comprising:
   wherein said upper neck mold portion includes one or more projections extending from a face of said neck mold portion, and wherein said upper thermal barrier contacts said upper neck mold portion at said projections,
   wherein said lower neck mold portion includes one or more projections extending from a face of said neck mold portion, and wherein said lower thermal barrier contacts said lower neck mold portion at said projections.

5. The tooling of claim 2, further comprising:
   at least one upper interlock insert portion and one lower interlock insert portion,
   wherein said upper and lower interlock portions are configured to support a core rod associated with the injection blow molding system,
   wherein said upper neck mold portion and said upper interlock insert portion are spaced apart by said first upper insulating gap,
   wherein said lower neck mold portion and said lower interlock insert portion are spaced apart by said first lower insulating gap.

6. The tooling of claim 5, further comprising:
   wherein said upper thermal barrier is a first upper thermal barrier and said lower thermal barrier is a first lower thermal barrier,
   a second upper thermal barrier positioned between said upper neck mold portion and said upper interlock insert portion; and
   a second lower thermal barrier positioned said lower neck mold portion and said lower interlock insert portion.

7. The tooling of claim 6, wherein said second upper thermal barrier is further positioned between said first upper insulating gap and said upper interlock insert portion, and wherein said second lower thermal barrier is further positioned between said first lower insulating gap and said lower interlock insert portion.

8. The tooling of claim 1, wherein said upper insulating gap has a thickness of at least 0.001 inches and no more than 0.050 inches, and wherein said lower insulating gap has a thickness of at least 0.001 inches and no more than 0.050 inches.

9. The tooling of claim 3, wherein said upper and lower thermal barriers are formed from a material having a thermal conductivity of no more than 15 Btu/(hr-° F.-ft).

10. The tooling of claim 9, wherein said upper and lower thermal barriers are formed from titanium.

11. The tooling of claim 3, wherein one of said upper or lower insulating gaps and one of said upper or lower thermal barriers have a combined thermal conductivity of no more than 10 Btu/(hr-° F.-ft).

12. Injection blow molding tooling process comprising:
(a) providing upper and lower body mold portions configured for attachment to upper and lower die sets, respectively;
(b) connecting upper and lower neck mold portions with the upper and lower body mold portions, respectively;
wherein upper and lower insulating gaps are presented adjacent to said upper and lower neck mold portions, respectively, wherein said upper and lower insulating gaps open into a neck cavity presented between said upper and lower neck mold portions.

13. The process of claim 12, further comprising:
(c) connecting first upper and lower thermal barrier plates with said upper and lower neck mold portions, respectively,
wherein the upper and lower insulating gaps are first upper and lower insulating gap,
wherein upon the connecting of step (c), second upper and lower insulating gaps are presented between the upper and lower neck mold portions and the upper and lower thermal barrier plates, respectively.

14. The process of claim 13, wherein one of said second upper or lower insulating gaps and one of said upper or lower thermal insulating plates have a combined thermal conductivity of no more than 10 Btu/(hr-° F.-ft).

15. The process of claim 13, further comprising:
(d) providing a heating fluid at first temperature through a first portion of heat transfer channels defined within the upper and lower body mold portions;
(e) providing a second heating fluid at a second temperature through a second portion of heat transfer channels defined with the upper and lower neck mold portions,
wherein said second upper and lower insulating gaps and said upper and lower thermal insulating plates conduct no more than 10 Btu/(hr-° F.-ft).

16. The process of claim 12, wherein said upper insulating gap at least 0.001 inches and no more than 0.050 inches, and wherein said lower insulating gap has a thickness of at least 0.001 inches and no more than 0.050 inches.

17. The process of claim 13, wherein said upper and lower thermal barrier plates are formed from a material having thermal conductivity less than 15 Btu/(hr-° F.-ft).

18. Tooling for forming a molded article from a parison with an injection blow molding system, said tooling comprising:
upper and lower body mold halves,
wherein said upper and lower body mold halves cooperatively present a body cavity configured to define an exterior shape of a body of the molded article; and
upper and lower insert halves coupled with said upper and lower body mold halves respectively,
wherein at least a portion of said upper and lower insert halves cooperatively present a neck cavity configured to define an exterior shape of a neck of the article,
wherein said upper insert half includes an upper insulating gap separating first and second portions of said upper insert half,
wherein said lower insert half includes a lower insulating gap separating first and second portions of said lower insert half.

19. The tooling of claim 18, wherein said first portions of said upper and lower insert halves comprise neck portions, and wherein said second portions of said upper and lower insert halves comprise interlock portions.

20. The tooling of claim 19, wherein said first and second portions of each of said upper and lower insert halves form a unitary piece of material.

21. The tooling of claim 18, wherein said first portions of said upper and lower insert halves comprise neck mold halves, and wherein said second portions of said upper and lower insert halves comprise interlock insert halves.

22. The tooling of claim 18, wherein said upper insulating gap extends between said first and second portions of said upper insert half by at least 0.001 inches and no more than 0.050 inches, and wherein said lower insulating gap extends between said first and second portions of said lower insert half by at least 0.001 inches and no more than 0.050 inches.

23. The tooling of claim 18, wherein said upper and lower insulating gaps have a thermal conductivity of no more than 10 Btu/(hr-° F.-ft).

24. The tooling of claim 18,
wherein said upper insert half further includes an upper thermal barrier separating said first and second portions of said upper insert half,
wherein said lower insert half includes a lower thermal barrier separating said first and second portions of said lower insert half.

25. The tooling of claim 24, wherein said upper and lower thermal barriers are formed from titanium.

* * * * *